United States Patent
Mak

(10) Patent No.: US 10,180,579 B2
(45) Date of Patent: Jan. 15, 2019

(54) VIRTUAL REALITY DEVICE AND MODE OF OPERATION

(71) Applicant: OBSINN LIMITED, Hong Kong (HK)

(72) Inventor: Ka Chun Mak, Hong Kong (HK)

(73) Assignee: OBSINN LIMITED, Hong Kong (HK)

( * ) Notice: Subject to any disclaimer, the term of this patent is extended or adjusted under 35 U.S.C. 154(b) by 225 days.

(21) Appl. No.: 15/255,126

(22) Filed: Sep. 1, 2016

(65) Prior Publication Data

US 2016/0370592 A1  Dec. 22, 2016

Related U.S. Application Data

(63) Continuation of application No. PCT/CN2015/091712, filed on Oct. 12, 2015.

(30) Foreign Application Priority Data

Apr. 20, 2015  (HK) ................... 15103780.1

(51) Int. Cl.
| | |
|---|---|
| *G02B 27/01* | (2006.01) |
| *G02B 27/02* | (2006.01) |
| *G02B 27/00* | (2006.01) |
| *G06F 3/01* | (2006.01) |
| *G06F 3/14* | (2006.01) |
| *G06T 11/60* | (2006.01) |
| *G09G 3/00* | (2006.01) |
| *G06F 3/0484* | (2013.01) |

(52) U.S. Cl.
CPC .......... *G02B 27/028* (2013.01); *G02B 27/00* (2013.01); *G02B 27/022* (2013.01); *G06F 3/011* (2013.01); *G06F 3/012* (2013.01); *G06F 3/017* (2013.01); *G06F 3/0484* (2013.01); *G06F 3/14* (2013.01); *G06T 11/60* (2013.01); *G09G 3/003* (2013.01)

(58) Field of Classification Search
CPC ..... G02B 27/028; G02B 27/022; G02B 27/00
See application file for complete search history.

(56) References Cited

U.S. PATENT DOCUMENTS

| | | | |
|---|---|---|---|
| 2006/0147197 A1 | 7/2006 | Spruck et al. | |
| 2016/0025990 A1* | 1/2016 | Zhang ................ | G02B 27/2257 359/474 |

FOREIGN PATENT DOCUMENTS

| | | |
|---|---|---|
| CN | 102636876 A | 8/2012 |
| CN | 103442244 A | 12/2013 |
| CN | 204188882 U | 3/2015 |

OTHER PUBLICATIONS

International Search Report of PCT Patent Application No. PCT/CN2015/091712 dated Jan. 18, 2016.

* cited by examiner

*Primary Examiner* — Joseph P Martinez

(57) ABSTRACT

The present application relates to a virtual reality device which may be formed of an outer frame, an electronic board, a screen, a folding tube, a lens frame, lenses, and a slipover frame. The outer frame of the virtual reality device may be connected with the lens frame by the folding tube. The lens frame may be connected with the slipover frame. One or more screens may be mounted on the outer frame. The screens may be connected with the electronic board. The lenses can be mounted on the lens frame or the folding tube. The virtual reality device has a reduced weight and an increased flexibility. It is not necessary to hoop the device around a user's head when in use. It can be slipped over eyeglasses, and has various position-adjusting functions so that its usability and comfort can be increased.

17 Claims, 37 Drawing Sheets

VIRTUAL REALITY DEVICE AND MODE OF OPERATION

CROSS-REFERENCE TO RELATED APPLICATIONS

The present application is a Continuation Application of PCT application No. PCT/CN2015/091712 filed on Oct. 12, 2015, which claims the benefit of Hong Kong Patent Application No. 15103780.1 filed on Apr. 20, 2015; the contents of which are hereby incorporated by reference.

FIELD OF THE TECHNOLOGY

The present application relates to a virtual reality device having a flexible and lightweight structure, and a series of operating systems that are easy to operate.

BACKGROUND

Virtual reality is regarded as a top science and technology development area of the new generation. It provides users with experience of entering into the electronic virtual world. The current virtual reality devices are usually too big and too heavy. They lack flexibility and are relatively troublesome and uncomfortable to wear. Also, they are not easy to operate and lack realness in the virtual world. Hence, users do not have a good experience in the virtual world.

SUMMARY

The virtual reality device of the present application can reduce the weight of a virtual reality device and can increase its flexibility so as to enhance its usability and comfort when in use. For example, the virtual reality device of the present application is foldable and its size can be reduced. It is not necessary to hoop the device around a user's head when in use. It can be slipped over eyeglasses, and has various position-adjusting functions. Further, the device can improve the convenience of operation under the virtual reality mode. For example, it can be connected to a smart phone or tablet, and uses its touchscreen as mouse operation. Also, the user can view the images of his/her hands on the screen of the virtual reality device and operate an electronic device. This can make virtual reality easier to use and popular.

The present application provides a virtual reality device, characterized by having an outer frame, an electronic board, a screen, a lens frame, lenses, and a slipover frame; the outer frame being connected with the lens frame by a folding tube and/or extending arms; the lens frame being connected with the slipover frame; the slipover frame having a front slipover and side slipovers; the front slipover and/or the side slipovers being in the form of slipover plates; the outer frame being provided with the screen; the screen being coupled with the electronic board; and the lenses being mounted on the lens frame and/or the folding tube.

Preferably, the extending arms are provided between the outer frame and the lens frame, wherein the extending arms are hingedly connected by a hinge, and the hinge is provided on the outer frame and/or the lens frame and/or the folding tube. Furthermore, the lens frame and/or the folding tube may include one or more lens-restricting devices for adjusting left or right position of the lenses relative to the lens frame and/or the folding tube. Moreover, the total weight of the outer frame, the screen, the folding tube, the lens frame and the lenses is 55 grams or less.

The lens frame and the slipover frame are connected by one or more position-restricting mechanisms for selecting relative up or down connecting position between the lens frame and the slipover frame. The slipover plates of the slipover frame are provided with secondary slipover plates, and one or more slipover plate position-restricting mechanisms are provided between the slipover plates and the secondary slipover plates for connecting and/or changing relative front or rear connecting position between the slipover plates and the secondary slipover plates, thereby changing the slipover plates' width.

The front slipover of the slipover frame may include a nose support, and the front slipover is provided with one or more nose support position-restricting devices for adjusting high or low position of the nose support relative to the front slipover. The lightweight structure of the virtual reality device and the slipover frame make it unnecessary to hoop the device around a user's head when in use, and unnecessary to have backward force and upward tension exerted on the user's head when wearing the device over eyeglasses.

Furthermore, the virtual reality device includes one or more cameras and/or thermal-sensing lenses mounted on the outer frame, wherein the lenses are facing outwards from the outer frame. The virtual reality device includes a positioning switch for directly switching positioning function on or off.

In one embodiment, the virtual reality device and an electronic device simultaneously connect with an electric current managing device through a connecting wire, wherein when an external power source is out of power or not connected with the electric current managing device, the electronic device will supply electricity to the virtual reality device through the connecting wire and/or the electric current managing device, and when the virtual reality device and the electronic device simultaneously connect with the electric current managing device through the connecting wire, and the external power source has power and at the same time connects with the electric current managing device, the electronic device will not supply electricity to the virtual reality device, and the external power source will simultaneously supply power to the virtual reality device and the electronic device through the connecting wire, whether the external power source connects with the electric current managing device or not, and wherein information between the virtual reality device and the electronic device is transmitted through the connecting wire and/or the electric current managing device.

In another embodiment, under thermal sensing recognition mode and/or image recognition mode, and in front of a thermal-sensing lens and/or camera of the virtual reality device, imaging function detects condition of a user's hand through thermal sensing and/or image recognition, cuts out an image of the user's hand or outlines a contour of the user's hand, and places the image in a display content on the screen as if the user views his/her hand on the screen, so that recognition can be carried out through motion of the image of the user's hand at overlapping position with an original screen content, to thereby control the electronic device, and form interaction between the user's hand and the original screen content as well as a virtual reality interaction mode.

Preferably, left and/or right side of the virtual reality device is provided with a side wing, wherein the side wing is connected with the lens frame and/or the folding tube and/or the outer frame by a side wing hinge and/or a flexible material such that the side wing is hingedly connected with the lens frame and/or the folding tube and/or the outer frame, and the side wing is connected with the side slipover, and wherein the side wing and/or the side wing hinge and/or the flexible material is provided thereon with the electronic board and/or a connecting wire and/or a battery to thereby evenly distribute front and rear weights of the virtual reality device.

Moreover, one or more position-restricting mechanisms are provided between the lens frame and the front slipover and/or between the side wing and the side slipovers, so as to adjust up or down connecting position of the front slipover relative to the lens frame and/or adjust up or down connecting position of the side slipovers relative to the side wing, to thereby align the lenses provided on the lens frame with focuses of a user's eyes and/or eyeglasses.

One or more sliding devices are provided between the side wing and the side slipovers, and by means of the sliding devices, the side wing slides forwards or backwards on the side slipovers so as to adjust forward or backward position of the side wing relative to the side slipovers, and regulate inconsistent connection position of the side wing on the side slipovers due to movement between the side wing and the side slipovers. The virtual reality device is provided with a side-by-side mode switching key for switching the screen to left and right, side-by-side display.

Furthermore, the virtual reality device is provided with a wireless function switch for switching a wireless transceiver device and/or function of the virtual reality device on or off.

In another embodiment, an electric current managing device is provided on the virtual reality device or a connecting wire, wherein when the virtual reality device and an electronic device are connected through the electric current managing device and/or the connecting wire, and an external power source is out of power or is not connected with the electric current managing device, the battery and/or the electronic device will supply power to the virtual reality device through the electric current managing device and/or the connecting wire, and when the virtual reality device and the electronic device are connected through the electric current managing device, and the external power source has power and is connected with the electric current managing device, the electronic device will no longer supply power to the virtual reality device, and the external power source will supply power to the virtual reality device and/or the electronic device and/or the battery through the electric current managing device and/or the connecting wire; and wherein when the virtual reality device and the electronic device are connected through the electric current managing device and/or the connecting wire, information is transmitted between the virtual reality device and the electronic device through the electric current managing device and/or the connecting wire regardless whether the external power source is connected with or supplying power to the electric current management device or not.

BRIEF DESCRIPTION OF THE DRAWINGS

Specific embodiments will now be described by way of example with reference to the accompanying drawings wherein.

DETAILED EMBODIMENTS

Figure 1:
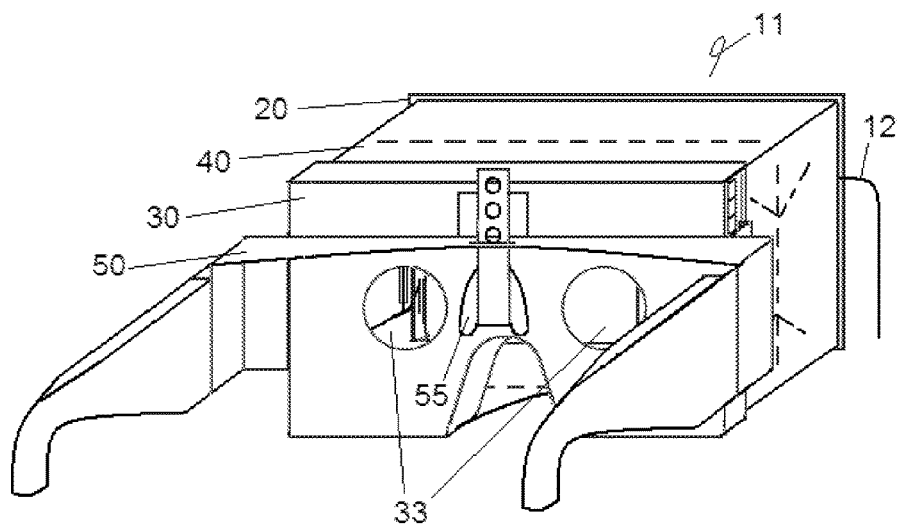
FIG. 1 is a perspective view from the rear, right and top sides of the virtual reality device according to a first embodiment of the present application.

In the virtual reality device of the present application, a folding tube may be provided between an outer frame and a lens frame. The lens frame can be connected with a slipover frame. One or more screens may be mounted on the outer frame. The screens may be connected with an electronic board. The electronic board may be mounted on the outer frame, folding tube, lens frame or slipover frame. Lenses can be mounted on the lens frame or the folding tube.

In the virtual reality device of the present application, extending arms may be provided on the outer frame and/or the lens frame. Hinge seats may be provided on the outer frame and/or the lens frame and/or the folding tube. The extending arms can be hingedly connected with the hinge seats so that the angle between the extending arms and outer frame and/or the extending arms and the lens frame can be adjusted.

In the virtual reality device of the present application, the extending arms between the outer frame and the lens frame can be connected by the extending arm hinges so that the angles of the extending arms between the outer frame and the lens frame can be adjusted. Hence, the outer frame, the extending arms on the outer frame, the extending arms on the lens frame, and the lens frame can be connected together. Through the hinge seats of the extending arms, the angle between the extending arms and the outer frame as well as the lens frame can be adjusted to thereby form a mechanical structure for adjusting the distance between the outer frame and the lens frame.

In the virtual reality device of the present application, extending arm position-restricting structures may be provided on the hinge seats and the extending arm hinges for fixing the angles between the extending arms and the outer frame, the extending arms and the lens frame, and the extending arms themselves, thereby restricting the distance between the outer frame and the lens frame such that the user needs to exert a certain force to adjust the angles.

In the virtual reality device of the present application, springs may be provided on the outer frame and/or the lens frame and/or the extending arms. Under the influence of the springs, the outer frame and the lens frame, the extending arms and the outer frame, the extending arms and the lens frame, and the extending arms themselves can be biased to a certain angle and/or distance such that the outer frame and the lens frame are expanded.

In the virtual reality device of the present application, coupling mechanism may be provided on the outer frame and/or the lens frame. Under the influence of the coupling mechanism, the outer frame and the lens frame can be coupled together. When the coupling mechanism is released, the distance between the outer frame and the lens frame can be adjusted.

In the virtual reality device of the present application, the outer frame may be formed of an outer panel and an outer case. The hinge seats, the screen, and the electronic board can be mounted on the outer panel and/or the outer case. The outer panel and/or the outer case can be connected with the folding tube.

In the virtual reality device of the present application, the lens frame may be formed of a lens panel and a lens case. The hinge seats, the lenses, and the electronic board can be mounted on the lens panel and/or the lens case. The lens panel and/or the lens case can be connected with the folding tube or the slipover frame. Position-restricting mechanism may be provided between the lens panel and/or the lens case and the slipover frame. Sliding and connecting structures may also be provided to adjust the position of the lens frame relative to the slipover frame.

In the virtual reality device of the present application, the outer frame and the lens frame are connected by the folding tube. The folding tube may be made of a soft material, such as cloth, rubber, paper, and other suitable material which is mainly light in weight, soft and foldable. When the outer frame and the lens frame are combined, the folding tube can be folded up and hidden in the space between the outer frame and the lens frame. This makes the device easy to carry and reduces its weight.

In the virtual reality device of the present application, a separating sheet may be provided in the folding tube. The upper and lower ends of the separating sheet may be connected with the inner surfaces of the upper and lower sheets of the folding tube respectively. When the folding tube is expanded, the separating sheet is erected vertically in the middle of the folding tube to thereby separate the folding tube into a left spacing and a right spacing such that viewing of the screen on the outer frame of the left and right eyes of the user can be separated.

In the virtual reality device of the present application, the folding tube may be provided with a lens frame sheet formed with lens apertures. The lens apertures correspond to the lens positions on the lens frame, or the lenses can be directly mounted in the lens apertures. The user can view the screen through the lens apertures and the lenses. The design of the lens frame sheet can further save some space on the lens frame such that the weight of the lens frame can be reduced.

In the virtual reality device of the present application, fold lines can be preset on the folding tube. The fold lines can allow the folding tube to be folded according to the preset fold lines so as to avoid dropping of the folding tube on the outer frame and the lens frame, thereby enhancing convenience and storage capability.

In the virtual reality device of the present application, the folding tube may utilize linking lines for linking the extending arms and/or the extending arm hinges such that the form and folding of the folding tube can be changed according to the movement of the extending arms. This can reduce deformation of the folding tube, and lower the chance of dropping the folding tube on the outer frame and the lens frame when the outer frame and the lens frames are combined.

In the virtual reality device of the present application, one or more lens position-restricting devices may be provided on the lens frame and/or the lens frame sheet. One or more straight rows of different lens position-restricting devices can be aligned horizontally from left to right. The lens position-restricting device can be a push button, rotatable knob, screw, snap buckle, clip, or other suitable structure. The lenses may be provided with lens holes coupled with the lens position-restricting devices. Through the coupling of the lens holes with different lens position-restricting devices, the user can adjust the left or right position of the lenses relative to the lens frame and/or the lens frame sheet so as to find out the pupillary distance and position suitable for the user.

In the virtual reality device of the present application, the total weight of the outer frame, the electronic board, the screen, the folding tube, the lens frame and the lenses is 60 grams or less; or the total weight of the outer frame, the screen, the folding tube, the lens frame and the lenses is 55 grams or less. The reduction of weight is resulted in the combined structure of the outer frame, the folding tube, the lens frame and the extending arms, and can enhance the usability and comfort of the device when in use.

In the virtual reality device of the present application, the lens frame can be connected with the slipover frame. One or more position-restricting mechanisms can be provided between the lens frame and a front slipover of the slipover frame. One side of the position-restricting mechanism can be a male position-restricting mechanism, which may be a spring plate, spring action bead, push button, rotatable knob, screw, snap buckle, clip, or other suitable position-restricting device structure. The other side of the position-restricting mechanism can be a female position-restricting mechanism, which may be one or more recesses, openings, screw seats, or other suitable structure. The two sides can be coupled together to form the position-restricting mechanism to restrict and adjust the position of the lens frame relative to the slipover frame and/or connect the lens frame with the slipover frame. When the position-restricting mechanisms are released, the lens frame and the slipover frame can be separated and/or activated. Two or more female position-restricting mechanisms/male position-restricting mechanisms can produce one or more vertical columns on one side, which cooperate with the male position-restricting mechanisms/female position-restricting mechanisms on the other side, thereby selecting upward or downward connecting position of the lens frame relative to the slipover frame. Also, one or more sliding and connecting structures can be provided between the lens frame and the front slipover of the slipover frame. The sliding and connecting structures can be in the form of a telescope, track, or encirclement. One side can be a male slide and connect which can be a rod, hook, interlock, or other suitable conventional structure. The other side can be a female slide and connect which can be a sleeve, loop, track, or other suitable conventional structure. The two sides can cooperate to form the sliding and connecting structures. This renders up or down sliding movement between the lens frame and the slipover frame according to preset tracks on the sliding and connecting structures, and changes the relative up or down position of the lens frame and the slipover frame. The sliding and connecting structures can be used in association with the position-restricting mechanism, or they can be combined together. A user can align his/her eyes with the lenses on the lens frame by means of adjusting the position of the lens frame relative to the slipover frame, especially for a user wearing eyeglasses. Since eyeglasses have different shapes and sizes, it is necessary to flexibly adjust the position of the lenses on the lens frame when wearing the device.

In the virtual reality device of the present application, the slipover frame may be formed of a front slipover and side slipovers. Slipover hinges may be provided between the front and the side slipovers such that the angle between the front and side slipovers can be adjusted, and the side slipovers can be folded towards the front slipover for easy storage.

In the virtual reality device of the present application, the slipover frame may be provided with slipover plates. The slipover plates may be disposed at the top or bottom inside the front and side slipovers such that the slipover frame can be slipped over eyeglasses, and a user wearing eyeglasses can wear the virtual reality device.

In the virtual reality device of the present application, the slipover plates of the slipover frame may be provided with one or more secondary slipover plates. One or more slipover plate position-restricting mechanisms may be provided between the secondary slipover plates and the slipover plates so as to connect and/or change the forward or backward connecting position of the secondary slipover plates relative to the slipover plates, thereby changing the width of the slipover plates. The slipover plate position-restricting mechanism can be a push button, rotatable knob, screw, snap buckle, clip, hook tape, or other suitable conventional structure.

In the virtual reality device of the present application, a nose support can be provided on the front slipover of the slipover frame. The front slipover may be provided with one or more nose support openings and a nose support position-restricting device. The nose support position-restricting device can be a push button, rotatable knob, screw, snap buckle, clip, or other suitable conventional structure. The nose support can be inserted into the nose support opening, and a nose support aperture on the nose support can be used to couple with the nose support position-restricting device such that the nose support can be fixedly connected with the front slipover. The nose support may be provided with one or more nose support apertures. The nose support apertures may be arranged in one or more vertical columns. Through the coupling of different nose support apertures with the nose support position-restricting device, a user can adjust the up or down position of the nose support on the front slipover so as to find out a suitable position for the user.

In the virtual reality device of the present application, a wire clip may be provided on the outer frame, the folding tube, the lens frame, or the slipover frame for fixing the position of an external wire. The external wire can be a wire of an earphone, a connecting wire or a power source wire connecting with an electronic device.

In the virtual reality device of the present application, the device is provided with a slipover frame and has a lightweight design. Therefore, it is not necessary to hoop the virtual reality device around the head of a user and no backward force and/or upward force would be exerted on the user's head when in use. It also allows the mounting of the virtual reality device over eyeglasses.

In the virtual reality device of the present application, headband apertures and a headband may be provided on the side slipovers. The headband can be detachably connected to the headband apertures. When the headband apertures on the two side slipovers are coupled with two ends of the headband, the headband can be disposed on the back of the user's head. The headband can be provided with a loosening/tightening buckle for adjusting the length of the headband. The headband may be an elastic band. The headband can be detachable so that a user can attach or detach the headband according to his/her need.

In the virtual reality device of the present application, the electronic board may be coupled with a screen and/or a camera and/or a thermal-sensing lens and/or a battery and/or a sensor head. The electronic board may be provided with an integrated circuit chip, an accelerometer, an electronic compass, a gyroscope, a wireless transceiver device, etc. The electronic board may have audio output. The audio output can be an interface or earphone. The electronic board may have a connecting wire for connecting with an electronic device for transmitting power and/or information such as video, gyroscope information, and camera information, etc. The electronic board can be installed on the outer frame, the folding tube, the lens frame or the slipover frame.

In the virtual reality device of the present application, the battery can be mounted on the outer frame, the folding tube, the lens frame or the slipover frame.

In the virtual reality device of the present application, one or more cameras and/or thermal-sensing lens which may be mounted on the outer frame with lens facing outwardly from the outer frame.

In the virtual reality device of the present application, a positioning function switch is provided for switching the positioning function on or off.

The virtual reality device of the present application and/or the electronic device may be provided with one or more sensor heads, and a sensor head base station for tracking the sensor head, and sending data back to the electronic device. This can more accurately track the position of the virtual reality device and the activity of the user.

The virtual reality device of the present application may be connected with the electronic device through one or more connecting wires. Through the connecting wire, power and/or information can be transmitted between the virtual reality device and the electronic device. For example, the virtual reality device can transmit information from the accelerometer, electronic compass, gyroscope, camera, thermal-sensing lens, etc. to the electronic device. On the other hand, the electronic device can transmit information such as video and audio to the virtual reality device. Through the connecting wire, the electronic device can also transmit power to the virtual reality device for its operation. The connecting wire can be USB and/or HDMI and/or DISPLAY PORT and/or MIN and/or LIGHTING and/or THURDERBOLT, or other suitable conventional standard connecting wire.

The USB cable port of the connecting wire of the present application can be MICRO USB, or USB3.1 TYPE-C. The USB wire can possess MHL and/or OTG standard.

The virtual reality device of the present application can also be connected with the electronic device by a wireless device for wireless transmission between the virtual reality device and the electronic device. The wireless device can be WIFI, WIGIF, or other suitable conventional device. Standard can be MIRACAST or other suitable conventional standard. The connection between the virtual reality device of the present application and the electronic device can be through an open wire or wireless.

The electronic device of the present application can be smart phone, tablet, computer, electronic game device, etc.

The electric current managing device of the present application can manage electric current between the virtual reality device, the electronic device and the external power source. The electric current managing device may have three electric current managing device interfaces, namely virtual reality device interface, electronic device interface, and external power source interface. The interface can be USB, HDMI, power source cable or other suitable conventional standard. The connecting wire of the virtual reality device may also fixedly connect with the electric current managing device such that it does not require a virtual reality device interface. When the virtual reality device and the electronic device are connected with the electric current managing device, and the external power source is not connected with the electric current managing device or the external power source is out of power, the electronic device will supply power to the virtual reality device through the electric current managing device. The virtual reality device and the electronic device can also exchange information through the electric current managing device. However, when the external power source is connected with the electric current managing device and the external power source can supply power, the electric current managing device can control the electric current. The electronic device will no longer supply power to the virtual reality device. Further, the external power source will simultaneously supply power to the virtual reality device and the electronic device. However, the exchange of information between the virtual reality device and the electronic device through the electric current managing device remains unchanged. Through the electric current managing device, it can ensure that when the electronic device does not have sufficient power and requires the use of external power source, the electronic device and the virtual reality device can continue to operate, especially for electronic device, such as smart phone and tablet, which has only one USB interface.

The electronic device of the present application can be installed with a virtual reality program. When the electronic device detects and connects with the virtual reality device, the electronic device gets into the virtual reality program, and starts the virtual reality device. The electronic device and the virtual reality device start to exchange information and/or power.

Display mode of the virtual reality program of the present application:

1) By default, the screen of the virtual reality device is on, and the screen of the electronic device is off. However, a user can enter the menu of the virtual reality program and select to turn on the screen of the electronic device when running the virtual reality program. [virtual reality program>display mode>screen of electronic device>on/off]

2) By default, the display on the screen of the virtual reality device is side-by-side on the left and right sides of the screen. However, a user can enter the menu of the virtual reality program, and select to change the screen display on the virtual reality device to a normal display mode. [virtual reality program>display mode>left and right, side-by-side mode/normal display mode] If a user selects to turn on the screen of the electronic device when running the virtual reality program, the screen of the electronic device will have a normal display and not side-by-side. In the left and right, side-by-side mode, the left and right display contents may not be the same. For example, when displaying left and right, side-by-side 3D contents, if there are two left and right screens, the display contents of the two screens will be arranged side-by-side. If there is only one screen, the display contents of the screen will be separated into left and right sides and arranged side-by-side. On the other hand, in the normal display mode, if there are two left and right screens, the display contents of the two screens will be combined. The left side of the screen displays the left half content, and the right side of the screen displays the right half content. If there is only one screen the display content of the screen will be content of a normal single screen.

3) The direction of the screen display content on the virtual reality device depends on the screen viewing direction of the user. The size and proportion of the screen display on the virtual reality device can be adjusted according to the size of the screen. The size is preset whether it is the size of the left and right screens in the left and right, side-by-side mode, or it is the size of the screen in the normal display mode. [virtual reality program>display mode>display proportion>automatic] The above-mentioned adjustment of size and proportion of the screen display content only applies to display contents of changeable size, e.g. web page content, main desktop, etc. However, it does not apply to display contents of unchangeable size and proportion, e.g. movies, photos, etc. Nevertheless, a user can select the original display proportion of the screen of the electronic device as the display proportion of the screen of the virtual reality device, force the screen to display horizontally or vertically, or change the display of content horizontally or vertically according to the gravity sensor of the electronic device. [virtual reality program>display mode>display proportion>manual>force horizontal/force vertical/automatic]

4) The screen of the virtual reality device is always on. The screen will not enter into a sleeping mode or will not be off even if it has been inactive for a certain period of time. The screen will enter sleeping mode or will be turned off only when manually operated by the user.

5) By default, the brightness of the screen on the virtual reality device enters manual mode, and does not rely on the light sensor of the electronic device to control brightness of the screen. However, the user can enter the menu of the virtual reality program, and select automatic brightness mode so that the brightness of the screen can be adjusted by the light sensor of the electronic device. [virtual reality program>display mode>screen brightness>manual/automatic]

6) The size of the display window on the screen of the virtual reality device is adjustable. A user can view the content displayed at a position on the edge of the display content. When the display window is not maximized, the position of the display window on the screen can be adjusted. There may be one or more display windows. Each display window can be different from the other.

Control mode of the virtual reality program of the present application:

1) In the mouse control mode, the touch pad, touch screen, or mouse pad of the electronic device, e.g. the touch screen on the electronic device screen of a smart phone or tablet, will be changed to a mouse touch pad. A mouse cursor will appear on the screen display. Through sliding and clicking on the touch screen, multi-touch can be supported and the user can control the mouse cursor and operate the electronic device. [virtual reality program>control mode>mouse control mode/gesture recognition mode] Also, the pattern, sensitivity and size of the mouse cursor can be adjustable. [virtual reality program>control mode>mouse control mode>mouse cursor pattern selection, sensitivity selection, mouse cursor size selection] Furthermore, under the influence of the gravity sensor of the electronic device, one can normally operate the mouse whether the touch screen on the electronic device is displayed horizontally or vertically.

2) Hand gesture recognition mode is operable under the thermal sensing recognition mode and/or image recognition mode and/or imaging function [virtual reality program>control mode>gesture recognition mode] In the thermal sensing recognition mode and/or image recognition mode, the thermal-sensing lens and/or camera of the virtual reality device can detect the hands of the user, and recognize the change of activities of the hand gesture, movement, finger and position of the hands made by the user so as to operate the electronic device. Under the imaging function, the images of the user's hands will be displayed on the screen. Recognition can be carried out through the motion of the images of the hands at an overlapping position with the original screen content as an operating command, to thereby operate and form interaction between the user's hands and the original screen content, and an interaction mode of a virtual reality. Some examples of method of recognition are shown below. The index finger can replace action of the mouse cursor. Bending of the index finger can be recognized as the operating command of the left key on the mouse, and bending of the middle finger as the operating command of the right key on the mouse. For example, single and/or twice consecutive quick bending of the index finger may represent an enter operation; bending of the index finger for over one second may represent a selection operation; and bending of the middle finger may represent menu selection. Also, the index finger can also replace action of the mouse cursor. Touching of the index finger and the thumb can be recognized as an operating command. A quick touching of the index finger with the thumb may represent an enter operation; and touching of the index finger with the thumb for over one second may represent a selection operation. Also, bending of the index and middle fingers at the same time and moving up or down represent scrolling up or down. Further, the recognition of combination, number, and action of the palm, fist, and outwardly extending fingers can be used as various operating commands.

3) Under normal control mode, the touch screen control method on the touch screen on the screen of the electronic device such as a smart mobile phone or tablet may return to control method under normal situation, which is the control method before getting into the virtual reality device. In the normal control mode in association with transparent mode, the screen of the electronic device is turned on, and the user can operate on the electronic device.

4) Virtual function key control mode is under the mouse control mode and/or the hand gesture recognition mode. Certain function keys on the electronic device and/or the touch screen will be converted into virtual function keys displayed on the screen. Hence, a user wearing the virtual reality device can operate the function keys of the electronic device and/or the touch screen.

Transparent mode of the virtual reality program of the present application:

1) In the virtual reality program, transparent mode can be selected and started. [virtual reality program>transparent function>on/off] Transparent frame appears on the screen. The content of the transparent frame is the instant image captured by the camera of the virtual reality device. The size of the transparent frame can be adjusted. The position of the transparent frame can also be adjusted. Through the transparent mode, a user wearing the virtual reality device can also see the real environment around the user such that hazard when wearing the device can be reduced.

2) In the transparent mode, one can select transparent wallpaper function. [virtual reality program> transparent function>on/off>transparent wallpaper>on/off] Under this function, the wallpaper content transmitted from the electronic device and/or the background content of the display window will be the instant image captured by the camera of the virtual reality device.

Positioning function of the virtual reality program of the present application:

1) When the positioning function is turned on, the activity sensors on the virtual reality device, including accelerometer, electronic compass, gyroscope, etc. will be activated, and related data will be transmitted to the electronic device for analysis. The electronic device can output display content which can be adjusted according to data from the activity sensors and display on the screen of the virtual reality device. That means the content in the display window will be changed accordingly based on the user's activity. [virtual reality program>positioning function>on/off] The user will be situated in a virtual world. The user can also directly turn the positioning function on or off using the positioning function switch on the virtual reality device.

2) Under the positioning function, virtual stationary window mode can be selected. Under the virtual stationary window mode, when a user moves his/her head, the display window will be virtually placed at a fixed position. Of course, as mentioned in the display mode, the user can adjust the position and size of the display window. Under this mode, the content of the display window will not be changed accordingly based on the activity of the user. [virtual reality program>positioning function>on/off>virtual reality/virtual stationary window]

3) Re-positioning function: [virtual reality program>positioning function>on/off>re-positioning] Through the re-positioning function, the electronic device will again, based on the position when the user activates the re-positioning function, define as the straight front of the display content. For example, a user lies down and activates the re-positioning function under the positioning function, the user when lying down can still see the straight front of the display content and the surrounding content.

4) To enhance the positioning function of virtual reality device, a sensor head can be provided on the virtual reality device. The sensing head can be tracked in cooperation with a sensor head base station, and data can be sent back to the electronic device. This can more accurately track the position of the virtual reality device and the activity of the user. [virtual reality program>positioning function>on/off>sensor head positioning>on/off]

The reflect mode of the virtual reality program of the present application is through the use of wireless device of the electronic device or virtual reality device. The wireless device can be Bluetooth, WIFI, WIGIF, or other suitable conventional device, and standard can be MIRACAST or other suitable conventional standard for connecting to other electronic device. The other electronic device means other device that is not connected with the virtual reality device. The other electronic device can be a smart mobile phone, tablet, computer, television, or other electronic product. To enter the reflect mode of the virtual reality program [VR program>reflect mode>on/off>select electronic device to be reflected], a user can select electronic device or virtual reality device, and use wireless device such as Bluetooth/WIFI/WIGIF to search the other electronic device to be connected among the other electronic devices. After the electronic device or the virtual reality device is connected with the other electronic device, the display window on the screen of the virtual reality device can reflect the image output from the other electronic device. Under the reflect mode, the activity sensor data on the virtual reality device can also be directly or through the electronic device re-transmitted to the other electronic device for analysis in order to achieve the positioning function.

Thermal sensing recognition mode of virtual reality program of the present application:

1) In the virtual reality program, thermal sensing recognition mode can be selected and turned on. [virtual reality program>thermal sensing recognition mode>on/off]

2) After the thermal sensing recognition mode is turned on, the thermal-sensing lens on the virtual reality device is activated.

3) Through thermal sensing, the temperatures of the user's hands and the surrounding environment are different under most circumstances. The electronic device can detect and recognize the user's hands and their activity in front of the thermal-sensing lens by the difference in temperature and characteristics such as the shape, position, angle and distance of the user's hands in front of the thermal-sensing lens of the virtual reality device worn by the user under reasonable circumstances.

4) Thermal sensing recognition mode can eliminate other objects other than the user's hands even for objects having a temperature similar to that of the user's hands, such as people walking in front of the thermal-sensing lens.

5) Imaging function exists under the thermal sensing recognition mode. The condition of the user's hands in front of the thermal-sensing lens can be detected by means of thermal sensing, and can be converted into hand images and place into the display content. A user can see the activity of his/her hands on the screen. The images and color of the hands generated by heat sensing are different from those of the real hands. By means of the imaging function, the images of the user's hands detected and recognized in the thermal sensing recognition mode can be filled up by colors which can be selected. [VR program>thermal sensing recognition mode>on/off>imaging color selection] Furthermore, the imaging function can figure out the user's hand's front or back, and left or right by the characteristics such as the shape, position, angle and distance of the user's hands and forearms in front of the thermal-sensing lens of the virtual reality device worn by the user under reasonable circumstances. The imaging function can also add certain characteristics on the surface of the hands, such as nails, joint prints, palm prints, etc. onto corresponding positions in the images of the hands so as to enhance the realness of the images of the hands.

Image recognition mode of the virtual reality program of the present application:

1) In the virtual reality program, image recognition mode can be selected and turned on. [virtual reality program>image recognition mode>on/off]

2) After the image recognition mode is turned on, the camera on the virtual reality device is activated.

3) The electronic device can analyze the instant image captured by the camera on the virtual reality device. The user's hands and their activity can be detected and recognized by the characteristics such as the shape, position, angle and distance of the user's hands in front of the camera of the virtual reality device worn by the user under reasonable circumstances.

4) Image recognition mode can eliminate other objects other than the user's hands, cut out the images of the user's hands, or outline the contour of the user's hands.

5) Imaging function exists under the image recognition mode. The condition of the user's hands in front of the camera can be converted into hand images and place into the display content. A user can see the activity of his/her hands on the screen. The contour or the images of the user's hands can be outlined. By means of the imaging function, the image recognition mode can be recognized, and the contour or images of the user's hands can be filled up by colors, which can be based on the colors of the images of the hands, or can be selected. [VR program>image recognition mode>on/off>imaging color selection>automatic/manual] Furthermore, the imaging function can figure out the user's hand's front or back, and left or right by the characteristics such as the shape, position, angle and distance of the user's hands and forearms in front of the camera of the virtual reality device worn by the user under reasonable circumstances. The imaging function can also add certain characteristics on the surface of the hands, such as nails, joint prints, palm prints, etc. onto corresponding positions in the images of the hands so as to enhance the realness of the images of the hands.

The order of the screen display contents of the virtual display device is that the original display content is at the lowest. Above of that is transparent frame in the transparent mode. Further above are the hand images under the imaging function in the thermal sensing recognition mode or the image recognition mode. The uppermost is the mouse cursor in the mouse control mode.

To have a clear understanding of the technical features, objects and effects of the present application, specific embodiments will now be described in detail with reference to the accompanying drawings.

The present application relates to a virtual reality device 11 which may include an outer frame 20, an electronic board 70, a screen 60, a folding tube 40, a lens frame 30, lenses 33, and a slipover frame 50.

FIGS. 1-2, 17, 18, 36 and 89 show the virtual reality device 11 according to a first embodiment of the present application. The folding tube 40 may be connected between the outer frame 20 and the lens frame 30. The lens frame 30 can be connected with the slipover frame 50. One or more screens 60 may be mounted on the outer frame 20. The screens 60 may be connected with the electronic board 70. The electronic board 70 may be mounted on the outer frame 20, folding tube 40, lens frame 30 or slipover frame 50. The lenses 33 can be mounted on the lens frame 30 or the folding tube 40.

Referring to FIGS. 4-11, 16 and 17, the virtual reality device 11 of the present application may include extending arms 46 provided between the outer frame 20 and/or the lens frame 30. Hinge seats 45 may be provided on the outer frame 20 and/or the lens frame 30. The extending arms 46 can be hingedly connected with the hinge seats 45 so that the angle between the extending arms 46 and the outer frame 20 and/or the extending arms 46 and the lens frame 30 can be adjusted.

Referring to FIGS. 6, 7, 10, 11, 16 and 17, the extending arms 46 between the outer frame 20 and the lens frame 30 of the virtual reality device 11 of the present application can be connected by extending arm hinges 47 so that the angles of the extending arms 46 between the outer frame 20 and the lens frame 30 can be adjusted.

Hence, the outer frame 20, the extending arms 46 on the outer frame 20, the extending arms 46 on the lens frame 30, and the lens frame 30 can be connected together. Through the extending arms 46, the angle between the extending arms 46 and the outer frame 20 as well as the lens frame 30 can be adjusted to thereby form a mechanical structure for adjusting the distance between the outer frame 20 and the lens frame 30.

Referring to FIGS. 12-15 and 18, extending arm position-restricting structures 451 may be provided on the hinge seats 45 and/or the extending arm hinges 47 in the virtual reality device 11 of the present application for fixing the angles between the extending arms 46 and the outer frame 20, the extending arms 46 and the lens frame 30, and the extending arms 46 themselves, thereby restricting the distance between the outer frame 20 and the lens frame 30 such that the user needs to exert a certain force to adjust the angles.

Simply speaking, in the present embodiment, hinge seats 45 may be provided on the outer frame 20 and the lens frame 30. The extending arms 46 can be connected with the hinge seats 45. The extending arms 46 between the outer frame 20 and the lens frame 30 can be connected by extending arm hinges 47 to form a mechanical structure for adjusting the distance between the outer frame 20 and the lens frame 30. Extending arm position-restricting structures 451 may be provided on the hinge seats 45 and/or the extending arm hinges 47 for fixing the angles between the extending arms 46 and the outer frame 20, and the extending arms 46 and the lens frame 30, thereby restricting the distance between the outer frame 20 and the lens frame 30 when they are combined or at a certain distance, e.g. 4 cm.

Referring to FIGS. 4-7 and 22-24, the outer frame 20 of the virtual reality device 11 of the present application may be formed of an outer panel 21 and an outer case 22. The hinge seats 45, the screen 60, and the electronic board 70 can be mounted on the outer panel 21 and/or the outer case 22. The outer panel 21 and/or the outer case 22 can be connected with the folding tube 40. The outer panel 21 and/or the outer case 22 may be made of a transparent material. The screen 60 may also be transparent.

Simply speaking, in the present embodiment, the hinge seats 45 may be provided on the outer case 22. The outer case 22 may be connected with the folding tube 40. The screen 60, electronic board 70, camera 71, thermal-sensing lens 72, sensor head 75 and positioning function switch 842 may be mounted on the outer panel 21.

Referring to FIGS. 4-7, 25 and 26, the lens frame 30 of the virtual reality device 11 of the present application may be formed of a lens panel 31 and a lens case 32. The hinge seats 45, the lenses 33, and the electronic board 70 can be mounted on the lens panel 31 and/or the lens case 32. The lens panel 31 and/or the lens case 32 can be connected with the folding tube 40 or the slipover frame 50. Position-restricting mechanism 35 may be provided between the lens panel 31 and/or the lens case 32 and the slipover frame 50. Sliding and connecting structures 36 may also be provided to adjust the connecting position of the lens frame 30 relative to the slipover frame 50.

Simply speaking, in the present embodiment, the lenses 33 and the hinge seats 45 may be provided on the lens panel 31. The folding tube 40 may be connected between the lens panel 31 and the lens case 32. The lens case 32 can be connected with the slipover frame 40. Position-restricting mechanism 35 may be provided between the lens case 32 and the slipover frame 50. Sliding and connecting structures 36 may also be provided to adjust the position of the lens case 32 relative to the slipover frame 50.

Referring to FIGS. 1-2 and 27-31, the outer frame 20 and the lens frame 30 of the virtual reality device 11 may be connected by the folding tube 40. The folding tube 40 may be made of a soft material, such as cloth, rubber, paper, and other suitable material which is mainly light in weight, soft and foldable. When the outer frame 20 and the lens frame 30 are combined, the folding tube 40 can be folded up and hidden in the space between the outer frame 20 and the lens frame 30. This makes the device easy to carry and reduces its weight.

Figure 27:
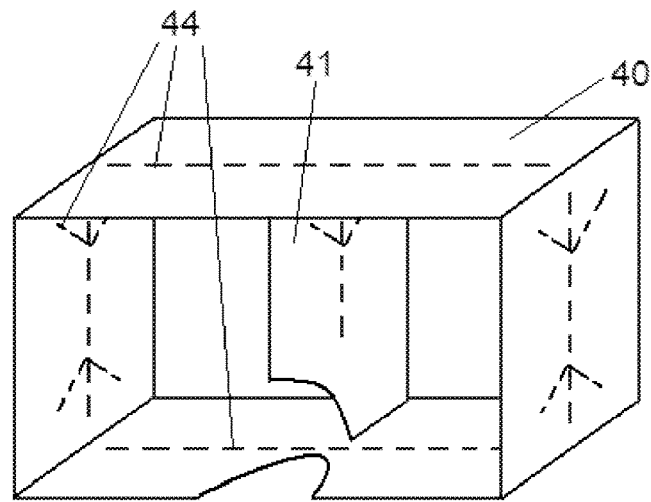
FIG. 27 is a perspective view from the rear, right and top sides of the folding tube of the virtual reality device shown in FIG. 1 being expanded.
Figure 28:
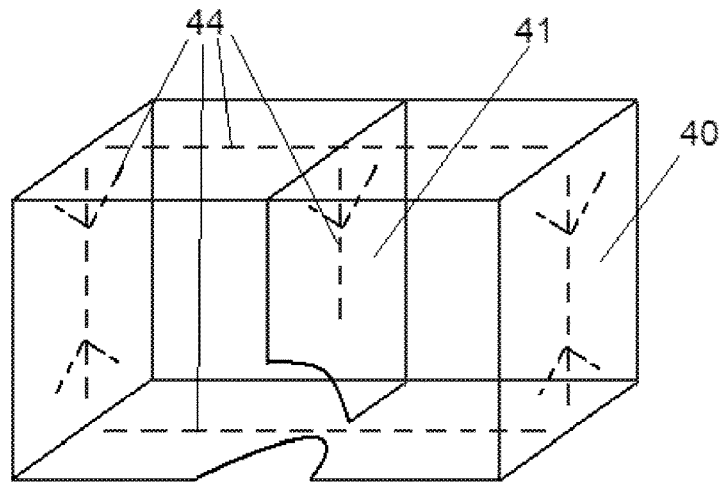
FIG. 28 is a transparent perspective view from the rear, right and top sides of the expanded folding tube of the virtual reality device shown in FIG. 1.
Figure 29:
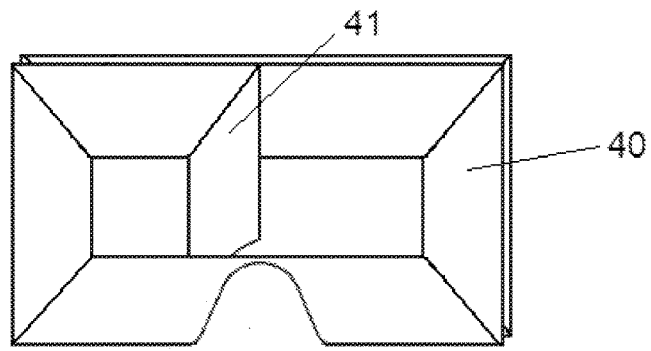
FIG. 29 is a perspective view from the rear, right and top sides of the folded folding tube of the virtual reality device shown in FIG. 1.

Referring to FIGS. 27-29, a separating sheet 41 may be provided in the folding tube 40 of the virtual reality device 11 of the present application. The upper and lower ends of the separating sheet 41 may be connected with the inner surfaces of the upper and lower sheets of the folding tube 40 respectively. When the folding tube 40 is expanded, the separating sheet 41 is erected vertically in the middle of the folding tube 40 to thereby separate the folding tube 40 into a left spacing and a right spacing such that viewing of the screen on the outer frame 20 of the left and right eyes of the user can be separated.

Figure 30:
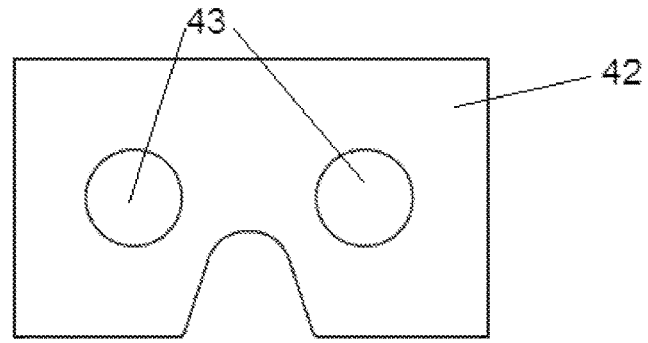
FIG. 30 is an illustrative diagram of the lens frame sheet of the virtual reality device.
Figure 31:
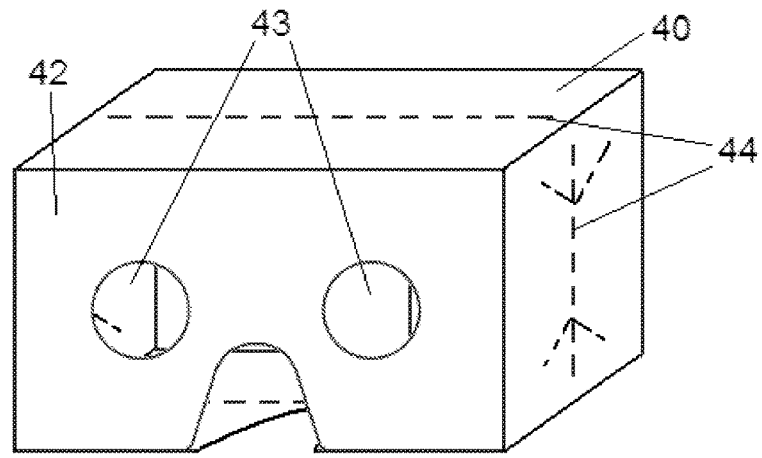
FIG. 31 is a perspective view from the rear, right and top sides of the expanded folding tube of the virtual reality device shown in FIG. 1 connected with the lens frame sheet.
Figure 32:
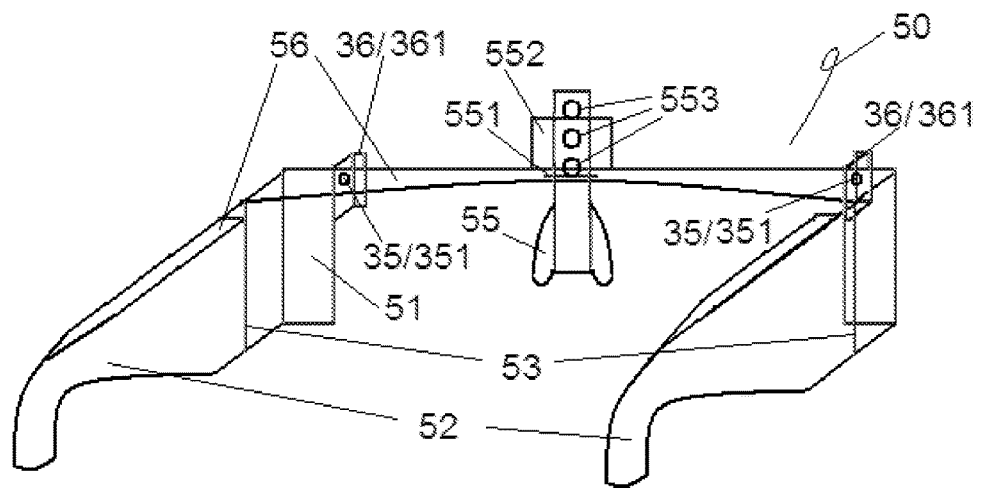
FIG. 32 is a transparent perspective view from the rear, right and top sides of the expanded slipover frame of the virtual reality device shown in FIG. 1.
Figure 33:
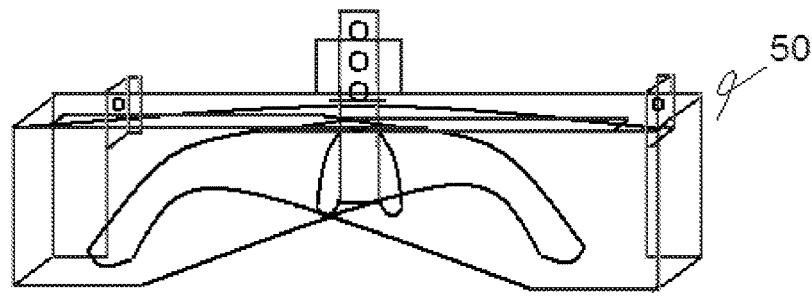
FIG. 33 is a transparent perspective view from the rear, right and top sides of the folded slipover frame of the virtual reality device shown in FIG. 1.
Figure 34:
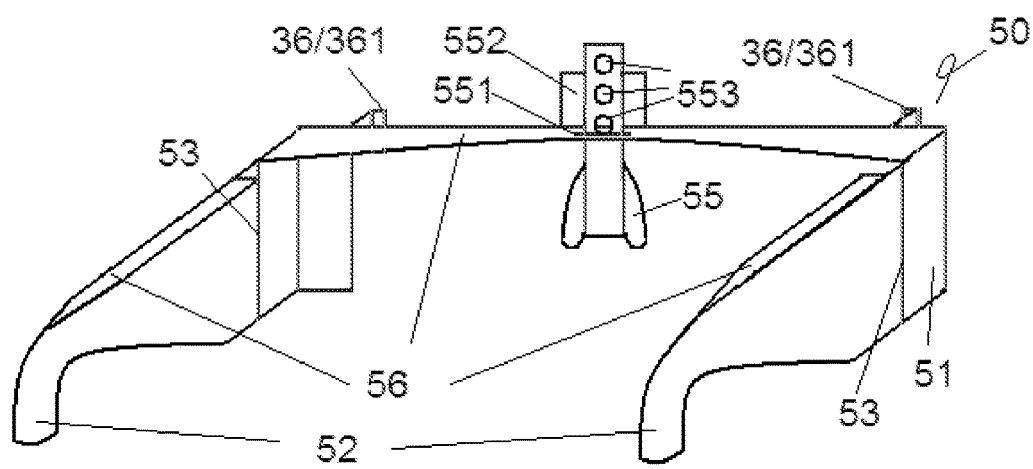
FIG. 34 is a perspective view from the rear, right and top sides of the expanded slipover frame of the virtual reality device shown in FIG. 1.
Figure 35:
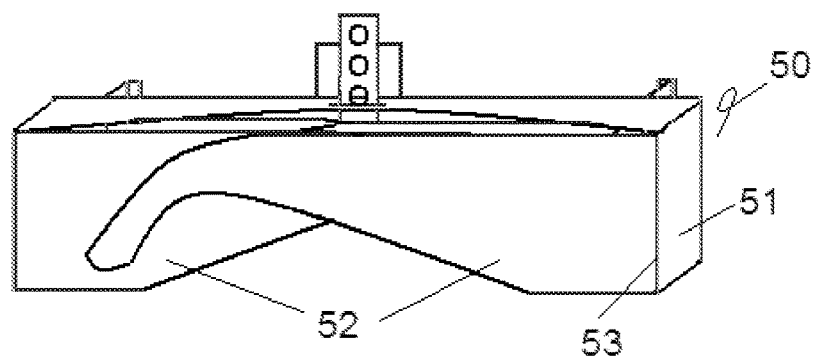
FIG. 35 is a perspective view from the rear, right and top sides of the folded slipover frame of the virtual reality device shown in FIG. 1.
Figure 36:
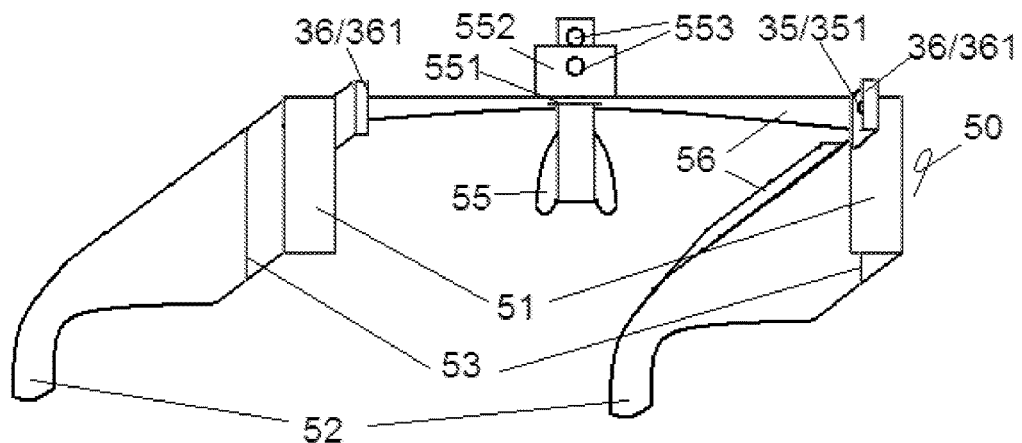
FIG. 36 is a perspective view from the front, right and bottom sides of the expanded slipover frame of the virtual reality device shown in FIG. 1.
Figure 37:
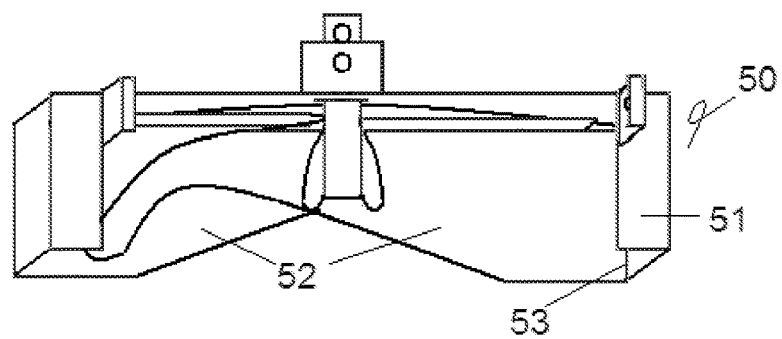
FIG. 37 is a perspective view from the front, right and bottom sides of the folded slipover frame of the virtual reality device shown in FIG. 1.
Figure 38:
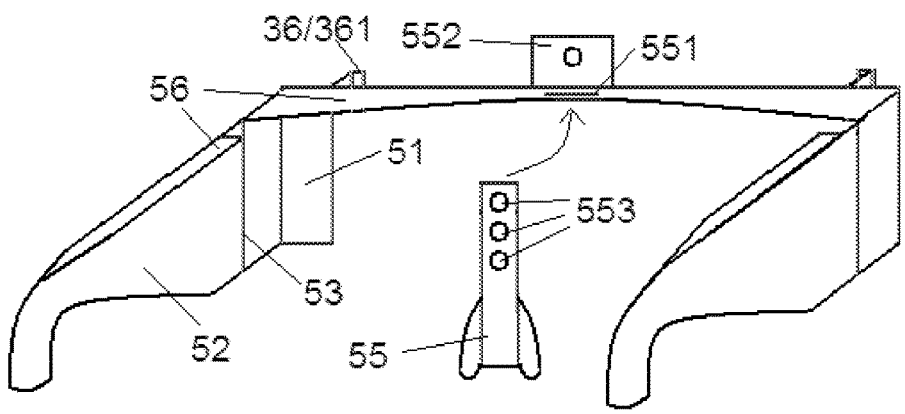
FIG. 38 is an illustrative diagram showing the insertion of a nose support into the slipover frame of the virtual reality device shown in FIG. 1.
Figure 39:
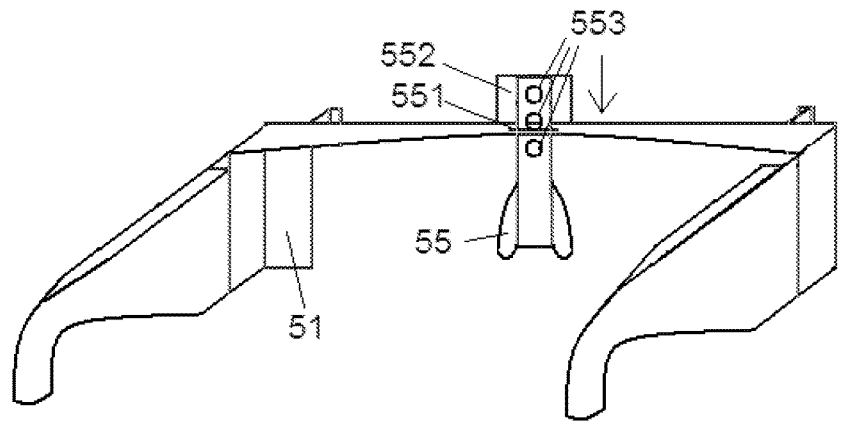
FIG. 39 is an illustrative diagram showing the fixation of the nose support at a lower position of the slipover frame of the virtual reality device shown in FIG. 1.
Figure 40:
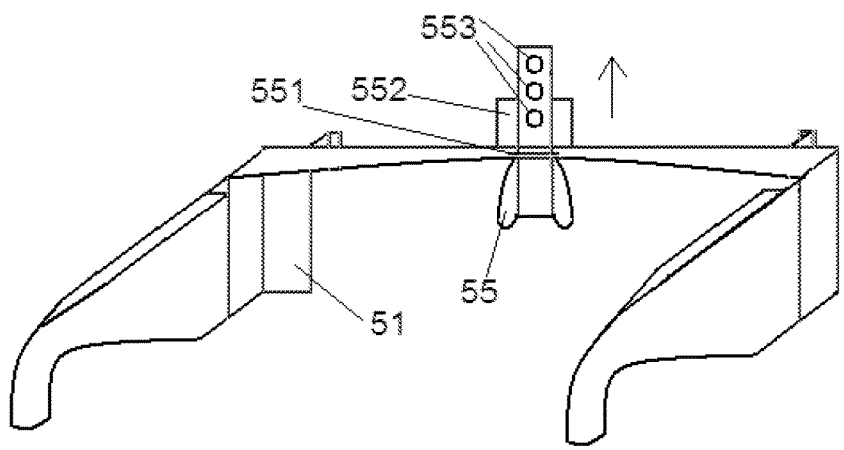
FIG. 40 is an illustrative diagram showing the fixation of the nose support at a higher position of the slipover frame of the virtual reality device shown in FIG. 1.

Referring to FIGS. 30 and 31, the folding tube 40 of the virtual reality device 11 of the present application may be provided with a lens frame sheet 42 formed with lens apertures 43. The lens apertures 43 correspond to the lens positions on the lens frame 30, or the lenses 33 can be directly mounted in the lens apertures 43. It is not necessary to mount the lenses 33 on the lens frame 30. The user can view the screen 60 through the lens apertures 43 and the lenses 33. The design of the lens frame sheet 42 can further save some space on the lens frame 30 so that the weight of the lens frame 30 can be reduced.

Referring to FIGS. 1-2, 27-29 and 31, fold lines 44 can be preset on the folding tube 40 of the virtual reality device 11 of the present application. The fold lines 44 can allow the folding tube 40 to be folded according to the preset fold lines 44 so as to avoid dropping of the folding tube 40 on the outer frame 20 and the lens frame 30, thereby enhancing convenience and storage capability.

Figure 17:
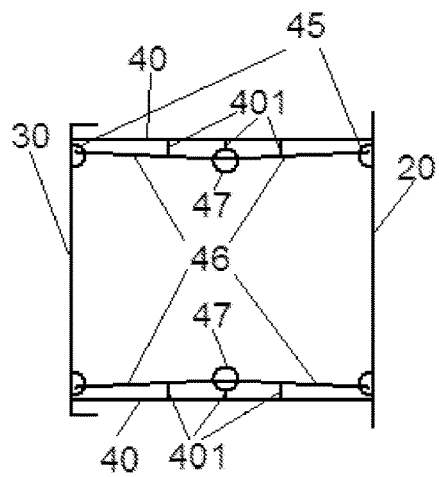
FIG. 17 shows FIG. 16 with the inclusion of linking lines of the folding tube.

Referring to FIG. 17, the folding tube 40 of the virtual reality device 11 of the present application may utilize linking lines 401 for linking the extending arms 46 and/or the extending arm hinges 47 such that the form and folding of the folding tube 40 can be changed according to the movement of the extending arms 46. This can reduce deformation of the folding tube 40, and lower the chance of dropping the folding tube 40 on the outer frame 20 and the lens frame 30 when the outer frame 20 and the lens frames 30 are combined.

Referring to FIGS. 1-2, 4-18, 22-40 and 42-45, the total weight of the outer frame 20, the screen 60, the folding tube 40, the lens frame 30 and the lenses 33 of the virtual reality device 11 may be 55 grams or less. The reduction of weight is resulted in the combined structure of the outer frame 20, the folding tube 40, the lens frame 30 and the extending arms 46, and can enhance the usability and comfort of the device when in use.

Referring to FIGS. 1-2 and 42-45, the lens frame 30 of the virtual reality device 11 of the present application can be connected with the slipover frame 50. One or more position-restricting mechanisms 35 can be provided between the lens frame 30 and a front slipover 51 of the slipover frame 50. One side of the position-restricting mechanism 35 can be a male position-restricting mechanism 351, which may be a spring plate, spring action bead, push button, rotatable knob, screw, snap buckle, clip, or other suitable position-restricting device structure. The other side of the position-restricting mechanism 35 can be a female position-restricting mechanism 352, which may be one or more recesses, openings, screw seats, or other suitable structures. The two sides can be coupled together to form the position-restricting mechanism 35 to restrict and adjust the position of the lens frame 30 relative to the slipover frame 50 and/or connect the lens frame 30 with the slipover frame 50. When the position-restricting mechanisms 35 are released, the lens frame 30 and the slipover frame 50 can be separated and/or activated. Two or more female position-restricting mechanisms 352/male position-restricting mechanisms 351 can produce one or more vertical columns on one side, which cooperate with the male position-restricting mechanisms 351/female position-restricting mechanisms 352 on the other side, thereby selecting upward or downward connecting position of the lens frame 30 relative to the slipover frame 50. Also, one or more sliding and connecting structures 36 can be provided between the lens frame 30 and the front slipover 51 of the slipover frame 50. The sliding and connecting structures 36 can be in the form of a telescope, track, or encirclement. One side can be a male slide and connect 361 which can be a rod, hook, interlock, or other suitable conventional structure. The other side can be a female slide and connect 362 which can be a sleeve, loop, track, or other suitable conventional structure. The two sides can cooperate to form the sliding and connecting structure 36. This renders up or down sliding movement between the lens frame 30 and the slipover frame 50 according to preset tracks on the sliding and connecting structure 36, and changes the relative up or down position of the lens frame 30 and the slipover frame 50. The sliding and connecting structure 36 can be used in association with the position-restricting mechanism 35, or they can be combined together. A user can align his/her eyes with the lenses 33 on the lens frame 30 by means of adjusting the position of the lens frame 30 relative to the slipover frame 50, especially for a user wearing eyeglasses. Since eyeglasses have different shapes and sizes, it is necessary to flexibly adjust the position of the lenses 33 on the lens frame 30 when wearing the device.

Simply speaking, in the present embodiment, the two outer sides of the lens case 32 of the lens frame 30 can be provided with track and recess. The slipover frame 50 can be provided with interlocks and position-restricting devices. The track and interlock can form the sliding and connecting structure 36. The recess and the position-restricting device can form the position-restricting mechanism 35. The interlocks can couple with the track, and the position-restricting device can couple with the recess so that the position of the lens frame 30 relative to the slipover frame 50 can be adjusted.

Referring to FIGS. 32-37, the slipover frame 50 of the virtual reality device 11 of the present application may be formed of a front slipover 51 and side slipovers 52. Slipover hinges 53 may be provided between the front and side slipovers 51, 52 such that the angle between the front and side slipovers 51, 52 can be adjusted, and the side slipovers 52 can be folded towards the front slipover 51 for easy storage.

Referring to FIGS. 1-2 and 32-37, the slipover frame 50 of the virtual reality device 11 of the present application may be provided with slipover plates 56. The slipover plates 56 may be disposed at the top or bottom inside the front and side slipovers 51, 52 such that the slipover frame 50 can be slip over eyeglasses, and a user wearing eyeglasses can wear the virtual reality device 11.

Referring to FIGS. 32-40, a nose support 55 can be provided on the front slipover 51 of the slipover frame 50 of the virtual reality device 11 of the present application. The front slipover 51 may be provided with one or more nose support openings 551 and a nose support position-restricting device 552. The nose support position-restricting device 552 can be a push button, rotatable knob, screw, snap buckle, clip, or other suitable conventional structure. The nose support 55 can be inserted into the nose support opening 551, and a nose support aperture 553 on the nose support 55 can be used to couple with the nose support position-restricting device 552 such that the nose support 55 can be fixedly connected with the front slipover 51. The nose support 55 may be provided with one or more nose support apertures 553. The nose support apertures 553 may be arranged in one or more vertical columns. Through the coupling of different nose support apertures 553 with the nose support position-restricting device 552, a user can adjust the up or down position of the nose support 55 on the front slipover 51 so as to find out a suitable position for the user.

Figure 2:
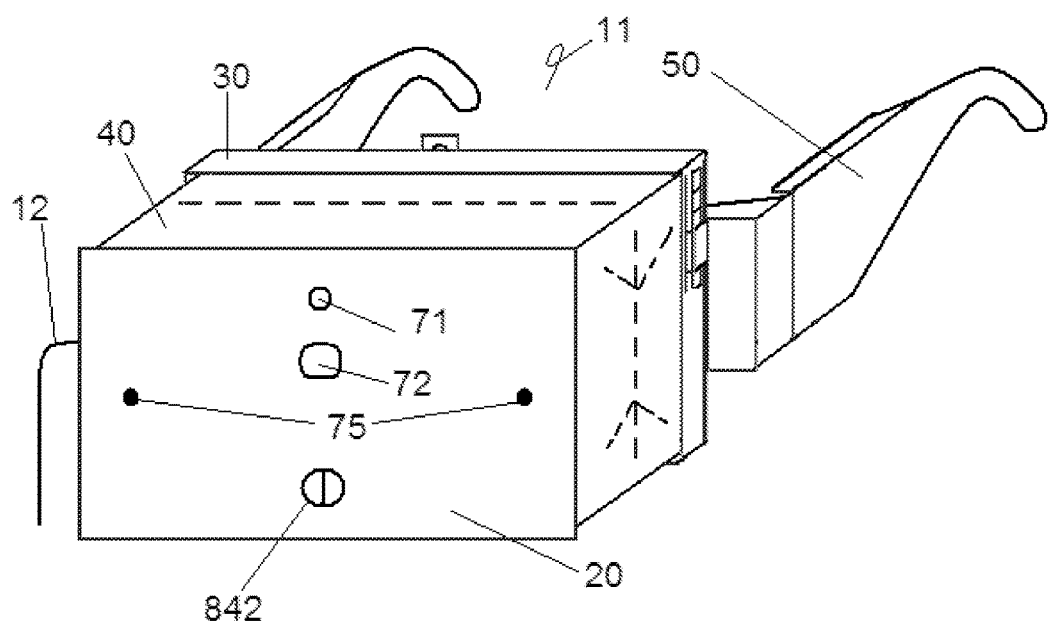
FIG. 2 is a perspective view from the front, left and top sides of the virtual reality device according to the first embodiment of the present application.
Figure 89:
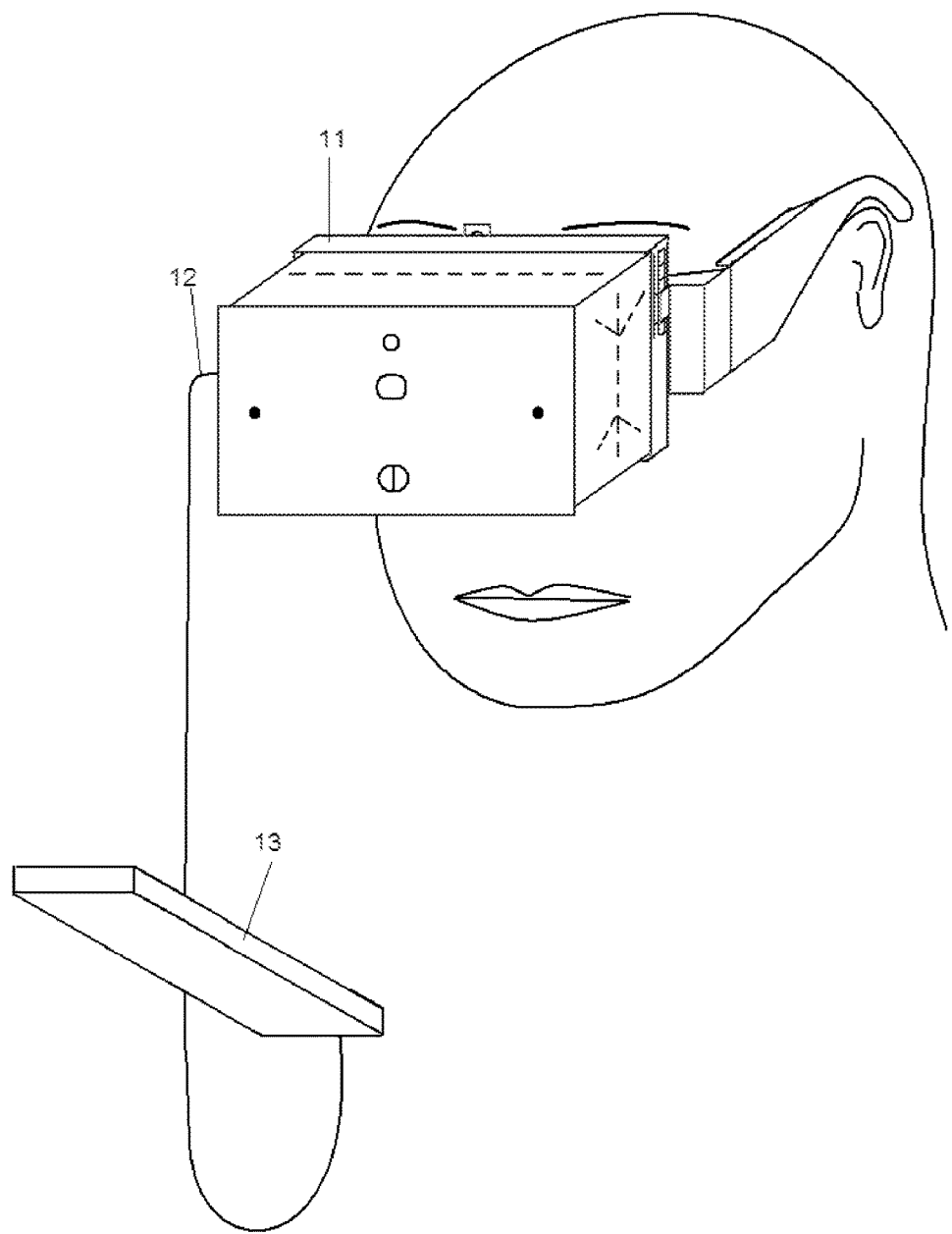
FIG. 89 is a perspective view from the front, left and top sides of the virtual reality device shown in FIG. 1 which is connected with the electronic device and worn on the user's head.

Referring to FIGS. 1-2 and 89, the virtual reality device 11 of the present application is provided with a slipover frame 50 and has a light-weight design. Therefore, it is not necessary to hoop the virtual reality device 11 around the head of a user and no backward force and/or upward force would be exerted on the user's head when in use. It also allows the mounting of the virtual reality device 11 over eyeglasses.

Figure 46:
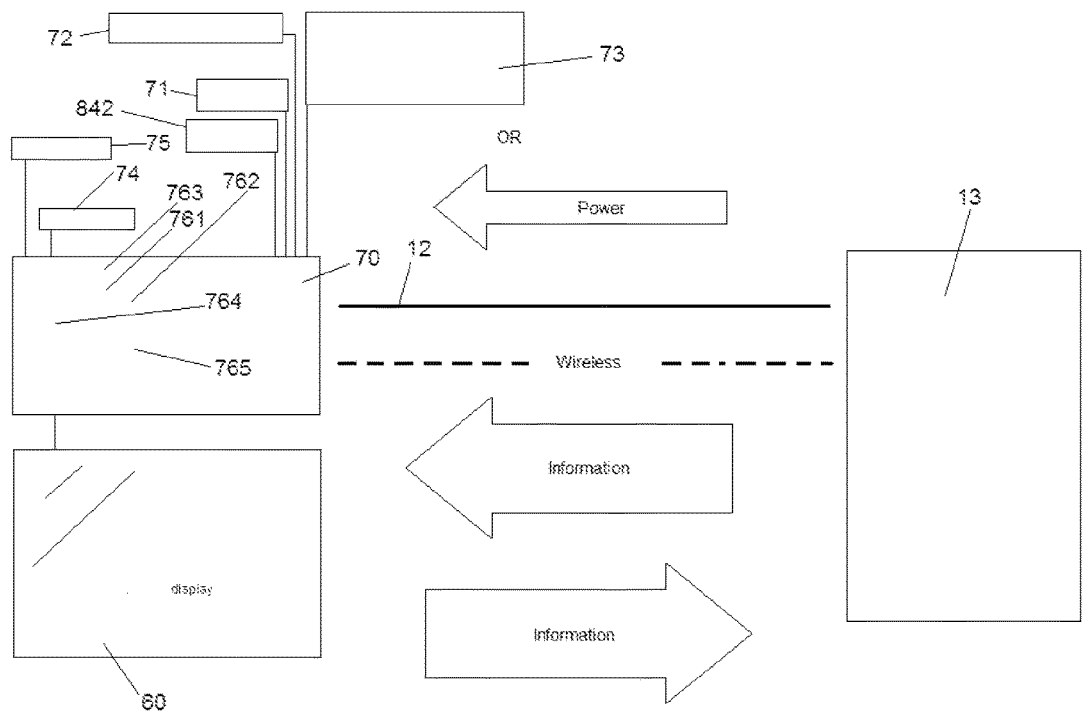
FIG. 46 is an illustrative diagram showing the peripheral components of the electronic board, and the connection relationship of the electronic devices of the virtual reality device shown in FIG. 1.

Referring to FIG. 46, the electronic board 70 of the virtual reality device 11 of the present embodiment may be coupled with the screen 60 and/or camera 71 and/or thermal-sensing lens 72 and/or battery 73 and/or sensor head 75. The electronic board 70 may be provided with an integrated circuit chip 764, an accelerometer 761, an electronic compass 762, a gyroscope 763, a wireless transceiver device 765, etc. The electronic board 70 may have audio output. The audio output can be interface or earphone 74. The electronic board 70 may have a connecting wire 12 for connecting with the electronic device 13 for transmitting power and/or information such as video, gyroscope information, and camera information, etc. The electronic board 70 can be installed on the outer frame 20, the folding tube 40, the lens frame 30 or the slipover frame 50. Battery 73 can be mounted on the outer frame 20, the folding tube 40, the lens frame 30 or the slipover frame 50.

Figure 49:
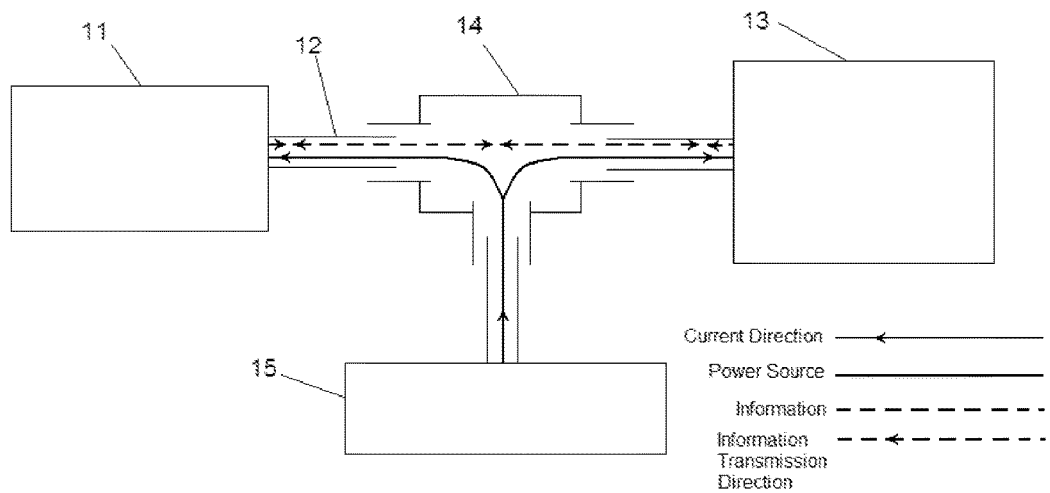
FIG. 49 is an illustrative diagram showing the principle of relationship of the virtual reality device shown in FIG. 1 when the virtual reality device, the electronic device, and the external power source are connected with the electric current managing device at the same time.
Figure 50:
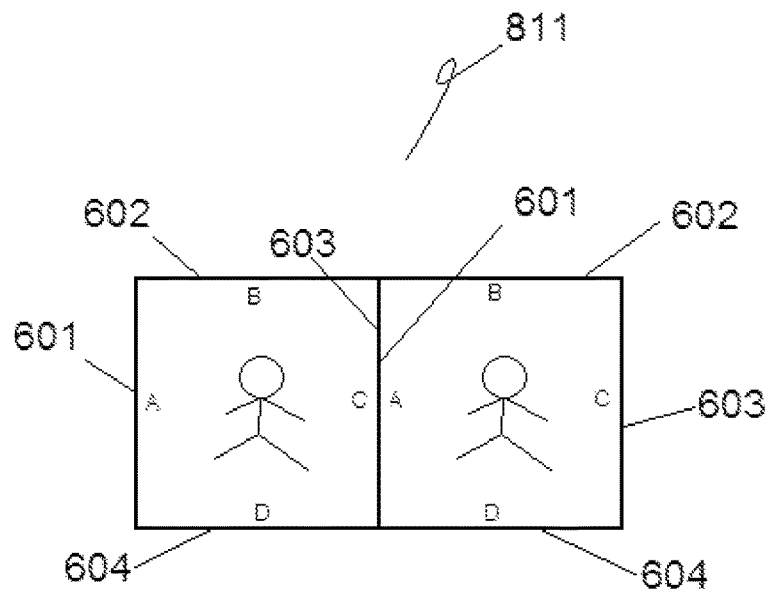
FIG. 50 is an illustrative diagram showing left and right, side-by-side mode of display on the screen of the virtual reality device shown in FIG. 1.

Referring to FIGS. 2, 46 and 49, the virtual reality device 11 of the present application may include one or more cameras 71 and/or thermal-sensing lens 72 which may be mounted on the outer frame 20 with lens facing outwardly from the outer frame 20.

Referring to FIGS. 2, 46 and 49, the virtual reality device 11 of the present application may include a positioning function switch 842 for switching the positioning function on or off.

Figure 47:
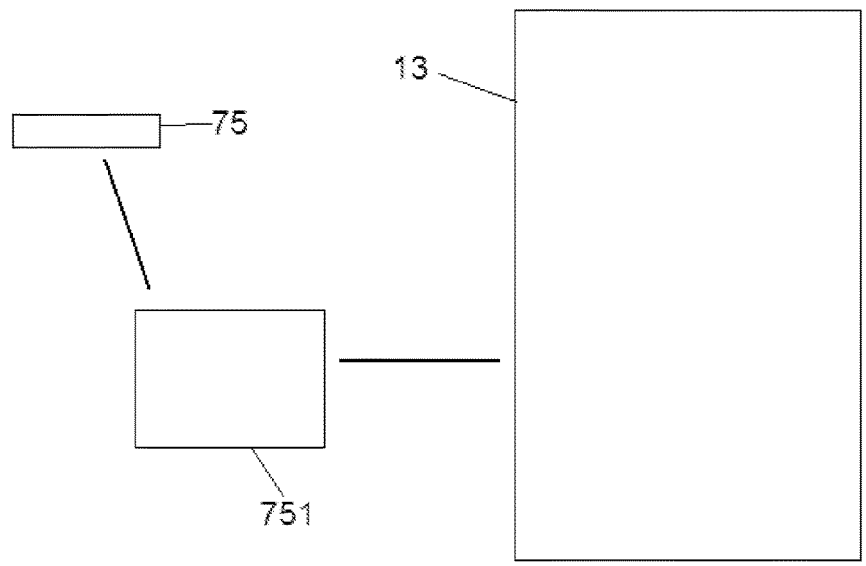
FIG. 47 is an illustrative diagram showing the connection relationship of the sensor head, sensor head base station and electronic devices of the virtual reality device shown in FIG. 1.

Referring to FIGS. 2, 46 and 47, the virtual reality device 11 of the present application and/or the electronic device 13 may be provided with one or more sensor heads 75, and a sensor head base station 751 for tracking the sensor heads 75, and sending data back to the electronic device 13. This can more accurately track the position of the virtual reality device 11 and the activity of the user. The sensor heads 75 may be of infrared type.

Referring to FIGS. 1-2, 46 and 89, the virtual reality device 11 of the present application may be connected with the electronic device 13 through one or more connecting wires 12. The connecting wires 12 can be fixedly or detachably connected to the virtual reality device 11 and/or the electronic device 13. Through the connecting wires 12, power and/or information can be transmitted between the virtual reality device 11 and the electronic device 13. For example, the virtual reality device 11 can transmit information from the accelerometer 761, electronic compass 762, gyroscope 763, camera 71, thermal-sensing lens 72, etc. to the electronic device 13. On the other hand, the electronic device 13 can transmit information such as video and audio signal to the virtual reality device 11. Through the connecting wires 12, the electronic device 13 can also transmit power to the virtual reality device 11 for its operation. The connecting wires 12 can be USB and/or HDMI and/or DISPLAY PORT and/or MIN and/or LIGHTING and/or THURDERBOLT, or other suitable conventional standard connecting wires.

Referring to FIGS. 1-2, 46 and 89, the USB cable port of the connecting wires 12 of the present application can be MICRO USB, or USB3.1 TYPE-C. The USB wire can have MHL and/or OTG standard.

Referring to FIG. 46, the virtual reality device 11 of the present application can also be connected with the electronic device 13 by a wireless device 765 for wireless transmission between the virtual reality device 11 and the electronic device 13. The wireless device 765 can be WIFI, WIGIF, or other suitable conventional device. Standard can be MIRACAST or other suitable conventional standard. The connection between the virtual reality device 11 of the present application and the electronic device 13 can be through an open wire or wireless.

Referring to FIGS. 46 and 89, the electronic device 13 of the present application can be smart phone, tablet, computer, electronic game device, touch pad, etc.

Figure 48:
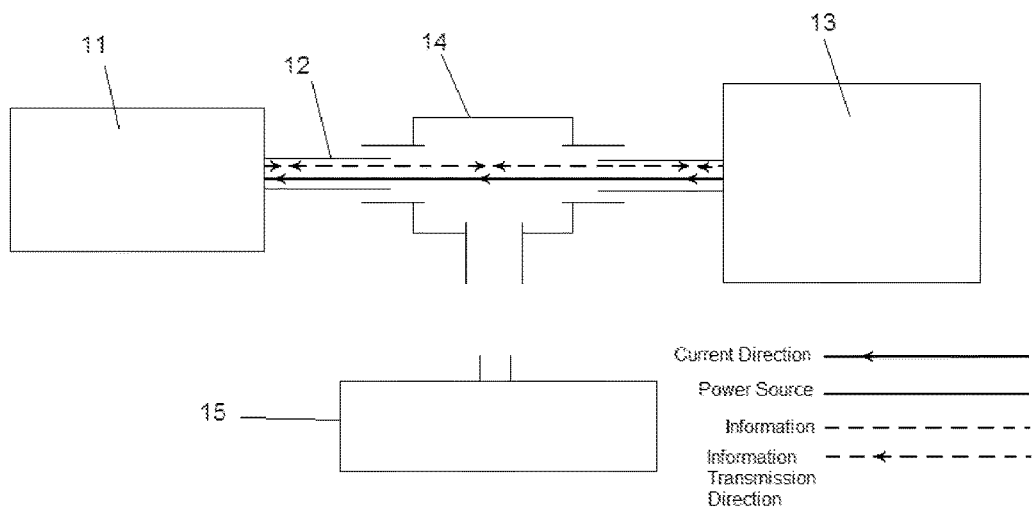
FIG. 48 is an illustrative diagram showing the principle of relationship of the virtual reality device shown in FIG. 1 when the virtual reality device and the electronic device are connected with the electric current managing device, and the external power source is not connected with the electric current managing device.

Referring to FIGS. 48 and 49, the electric current managing device 14 of the present application can manage the electric current between the virtual reality device 11, the electronic device 13 and the external power source 15. The electric current managing device 14 may have three electric current managing device interfaces, namely virtual reality device interface 141, electronic device interface 142, and external power source interface 143. The interface can be USB, HDMI, power source cable, or other suitable conventional standard. The connecting wires 12 of the virtual reality device 11 may also fixedly connect with the electric current managing device 14 such that it does not require a virtual reality device interface 141. As shown in FIG. 48, when the virtual reality device 11 and the electronic device 13 are connected with the electric current managing device 14, and the external power source 15 is not connected with the electric current managing device 14 or the external power source 15 is out of power, the electronic device 13 will supply power to the virtual reality device 11 through the electric current managing device 14. The virtual reality device 11 and the electronic device 13 can also exchange information through the electric current managing device 14. However, when the external power source 15 is connected with the electric current managing device 14 and the external power source 15 can supply power, the electric current managing device 14 can control the electric current. The electronic device 13 will no longer supply power to the virtual reality device 11. Further, the external power source 15 will simultaneously supply power to the virtual reality device 11 and the electronic device 13. However, the exchange of information between the virtual reality device 11 and the electronic device 13 through the electric current managing device 14 remains unchanged. Through the electric current managing device 14, it can ensure that when the electronic device 13 does not have sufficient power and requires the use of external power source, the electronic device 13 and the virtual reality device 11 can continue to operate, especially for electronic device, such as smart phone and tablet, which has only one USB interface.

Figure 92:
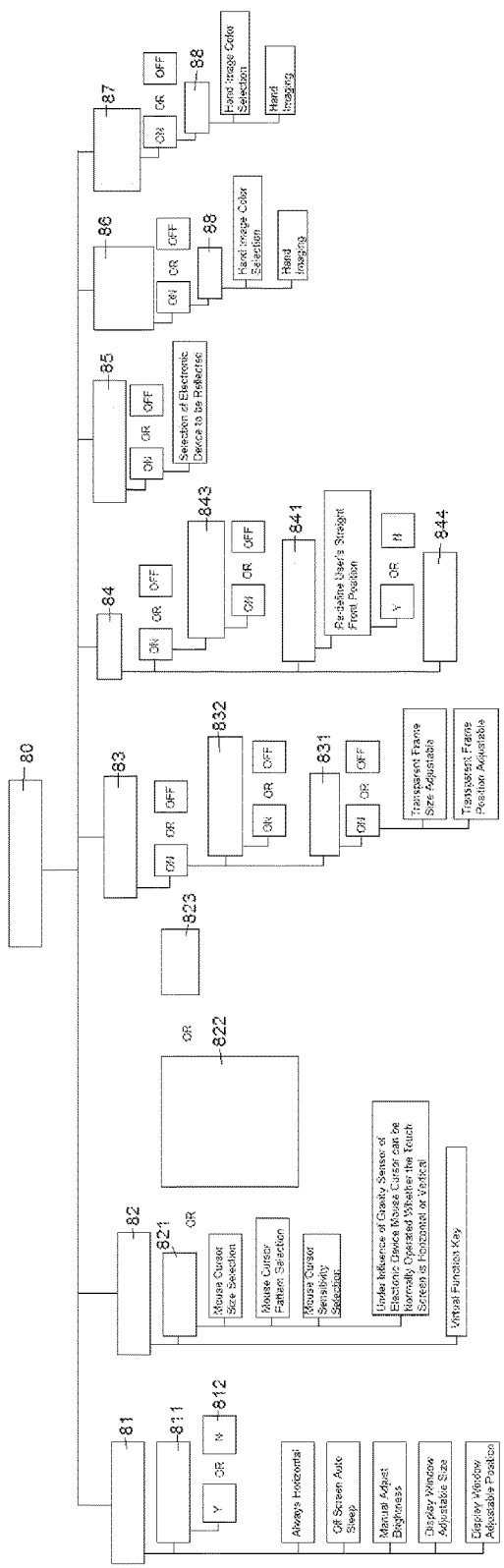
FIG. 92 is an illustrative diagram of the virtual reality device in FIG. 1 connected with electronic devices which operate various functions of the virtual reality program.

Referring to FIGS. 46, 89 and 92, the electronic device 13 of the present application can be installed with a virtual reality program 80. When the electronic device 13 detects and connects with the virtual reality device 11, the electronic device 13 gets into the virtual reality program 80, and starts the virtual reality device 11. The electronic device 13 and the virtual reality device 11 start to exchange information and/or power.

FIGS. 50-54 and 92 show the display mode 81 of the virtual reality program 80 of the present application.

Figure 51:
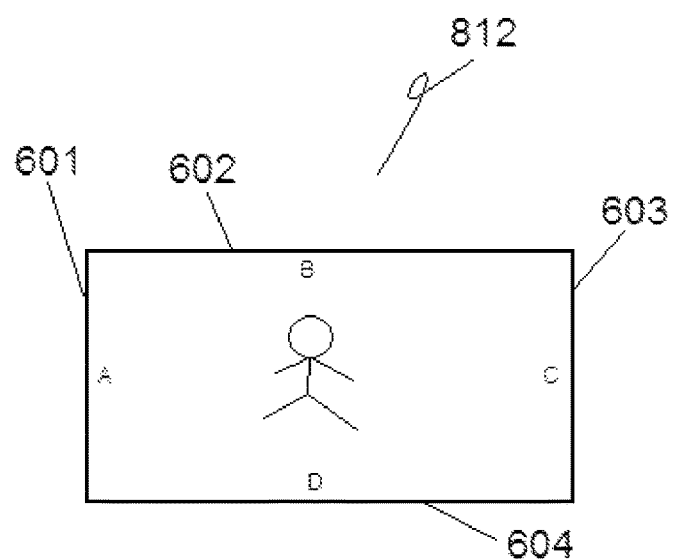
FIG. 51 is an illustrative diagram showing a regular mode of display on the screen of the virtual reality device shown in FIG. 1.

1) By default, the screen 60 of the virtual reality device 11 is on, and the electronic device screen 131 is off. However, a user can enter the menu of the virtual reality program 80 and select to turn on the electronic device screen 131 when running the virtual reality program 80. [virtual reality program>display mode>screen of electronic device>on/off]
2) By default, the display on the screen 60 of the virtual reality device 11 can be in a left and right, side-by-side mode 811. However, a user can enter the menu of the virtual reality program 80, and select to change the screen display on the virtual reality device 11 to a normal display mode 812, as shown in FIG. 51. [virtual reality program>display mode>left and right, side-by-side mode/normal display mode] As shown in FIG. 51, if a user selects to turn on the electronic device screen 131 when running the virtual reality program 80, the electronic device screen 131 will have a normal display and not side-by-side. In the left and right, side-by-side mode 811, the left and right display contents may not be the same. For example, when displaying left and right, side-by-side 3D contents, if there are two left and right screens, the display contents of the two screens 60 will be arranged side-by-side. If there is only one screen 60, the display contents of the screen 60 will be separated into left and right sides and arranged side-by-side. On the other hand, in the normal display mode 812, if there are two left and right screens 60, the display contents of the two screens 60 will be combined. The left side of the screen 60 displays the left half content, and the right side of the screen 60 displays the right half content. If there is only one screen 60, the display content of the screen 60 will be content of a normal single screen.
3) The display content of the screen 60 on the virtual reality device 11 has a top side B 602, bottom side D 604, left side A 601, and right side C 603. The size and proportion of the display on the screen 60 of the virtual reality device 11 can be adjusted according to the size of the screen 60. The size is preset whether it is the size of the left and right screens in the left and right, side-by-side mode 811, or it is the size of the screen in the normal display mode 812. [virtual reality program>display mode>display proportion>automatic] The above-mentioned adjustment of size and proportion of the screen display content only applies to display contents of changeable size, e.g. web page content, main desktop, etc. However, it does not apply to display contents of unchangeable size and proportion, e.g. movies, photos, etc. Nevertheless, a user can select the original display proportion of the electronic device screen 131 as the display proportion of the screen 60 of the virtual reality device 11, force the screen 60 to display horizontally or vertically, or change the display of content horizontally or vertically according to the gravity sensor of the electronic device 13. [virtual reality program>display mode>display proportion>manual>force horizontal/force vertical/automatic]
4) The screen 60 of the virtual reality device 11 is in an always on mode 813. The screen 60 will not enter into a sleeping mode or will not be turned off even if it has been inactive for a certain period of time. The screen 60 will enter sleeping mode or will be turned off only when manually operated by the user.
5) By default, the brightness of the screen 60 on the virtual reality device 11 enters manual mode, and does not rely on the light sensor of the electronic device 13 to control brightness of the screen 60. However, the user can enter the menu of the virtual reality program, and select automatic brightness mode so that the brightness of the screen 60 can be adjusted by the light sensor of the electronic device 13. [virtual reality program>display mode>screen brightness>manual/automatic]

Figure 52:
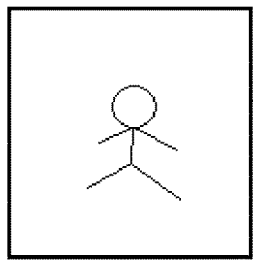
FIG. 52 is an illustrative diagram showing a maximized display window on the screen of the virtual reality device shown in FIG. 1.
Figure 53:
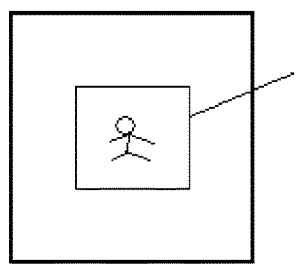
FIG. 53 is an illustrative diagram showing a smaller display window on the screen of the virtual reality device shown in FIG. 1.
Figure 54:
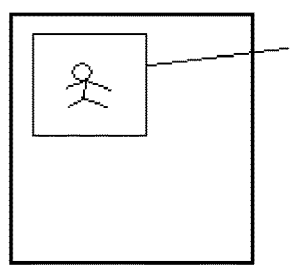
FIG. 54 is an illustrative diagram showing a display window at a different location on the screen.

6) As shown in FIGS. 52 and 53, the size of the display window 61 on the screen 60 of the virtual reality device 11 is adjustable. A user can view the content displayed at a position on the edge of the display content. As shown in FIGS. 53 and 54, when the display window 61 is not maximized, the position of the display window 61 on the screen 60 can be adjusted. There may be one or more display windows 61. Each display window 61 can be different from the other.

FIGS. 55-69 and 92 show the control mode 82 of the virtual reality program 80 of the present application.

Figure 55:
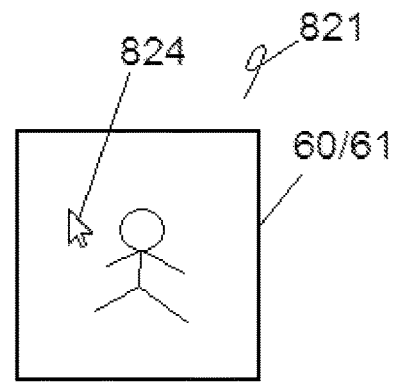
FIG. 55 is an illustrative diagram showing a mouse cursor on the screen under a mouse control mode for the operation of the electronic device of the virtual reality device shown in FIG. 1.
Figure 56:
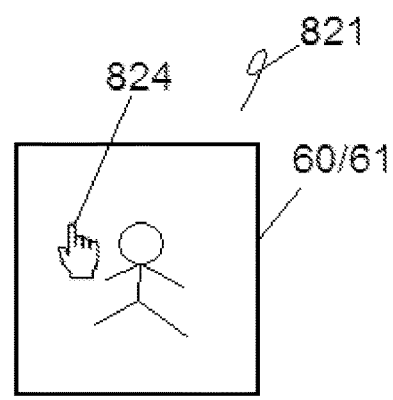
FIG. 56 is an illustrative diagram of FIG. 55 with a different mouse cursor pattern.
Figure 57:
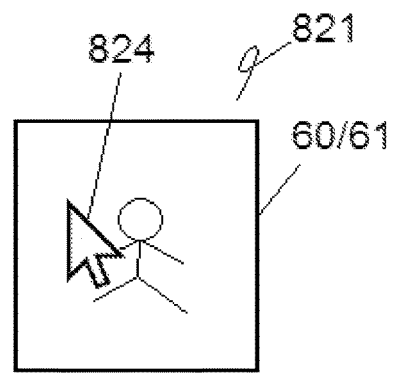
FIG. 57 is an illustrative diagram of FIG. 55 with a larger mouse cursor.
Figure 58:
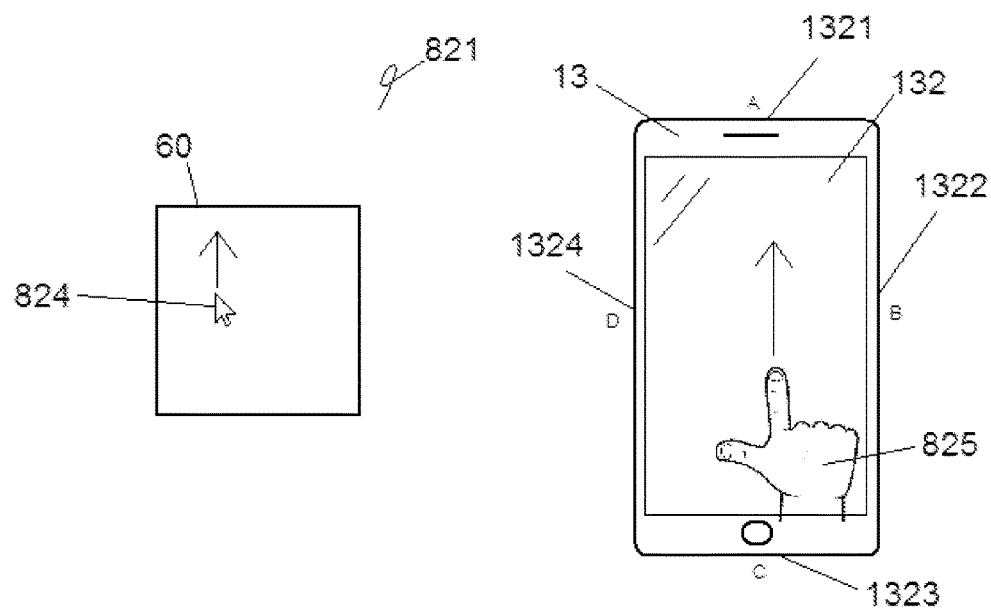
FIG. 58 is a relationship diagram of the virtual reality device in FIG. 1 showing upward movement of the mouse cursor on the screen in response to sliding of a user's finger towards side A on a vertical touch screen of the electronic device.
Figure 59:
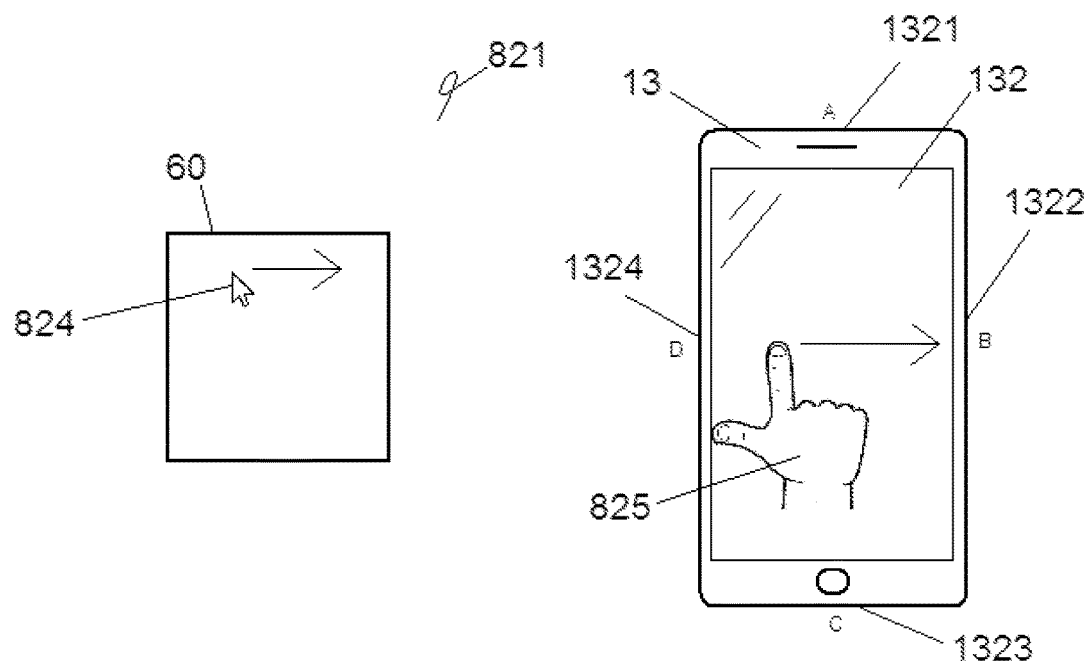
FIG. 59 is a relationship diagram of the virtual reality device in FIG. 1 showing movement of the mouse cursor to the right on the screen in response to sliding of a user's finger towards side B on a vertical touch screen of the electronic device.
Figure 60:
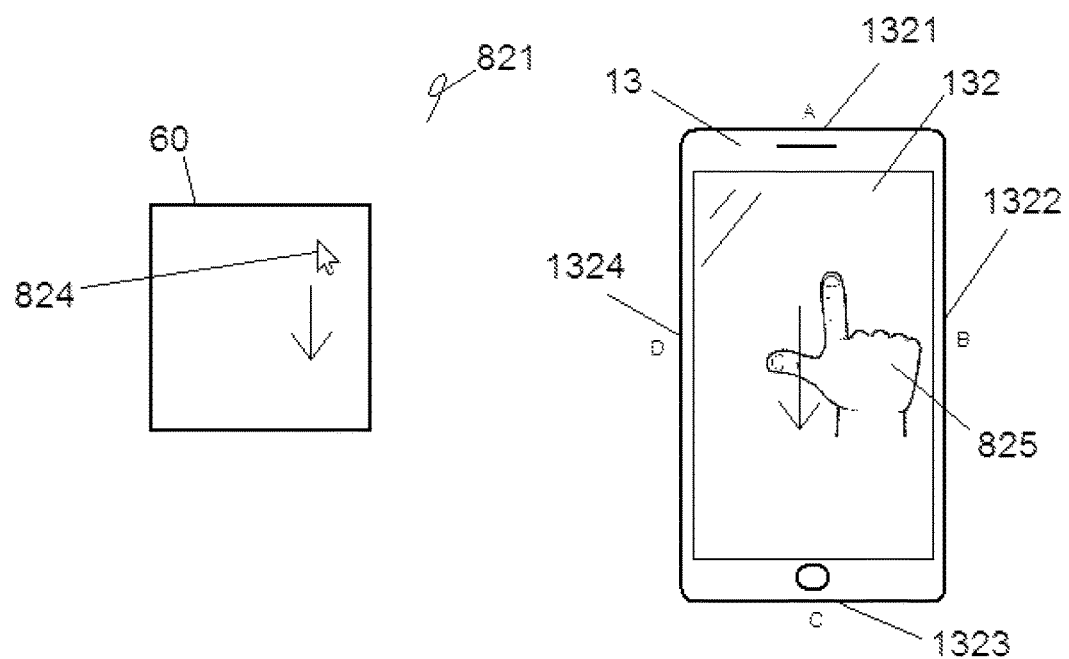
FIG. 60 is a relationship diagram of the virtual reality device in FIG. 1 showing downward movement of the mouse cursor on the screen in response to sliding of a user's finger towards side C on a vertical touch screen of the electronic device.
Figure 61:
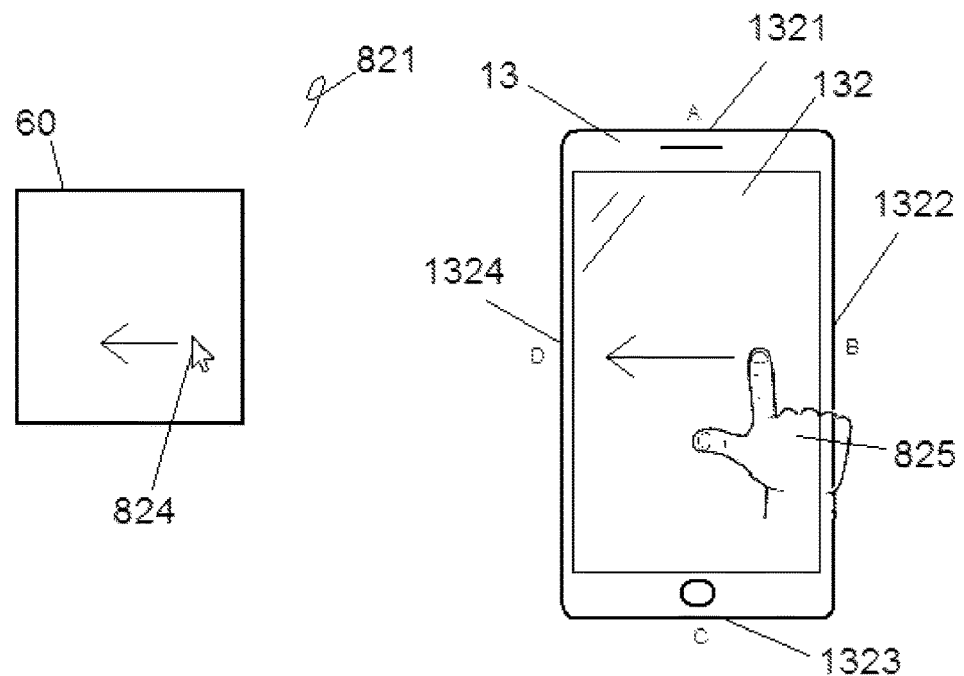
FIG. 61 is a relationship diagram of the virtual reality device in FIG. 1 showing movement of the mouse cursor to the left on the screen in response to sliding of a user's finger towards side D on a vertical touch screen of the electronic device.
Figure 62:
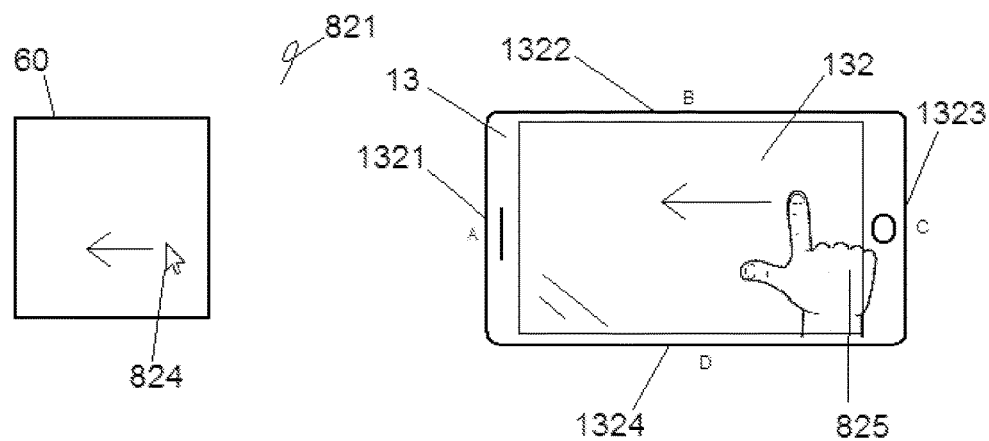
FIG. 62 is a relationship diagram of the virtual reality device in FIG. 1 showing movement of the mouse cursor to the left on the screen in response to sliding of a user's finger towards side A on a horizontal touch screen of the electronic device.
Figure 63:
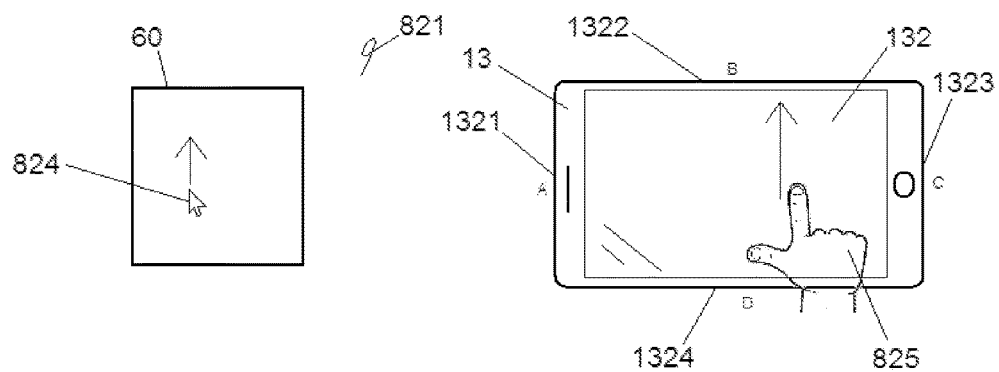
FIG. 63 is a relationship diagram of the virtual reality device in FIG. 1 showing upward movement of the mouse cursor on the screen in response to sliding of a user's finger towards side B on a horizontal touch screen of the electronic device.
Figure 64:
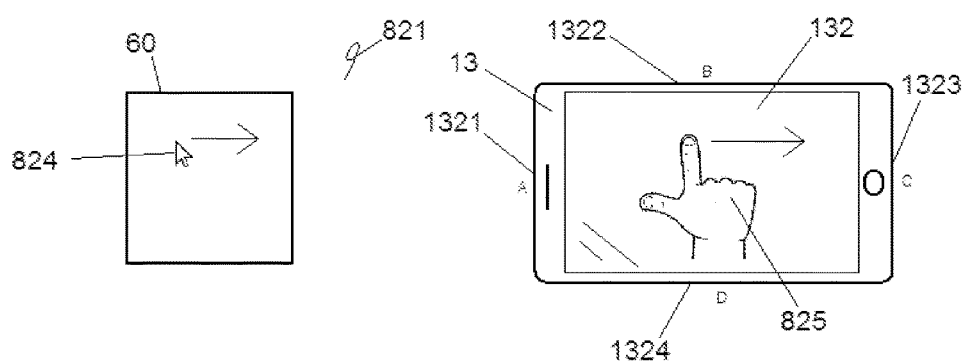
FIG. 64 is a relationship diagram of the virtual reality device in FIG. 1 showing movement of the mouse cursor to the right on the screen in response to sliding of a user's finger towards side C on a horizontal touch screen of the electronic device.
Figure 65:
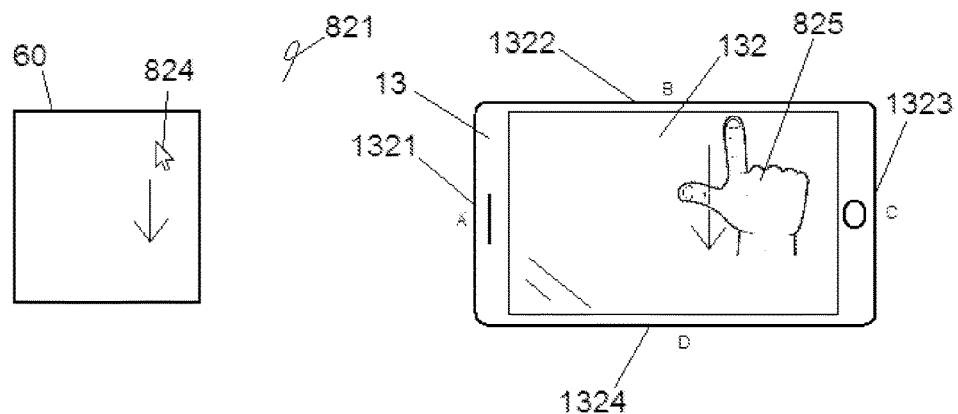
FIG. 65 is a relationship diagram of the virtual reality device in FIG. 1 showing downward movement of the mouse cursor on the screen in response to sliding of a user's finger towards side D on a horizontal touch screen of the electronic device.

1) In the mouse control mode 821, the touch pad, touch screen, or mouse pad of the electronic device 13, e.g. the touch screen 132 on the electronic device screen 131 of a smart phone or tablet, will be changed to a mouse touch pad. A mouse cursor 824 will appear on the screen display. As illustrated in FIG. 55, through sliding and clicking on the touch screen 132, multi-touch can be supported and the user can control the mouse cursor 824 and operate the electronic device 13. [virtual reality program>control mode>mouse control mode/gesture recognition mode] Also, the pattern, sensitivity and size of the mouse cursor can be adjustable, as shown in FIGS. 56 and 57. [virtual reality program>control mode>mouse control mode>mouse cursor pattern selection, sensitivity selection, mouse cursor size selection] Furthermore, as shown in FIGS. 58-65, under the influence of the gravity sensor of the electronic device 13, one can normally operate the mouse whether the touch screen 132 on the electronic device 13 is disposed horizontally or vertically. For example, if the touch screen 132 on the electronic device 13 is disposed vertically, then when the finger of the user's hand 825 on the touch screen slides to side A 1321 of the touch screen, then the mouse cursor 824 moves upwards; when the finger of the user's hand 825 on the touch screen slides to side B 1322 of the touch screen, then the mouse cursor 824 moves to the right; when the finger of the user's hand 825 on the touch screen slides to side C 1323 of the touch screen, then the mouse cursor 824 moves downwards; and when the finger of the user's hand 825 on the touch screen slides to side D 1324 of the touch screen, then the mouse cursor 824 moves to the left.

If the touch screen 132 on the electronic device 13 is rotated to the left and disposed horizontally, then when the finger of the user's hand 825 on the touch screen slides to side A 1321 of the touch screen, then the mouse cursor 824 moves to the left; when the finger of the user's hand 825 on the touch screen slides to side B 1322 of the touch screen, then the mouse cursor 824 moves upwards; when the finger of the user's hand 825 on the touch screen slides to side C 1323 of the touch screen, then the mouse cursor 824 moves to the right; and when the finger of the user's hand 825 on the touch screen slides to side D 1324 of the touch screen, then the mouse cursor 824 moves downwards. The operating method is similar when the touch screen is rotated to the right and disposed horizontally, and the touch screen is up-side-down vertically.

Figure 66:
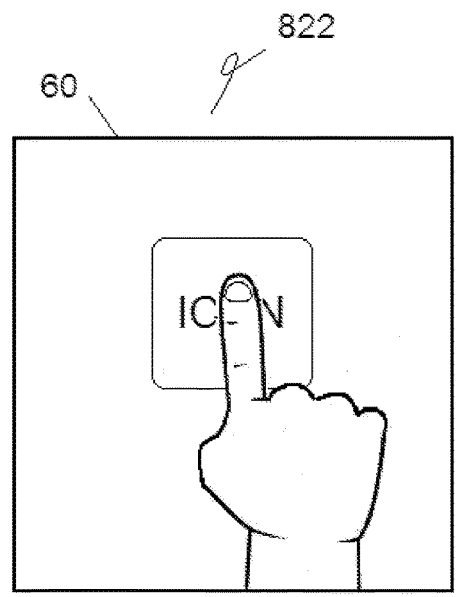
FIG. 66 is an illustrative diagram of the screen of the virtual reality device in FIG. 1 showing an image of a hand under imaging function.
Figure 67:
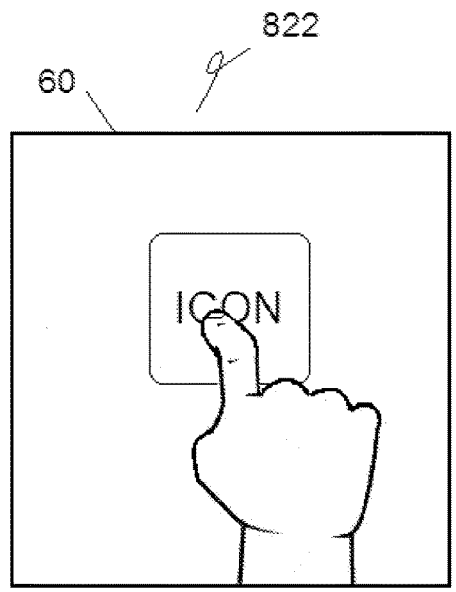
FIG. 67 is an illustrative diagram of the screen of the virtual reality device in FIG. 1 showing an image of a hand under imaging function, and through a bending motion of the index finger at an overlapping position with the icons on the original screen content as an operating command.

2) As illustrated in FIGS. 66 and 67, hand gesture recognition mode 822 is operable under the thermal sensing recognition mode 86 and/or image recognition mode 87 and/or imaging function 88. [virtual reality program>control mode>gesture recognition mode] In the thermal sensing recognition mode 86 and/or image recognition mode 87, the thermal-sensing lens 72 and/or camera 71 of the virtual reality device 11 can detect the user's hands 825, and recognize the change of activities of the hand gesture, movement, finger and position of the user's hands 825 so as to operate the electronic device 13. Under the imaging function 88, the images 826 of the user's hands will be displayed on the screen 60. Recognition can be carried out through the motion of the images 826 of the user's hands at overlapping position with the original screen content, to thereby operate and form interaction between the user's hands 825 and the content of the original screen 60, and an interaction mode of a virtual reality. Some examples of method of recognition are shown below. The index finger can replace action of the mouse cursor 824. Bending of the index finger can be recognized as an operating command of the left key on the mouse, and bending of the middle finger as an operating command of the right key on the mouse. For example, single and/or twice consecutive quick bending of the index finger may represent an enter command; bending of the index finger for over 1 second may represent a selection operation; and bending of the middle finger may represent menu selection. Also, the index finger can also replace action of the mouse cursor. Touching of the index finger and the thumb can be recognized as an operating command. A quick touching of the index finger with the thumb may represent an enter command; and touching of the index finger with the thumb for over 1 second may represent a selection operation. Also, bending of the index and middle fingers at the same time and moving up or down represent scrolling up or down respectively. Further, the recognition of combination, number, and action of the palm, fist, and outwardly extending fingers can be used as various operating commands.

3) Under normal control mode 823, the touch screen control method on the touch screen 132 on the screen 131 of the electronic device such as a smart mobile phone or tablet may return to control method under normal situation, which is the control method before getting into the virtual reality device 11. In the normal control mode 823 in association with transparent mode 83, the screen 131 of the electronic device is turned on, and the user can operate on the electronic device 13.

Figure 68:
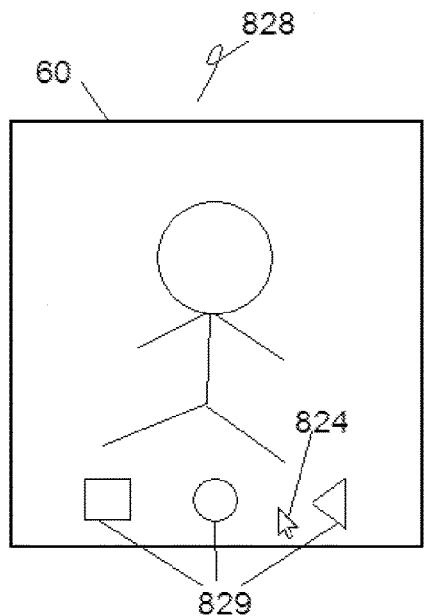
FIG. 68 is an illustrative diagram of the screen of the virtual reality device in FIG. 1 showing the virtual function keys derived from the function keys of the electronic device and appearing on the bottom side of the screen.
Figure 69:
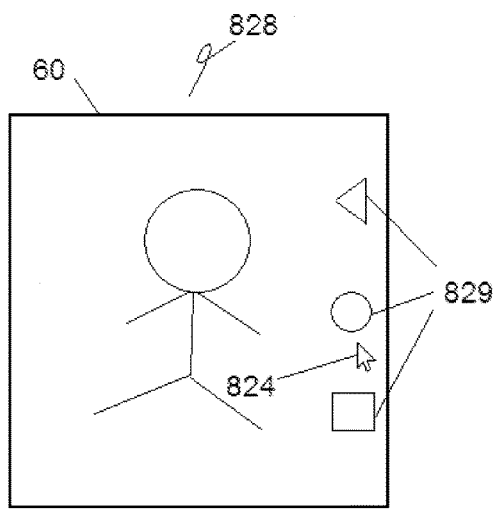
FIG. 69 is an illustrative diagram of the screen of the virtual reality device in FIG. 1 showing the virtual function keys derived from the function keys of the electronic device and appearing on the right side of the screen.

4) As illustrated in FIGS. 68 and 69, virtual function key control mode 828 is under the mouse control mode 821 and/or the hand gesture recognition mode 822. Certain function keys on the electronic device 13 and/or the touch screen 132 will be converted into virtual function keys 829 displayed on the screen 60. Hence, a user wearing the virtual reality device 11 can operate the function keys of the electronic device 13 and/or the touch screen 132.

FIGS. 70-74 and 92 show the transparent mode 83 of the virtual reality program 80 of the present application.

Figure 70:
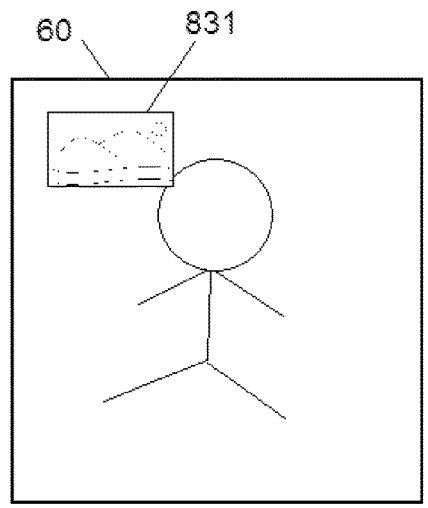
FIG. 70 is an illustrative diagram of the screen of the virtual reality device in FIG. 1 showing a transparent frame on the screen.
Figure 71:
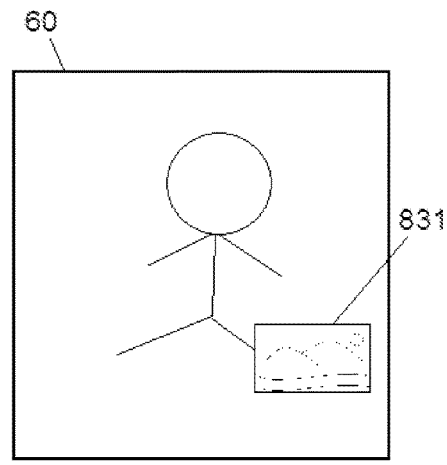
FIG. 71 is an illustrative diagram as in FIG. 70 showing the transparent frame at a different location.
Figure 72:
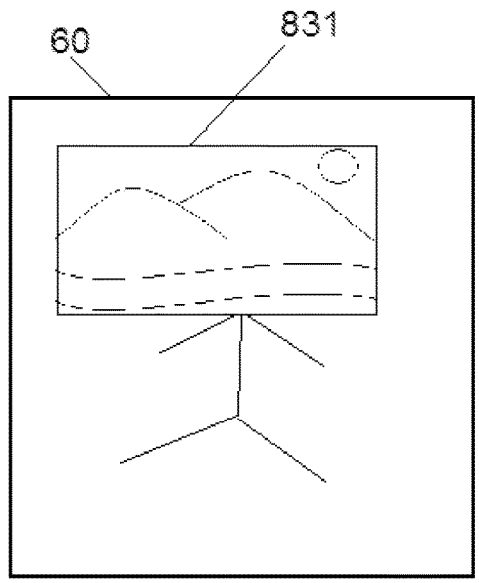
FIG. 72 is an illustrative diagram as in FIG. 70 showing a larger transparent frame.

1) In the virtual reality program 80, transparent mode 83 can be selected and started. [virtual reality program>transparent function>on/off] Transparent frame 831 appears on the screen 60. The content of the transparent frame 831 is the instant image captured by the camera 71 of the virtual reality device 11, as shown in FIG. 70. The size of the transparent frame 831 can be adjusted, as illustrated in FIGS. 70 and 72. The position of the transparent frame 831 can also be adjusted, as illustrated in FIGS. 70 and 71. Using the transparent mode 83, a user wearing the virtual reality device 11 can also see the real environment around the user such that hazard when wearing the device can be reduced.

Figure 73:
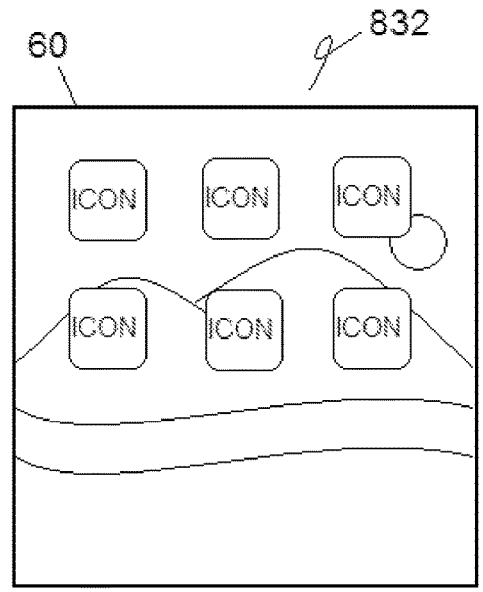
FIG. 73 is an illustrative diagram of the screen of the virtual reality device in FIG. 1 showing that under transparent wallpaper function in the transparent mode, the wallpaper content is the instant image captured by the camera.
Figure 74:
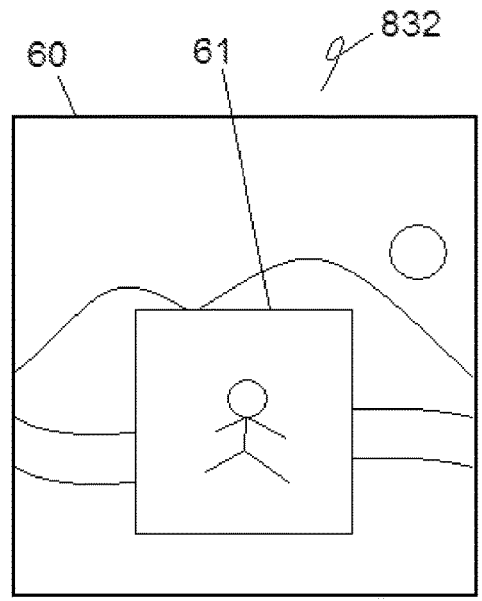
FIG. 74 is an illustrative diagram of the screen of the virtual reality device in FIG. 1 showing that under transparent wallpaper function in the transparent mode, the background content in the display window is the instant image captured by the camera.

2) In the transparent mode 83, one can select transparent wallpaper function 832. [virtual reality program>transparent function>on/off>transparent wallpaper>on/off] Under this function, the wallpaper content transmitted from the electronic device 13 and/or the background content of the display window 61 will be the instant image captured by the camera 71 of the virtual reality device 11, as depicted in FIGS. 73 and 74.

FIGS. 2, 46, 47, 75-80 and 92 show the positioning function 84 of the virtual reality program 80 of the present application.

Figure 75:
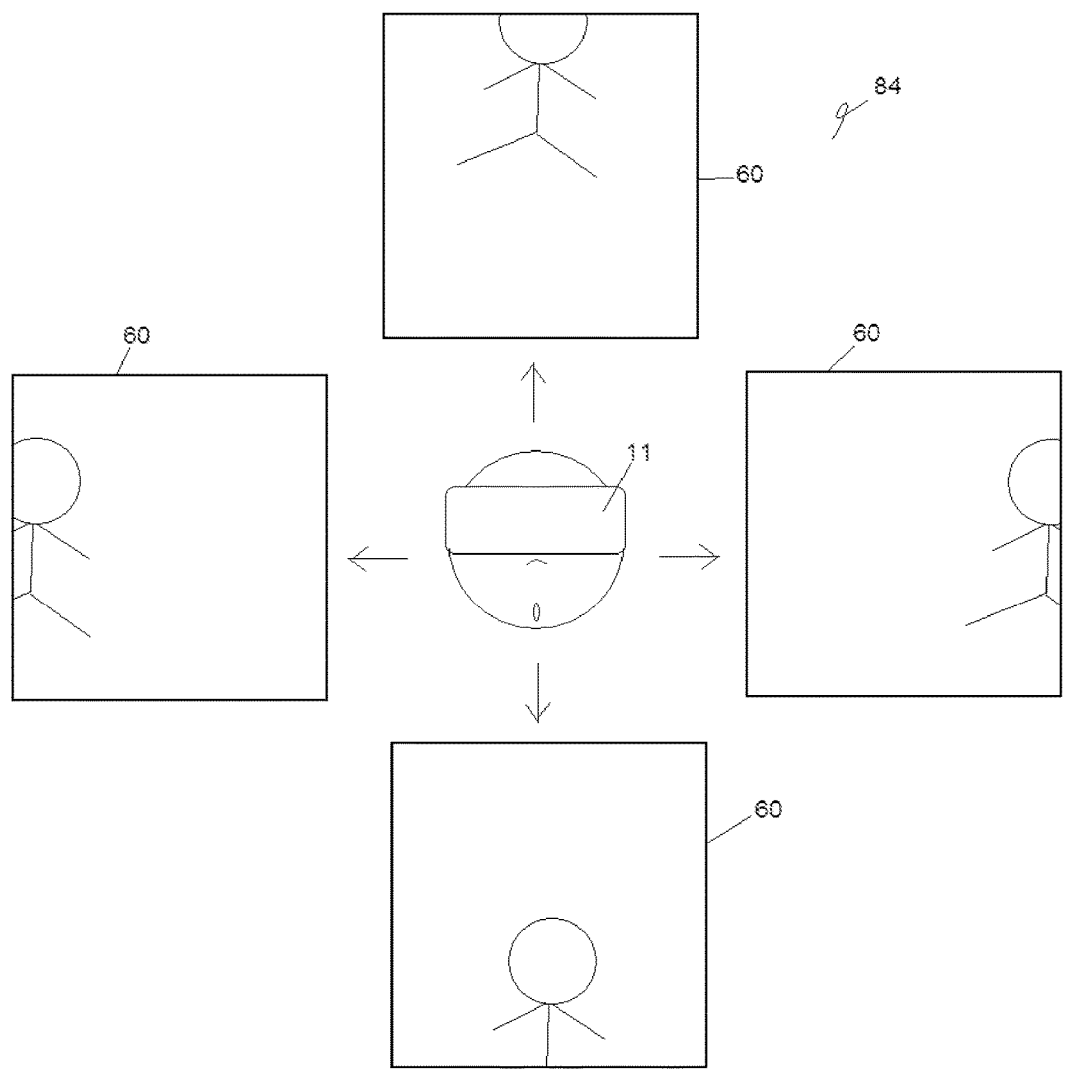
FIG. 75 is an illustrative diagram of the screen of the virtual reality device in FIG. 1 showing that the content in the display window under positioning function changes according to the user's motion.
Figure 76:
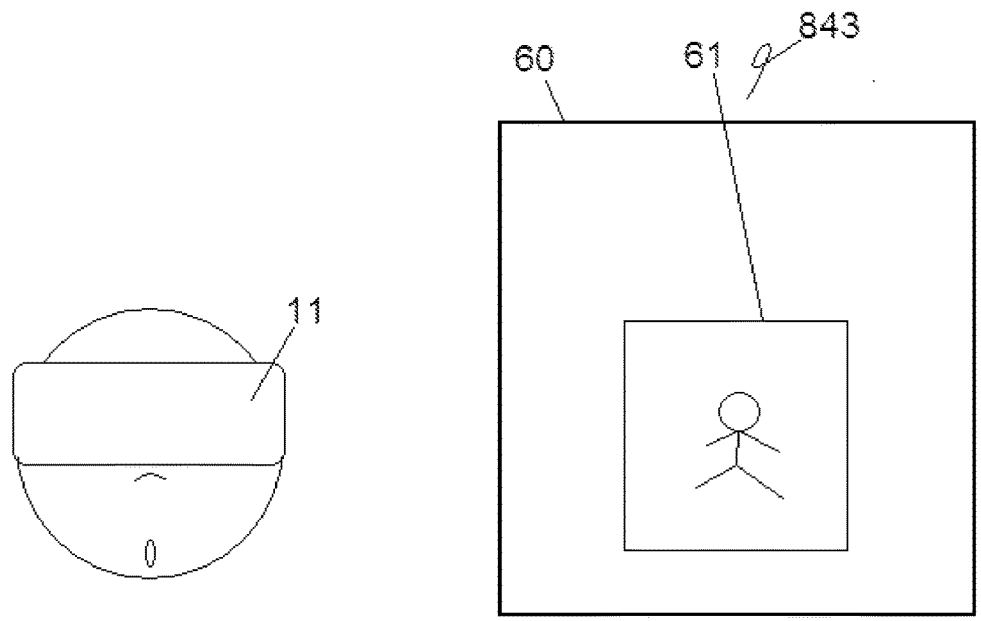
FIG. 76 is a relationship diagram of the screen of the virtual reality device in FIG. 1, showing the window under virtual stationary window mode when the user is wearing the virtual reality device with his/her face facing the front.
Figure 77:
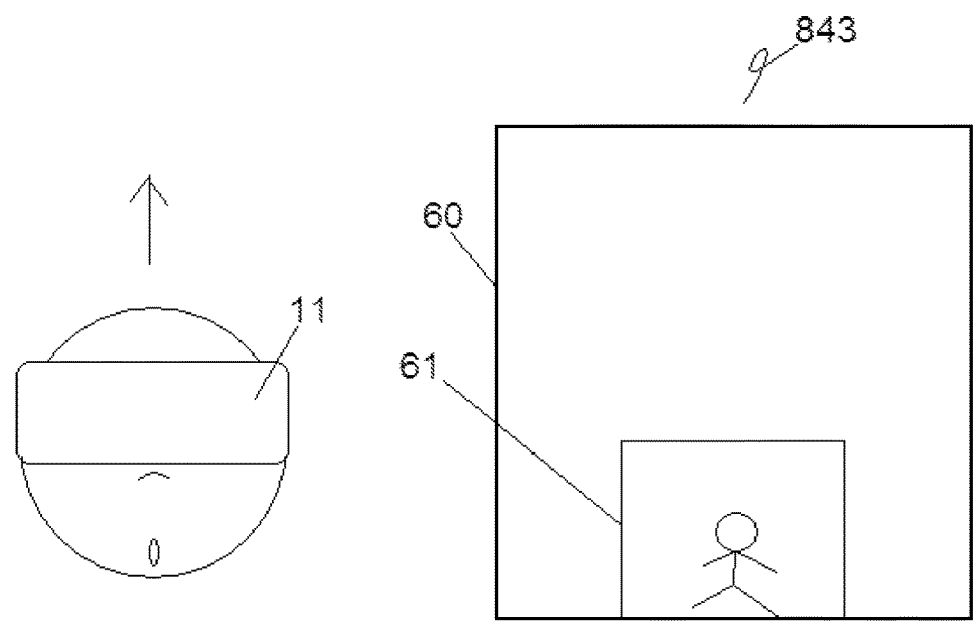
FIG. 77 is a relationship diagram of the screen of the virtual reality device in FIG. 1 showing the window under virtual stationary window mode when the user is wearing the virtual reality device with his/her head being raised and his/her face facing upwards.
Figure 78:
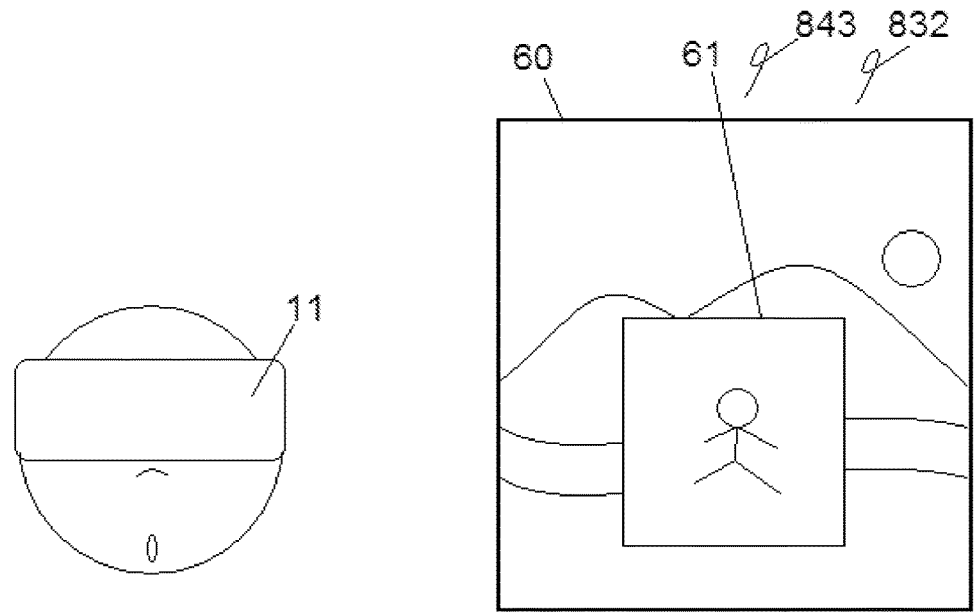
FIG. 78 is an illustrative diagram of FIG. 76 with the transparent wallpaper function activated at the same time.
Figure 79:
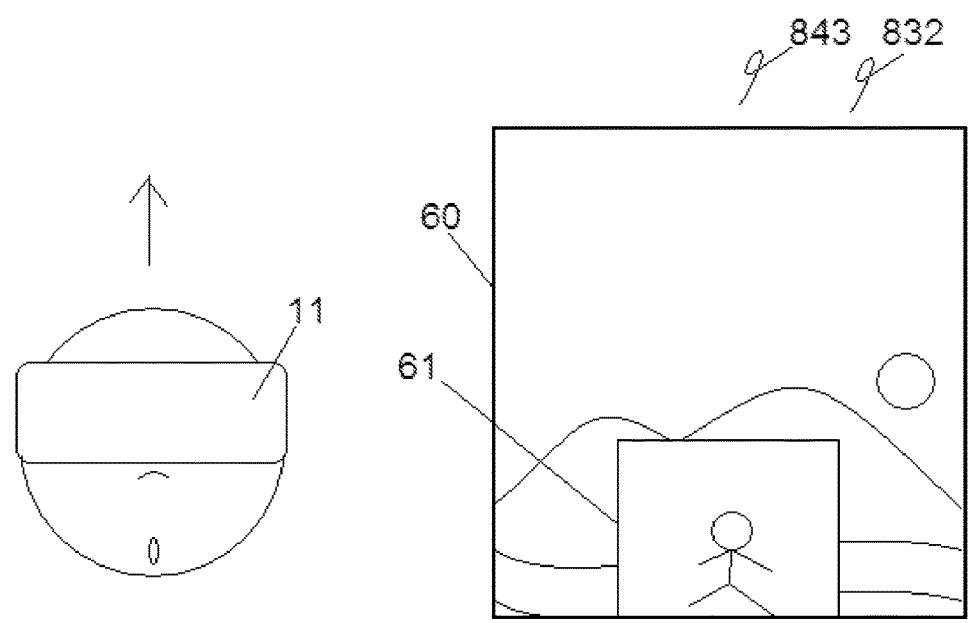
FIG. 79 is an illustrative diagram of FIG. 77 with the transparent wallpaper function activated at the same time.

1) When the positioning function 84 is turned on, the activity sensors on the virtual reality device 11, including accelerometer 761, electronic compass 762, gyroscope 763, etc. will be activated, and related data will be transmitted to the electronic device 13 for analysis. As shown in FIG. 46, the electronic device 13 can output display content which can be adjusted according to data from the activity sensors and display on the screen 60 of the virtual reality device 11. That means the content in the display window 61 will be changed accordingly based on the user's activity. [virtual reality program>positioning function>on/off] The user will be situated in a virtual world, as shown in FIG. 75. The user can also directly turn the positioning function 84 on or off using positioning function switch 842 on the virtual reality device 11.

2) Under the positioning function 84, virtual stationary window mode 843 can be selected. Under the virtual stationary window mode 843, when a user moves his/her head, the display window 61 will be virtually placed at a fixed position, as illustrated in FIGS. 76-79. Of course, as mentioned in the display mode 81, the user can adjust the position and size of the display window 61. Under this mode, the content of the display window 61 will not be changed accordingly based on the activity of the user. [virtual reality program>positioning function>on/off>virtual reality/virtual stationary window]

Figure 80:
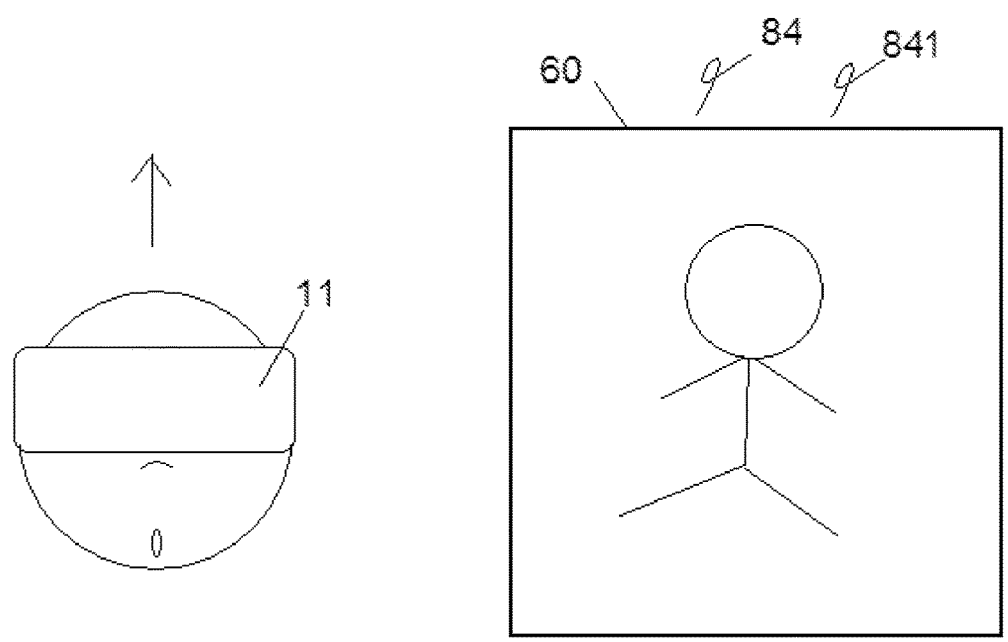
FIG. 80 is an illustrative diagram of the screen display window of the virtual reality device in FIG. 1 showing that under positioning function and the user's head is raised and his/her face facing upwards, the re-positioning function is activated such that the display content is restored to the content when the face is facing the front.

3) Re-positioning function 841: [virtual reality program>positioning function>on/off>re-positioning] Through the re-positioning function 841, the electronic device 13 will again, based on the position when the user activates the re-positioning function, define the straight front of the display content, as depicted in FIG. 80. For example, a user lies down and activates the re-positioning function 841 under the positioning function 84, the user when lying down can still see the straight front of the display content and the surrounding content.

4) To enhance the positioning function of virtual reality device 11, sensor head positioning function 844 may be provided. Sensor head 75 can be provided on the virtual reality device 11 and/or the electronic device. The sensing head 75 can be tracked in cooperation with a sensor head base station 751, and data can be sent back to the electronic device 13. This can more accurately track the position of the virtual reality device 11 and the activity of the user. [virtual reality program>positioning function>on/off>sensor head positioning>on/off]

Figure 81:
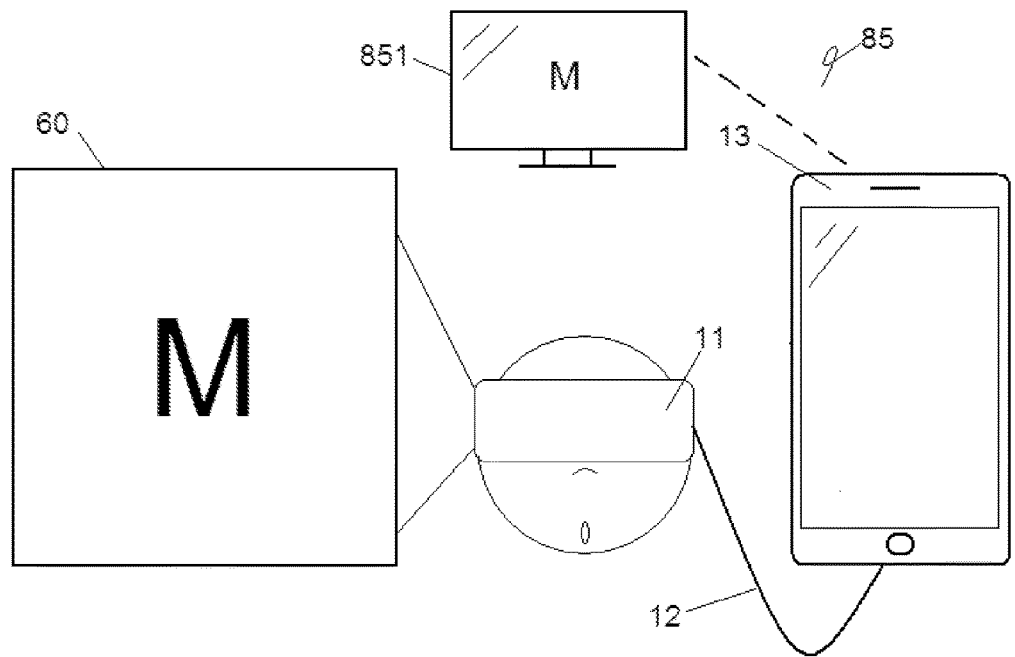
FIG. 81 is an illustrative diagram of the screen display window of the virtual reality device in FIG. 1 showing that when the electronic device is connecting to another electronic device and under reflect mode function, the image output from the electronic device is reflected.
Figure 82:
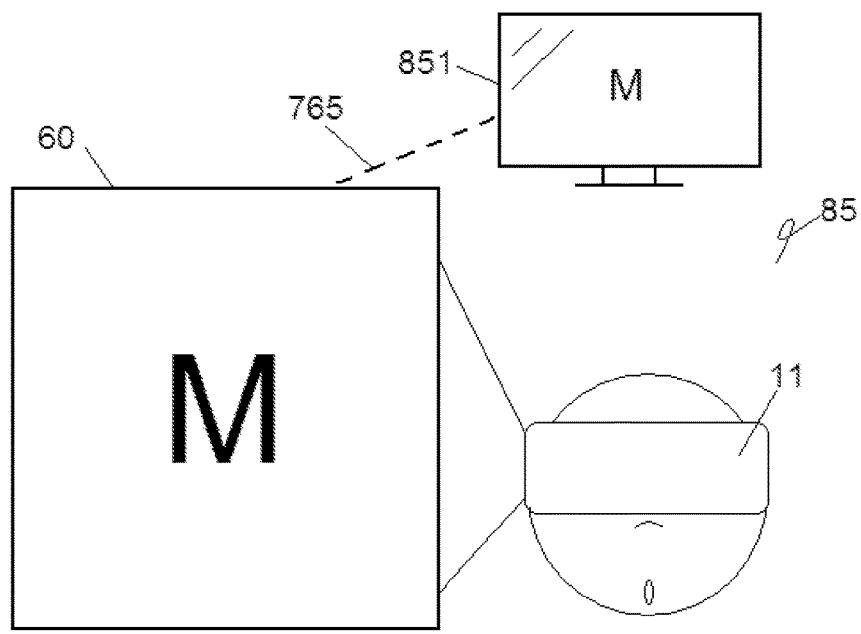
FIG. 82 is an illustrative diagram of the screen display window of the virtual reality device in FIG. 1 showing that when the wireless device is connecting to another electronic device and under reflect mode function, the image output from the electronic device is reflected.

FIGS. 81-82 and 92 show the reflect mode 85 of the virtual reality program 80 of the present application using wireless device 765 of the electronic device 13 or virtual reality device 11. The wireless device 765 can be Bluetooth, WIFI, WIGIF, or other suitable conventional device, and standard can be MIRACAST or other suitable conventional standard for connecting to other electronic device 851. The other electronic device 851 refers to other device that is not connected with the virtual reality device 11. The other electronic device can be smart mobile phone, tablet, computer, television, or other electronic product. To enter the reflect mode 85 of the virtual reality program 80 [VR program>reflect mode>on/off>select electronic device to be reflected], a user can select electronic device 13 or virtual reality device 11, and use wireless device 765 such as Bluetooth/WIFI/WIGIF to search the other electronic device 851 to be connected among the other electronic devices. After the electronic device 13 or the virtual reality device 11 is connected with the other electronic device 851, the display window 61 on the screen 60 of the virtual reality device 11 can reflect the image output from the other electronic device. Under the reflect mode 85, the activity sensor data on the virtual reality device 11 can also be directly or through the electronic device 13 re-transmitted to the other electronic device 851 for analysis in order to achieve the positioning function 84.

FIGS. 83-87 and 92 show the thermal sensing recognition mode 86 of the virtual reality program 80 of the present application.

1) In the virtual reality program 80, thermal sensing recognition mode 86 can be selected and turned on. [virtual reality program>thermal sensing recognition mode>on/off]

2) After the thermal sensing recognition mode 86 is turned on, the thermal-sensing lens 72 on the virtual reality device 11 is activated.

3) Through thermal sensing, the temperatures of the user's hands 825 and the surrounding environment are different under most circumstances. The electronic device 13 can detect and recognize the user's hands 825 and their activity in front of the thermal-sensing lens 72 by the difference in temperature and characteristics such as the shape, position, angle and distance of the user's hands 825 in front of the thermal-sensing lens 72 of the virtual reality device 11 worn by the user under reasonable circumstances.

4) Thermal sensing recognition mode 86 can eliminate other objects other than the user's hands 825 even for objects having a temperature similar to that of the user's hands 825, such as people walking in front of the thermal-sensing lens 72.

Figure 83:
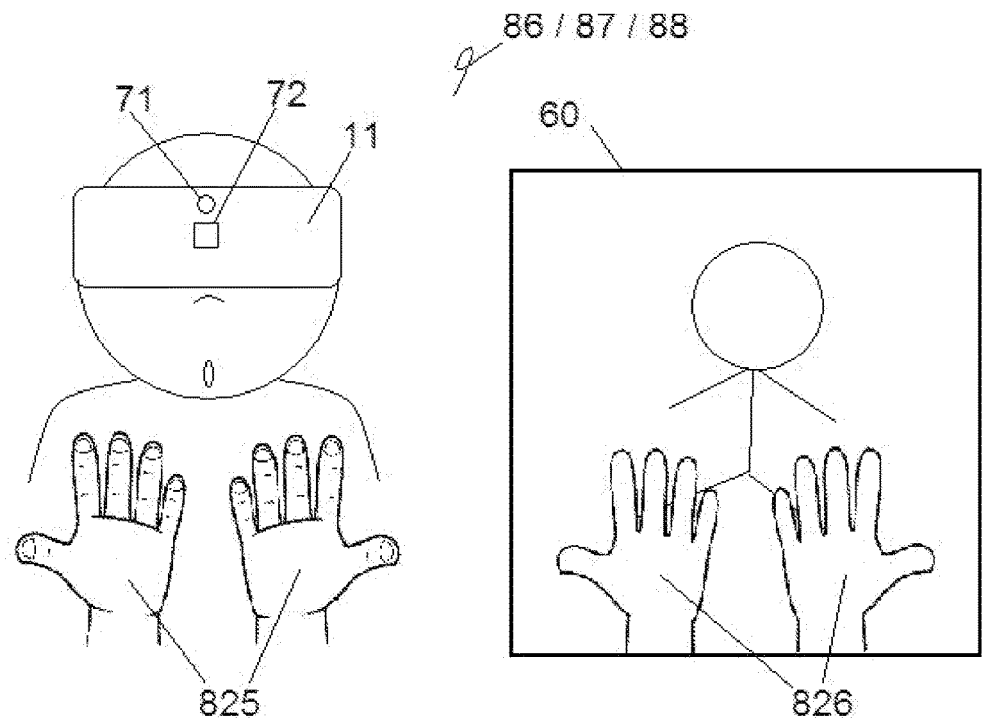
FIG. 83 is an illustrative diagram of the screen of the virtual reality device in FIG. 1 showing the relationship of the images of the user's hands and the palms of the user's hands facing the user in the thermal sensing recognition mode or image recognition mode under imaging function.
Figure 84:
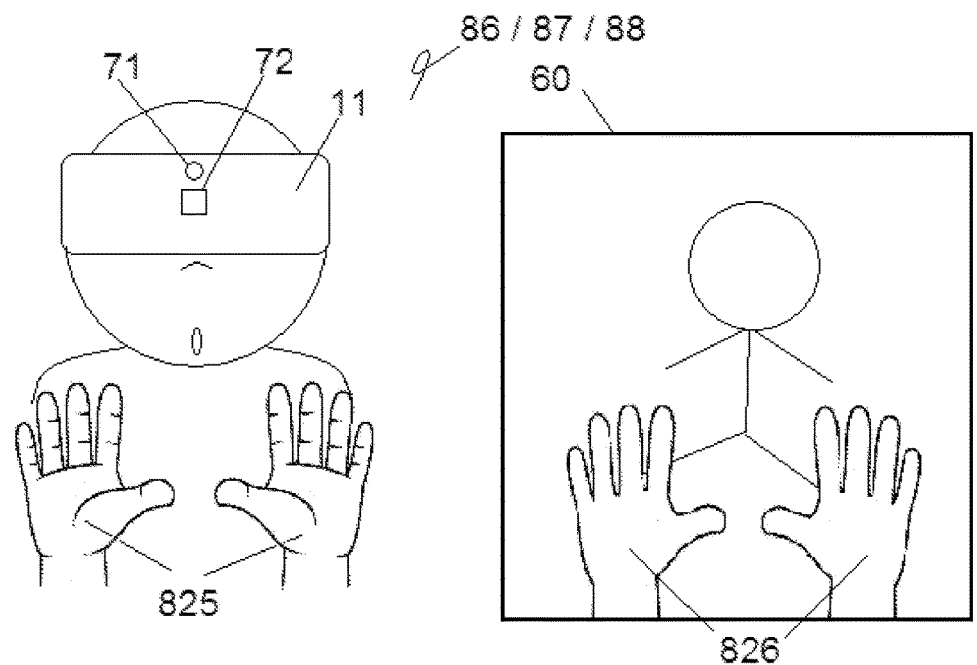
FIG. 84 is an illustrative diagram of the screen of the virtual reality device in FIG. 1 showing the relationship of the images of the user's hands and the backs of the user's hands facing the user in the thermal sensing recognition mode or image recognition mode under imaging function.
Figure 85:
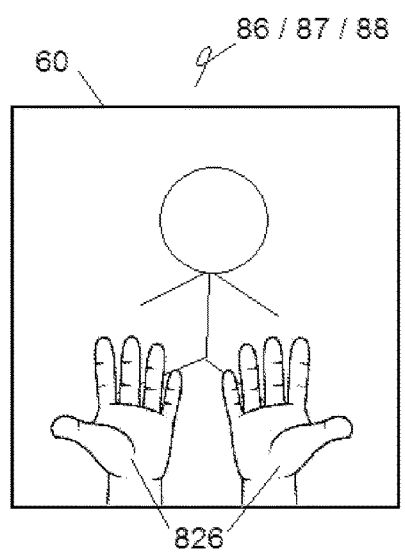
FIG. 85 is an illustrative diagram of FIG. 83 showing the imaging function further recognizes and outlines the contour of the user's hands.
Figure 87:
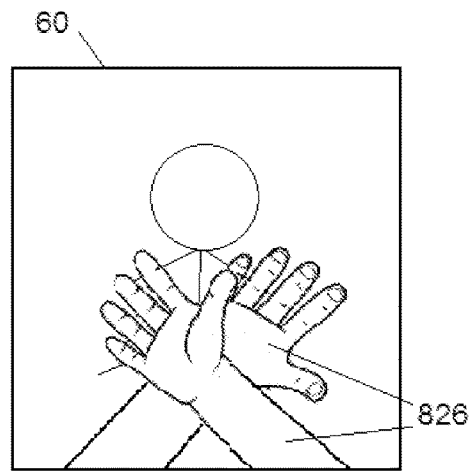
FIG. 87 is an illustrative diagram of the screen of the virtual reality device in FIG. 1 showing the recognition of the user's left and right hands and the palm or back of the user's hands, and outlining the contour of the user's hands in the thermal sensing recognition mode or image recognition mode under imaging function.
Figure 86:
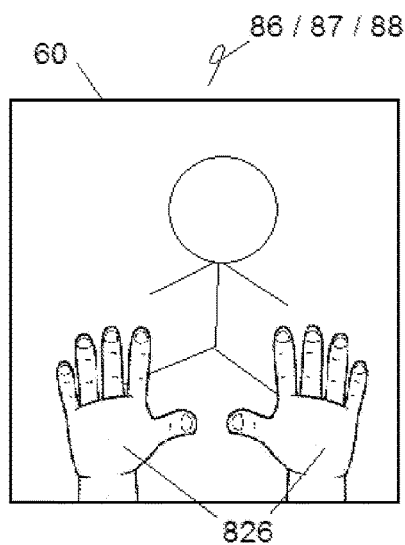
FIG. 86 is an illustrative diagram of FIG. 84 showing the imaging function further recognizes and outlines the contour of the user's hands.

5) Imaging function 88 exists under the thermal sensing recognition mode 86. The condition of the user's hands 825 in front of the thermal-sensing lens 72 can be detected by means of thermal sensing, and can be converted into hand images 826 and place into the display content. A user can see the activity of his/her hands on the screen 60, as shown in FIGS. 83 and 84. The images and color of the hands generated by heat sensing are different from those of the real hands. By means of the imaging function 88, the images 826 of the user's hands detected and recognized in the thermal sensing recognition mode 86 can be filled up by colors. The colors can be selected. [VR program>thermal sensing recognition mode>on/off>imaging color selection] Furthermore, the imaging function 88 can figure out the user's hand's front or back, and left or right by the characteristics such as the shape, position, angle and distance of the user's hands 825 and forearms 827 in front of the thermal-sensing lens 72 of the virtual reality device 11 worn by the user under reasonable circumstances. The imaging function 88 can also add certain characteristics on the surface of the hands, such as nails, joint prints, palm prints, etc. onto corresponding positions in the images 826 of the hands so as to enhance the realistic of the images 826 of the hands, as depicted in FIGS. 85-87.

FIGS. 83-87 and 92 show the image recognition mode 87 of the virtual reality program 80 of the present application.

1) In the virtual reality program 80, image recognition mode 87 can be selected and turned on. [virtual reality program>image recognition mode>on/off]
2) After the image recognition mode 87 is turned on, the camera 71 on the virtual reality device 11 is activated.
3) The electronic device 13 can analyze the instant image captured by the camera 71 on the virtual reality device 11. The user's hands 825 and their activity can be detected and recognized by the characteristics such as the shape, position, angle and distance of the user's hands 825 in front of the camera of the virtual reality device 11 worn by the user under reasonable circumstances.
4) Image recognition mode 87 can eliminate other objects other than the user's hands, cut out the images of the user's hands 825, or outline the contour of the user's hands.
5) In the imaging function 88 under the image recognition mode 87, the condition of the user's hands 825 in front of the camera 71 can be converted into hand images 826 and place into the display content. A user can view the activity of his/her hands on the screen 60, as shown in FIGS. 83 and 84. The contour or the images 826 of the user's hands 825 can be outlined. By means of the imaging function 88, the image recognition mode 87 can be recognized, and the contour or images 826 of the user's hands 825 can be filled up by colors, which can be based on the colors of the images of the hands, or can be selected. [virtual reality program>image recognition mode>on/off>imaging color selection> automatic/manual] Furthermore, the imaging function 88 can figure out the user's hand's front or back, and left or right by the characteristics such as the shape, position, angle and distance of the user's hands 825 and forearms 827 in front of the camera 71 of the virtual reality device 11 worn by the user under reasonable circumstances. The imaging function can also add certain characteristics on the surface of the hands, such as nails, joint prints, palm prints, etc. onto corresponding positions in the images 826 of the user's hands so as to enhance realness of the images of the user's hands, as illustrated in FIGS. 85-87.

Figure 88:
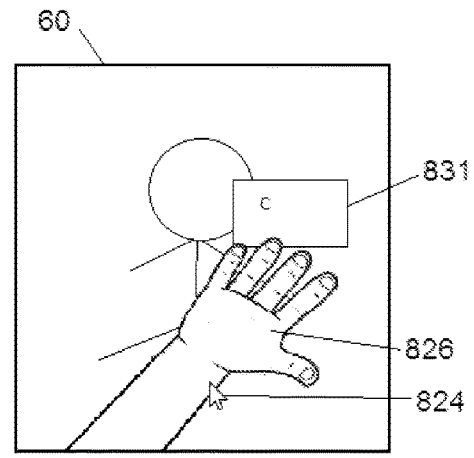
FIG. 88 is an illustrative diagram of the screen of the virtual reality device in FIG. 1 showing the top to bottom order of the screen display contents.

Referring to FIG. 88, the order of the display contents on the screen 60 of the virtual display device 11 is that the original display content/window frame 61 is at the lowest. Above of that is transparent frame 831 in the transparent mode 83. Further above are the hand images 826 under the imaging function 88 in the thermal sensing recognition mode 86 or the image recognition mode 87. The uppermost is the mouse cursor 824 under the mouse control mode 821.

Figure 3:
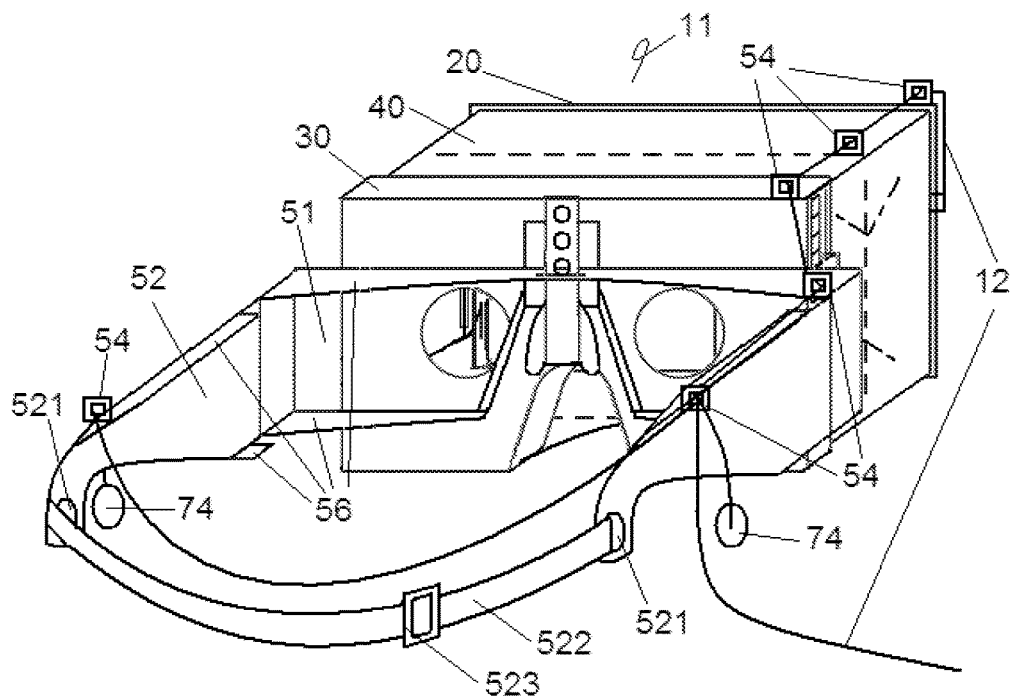
FIG. 3 is a perspective view from the rear, right and top sides of the virtual reality device with the addition of headband apertures, headband, wire clips, slipover plates of slipover frame according to a second embodiment of the present application.
Figure 4:
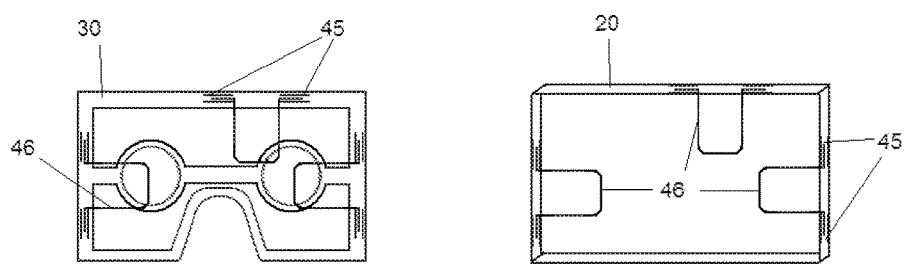
FIG. 4 is a transparent perspective view from the rear, right and top sides of the lens frame and outer frame provided with hinges and extending arms of the virtual reality device shown in FIG. 1.
Figure 5:
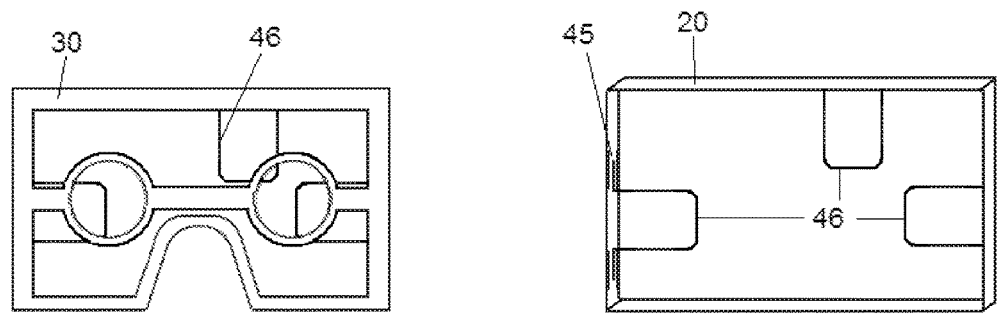
FIG. 5 is a perspective view from the rear, right and top sides of the lens frame and outer frame provided with hinges and extending arms of the virtual reality device shown in FIG. 1.
Figure 6:
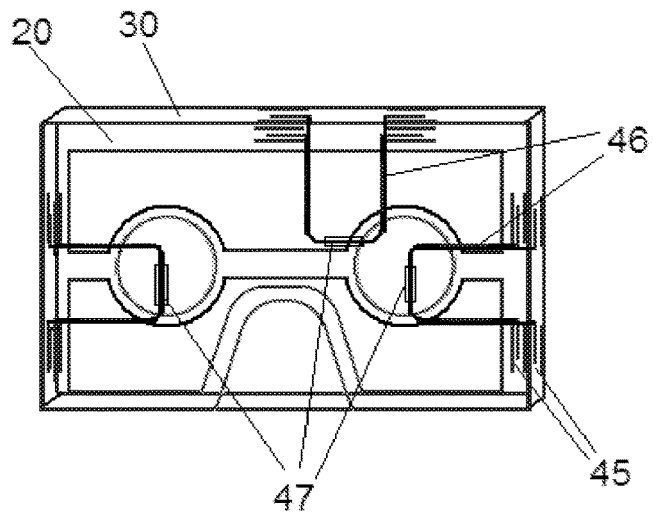
FIG. 6 is a transparent perspective view from the rear, right and top sides of the extending arms of the lens frame and outer frame connected by hinges of the virtual reality device shown in FIG. 1 with the outer frame and lens frame being adjusted to a combined position.
Figure 7:
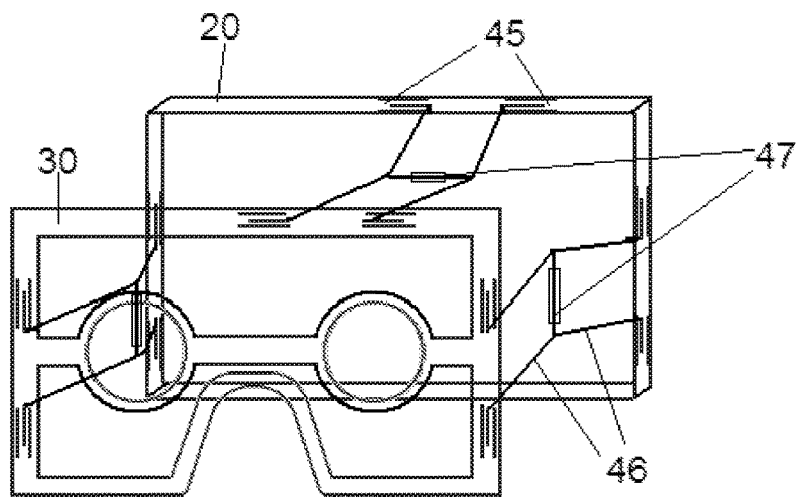
FIG. 7 is a transparent perspective view from the rear, right and top sides of the extending arms of the lens frame and outer frame connected by hinges of the virtual reality device shown in FIG. 1 with the outer frame and lens frame being adjusted to an expanded position.
Figure 8:
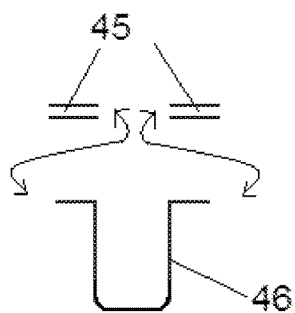
FIG. 8 is an illustrative diagram showing a method of inserting extending arms into hinge seats of the virtual reality device shown in FIG. 1.
Figure 12:
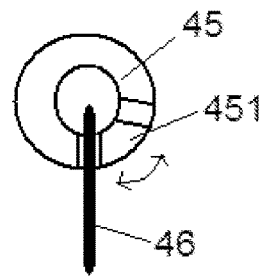
FIG. 12 is a side view of an extending arm movable on position-restricting structure of the hinge seats or extending arm hinge of the virtual reality device shown in FIG. 1.
Figure 9:
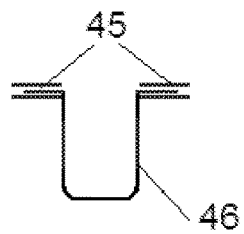
FIG. 9 is an illustrative diagram showing extending arms inserted into hinge seats of the virtual reality device shown in FIG. 1.
Figure 13:
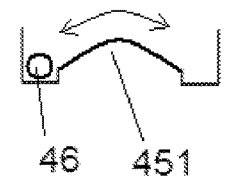
FIG. 13 is an enlarged view of an extending arm movable on position-restricting structure of the hinge seats or extending arm hinge of the virtual reality device shown in FIG. 1.
Figure 10:
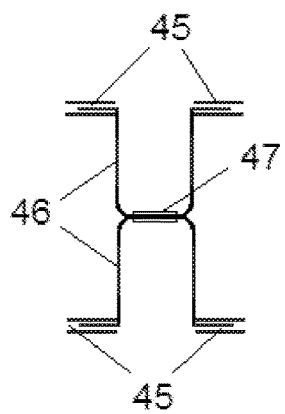
FIG. 10 is an illustrative diagram showing two extending arms being connected by a hinge of the virtual reality device shown in FIG. 1.
Figure 14:
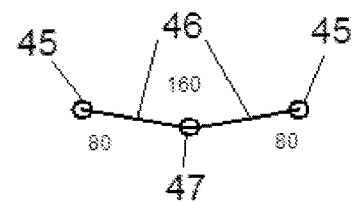
FIG. 14 is a side view of two extending arms being connected by an extending arm hinge, and with respective hinge seats provided with position-restricting structure of the virtual reality device shown in FIG. 1 with the two extending arms being expanded by the position-restricting structure and fixed at a preset angle of 80 degrees.
Figure 11:
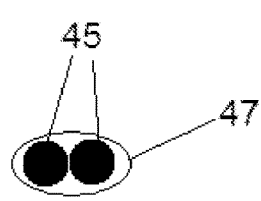
FIG. 11 is a cross sectional view of two extending arms being connected by a hinge of the virtual reality device shown in FIG. 1.
Figure 15:
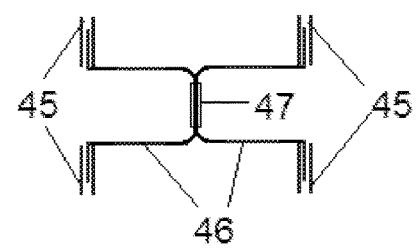
FIG. 15 is a top view of FIG. 14.
Figure 16:
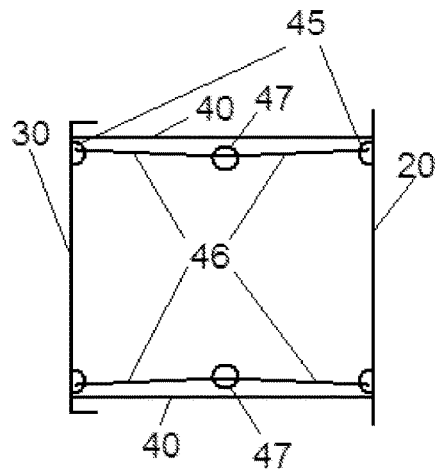
FIG. 16 is a cross sectional view of the hinge of the virtual reality device mounted on the lens frame and the outer frame, and hinges are connected to the extending arms which are connected by the extending arm hinge.
Figure 41:
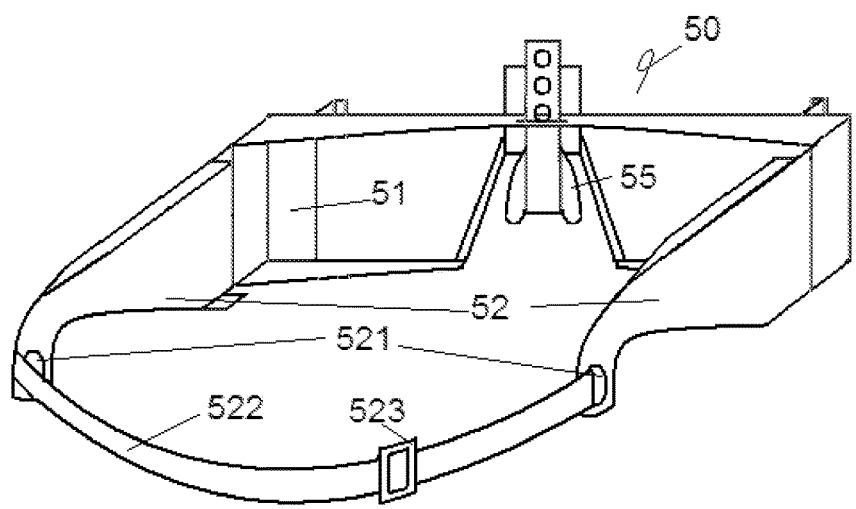
FIG. 41 is a perspective view from the rear, right and top sides of the slipover frame of the virtual reality device shown in FIG. 3 with the inclusion of slipover plates of slipover frame, headband apertures on side slipovers, headband, headband loosening/tightening buckle, as compared with FIG. 34.
Figure 42:
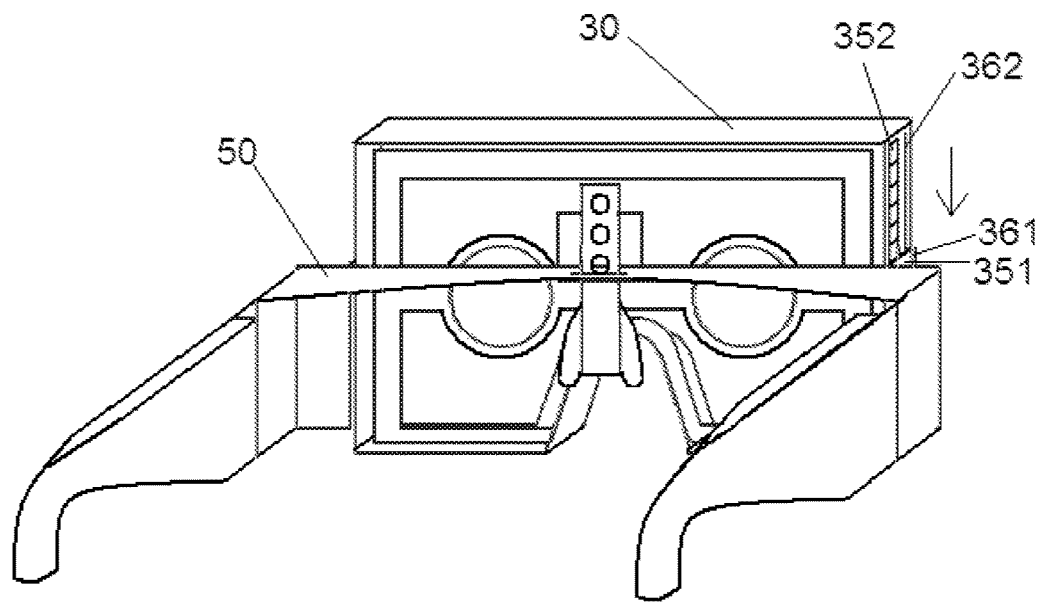
FIG. 42 is an illustrative diagram showing the fixation on the slipover frame to the lens frame of the virtual reality device shown in FIG. 1 at a relatively low position.
Figure 43:
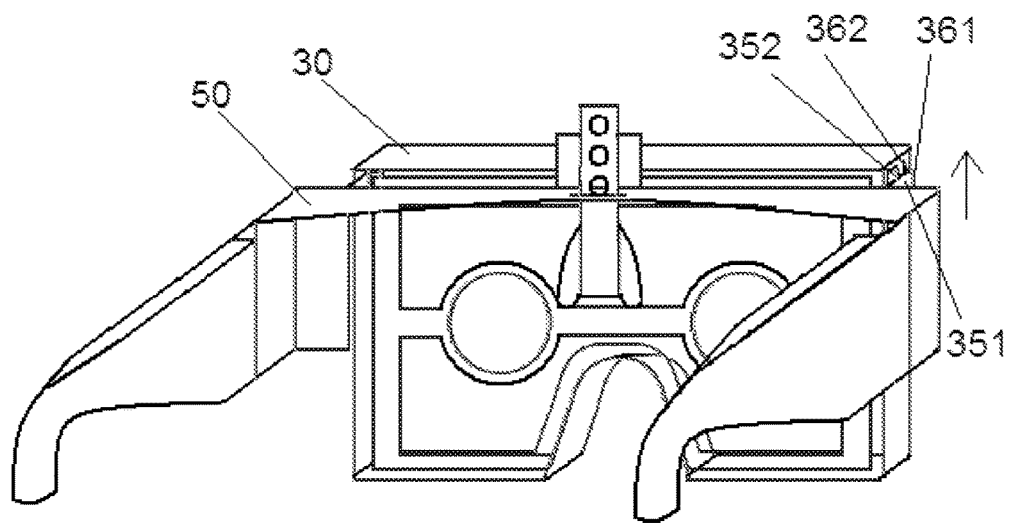
FIG. 43 is an illustrative diagram showing the fixation on the slipover frame to the lens frame of the virtual reality device shown in FIG. 1 at a relatively high position.
Figures 44, 45:
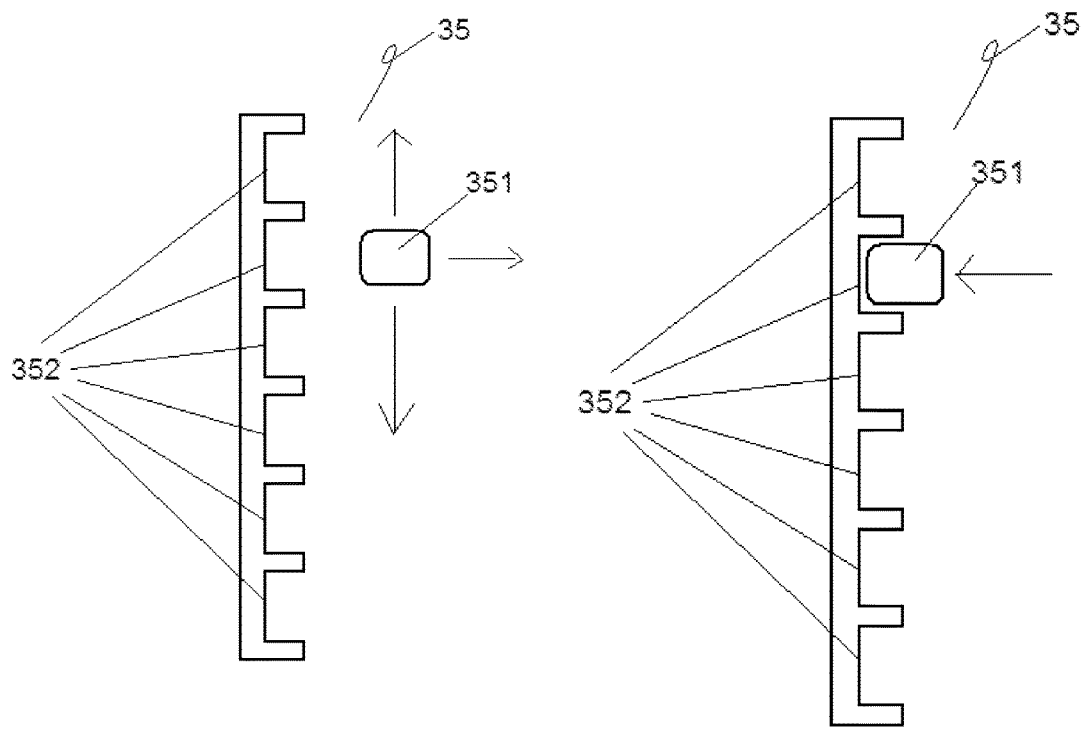
FIG. 44 is an illustrative diagram showing the principle of operation of loosing and up/down motion of the male and female members of the position-restricting mechanism between the lens frame and the slipover frame of the virtual reality device shown in FIG. 1.
FIG. 45 is an illustrative diagram showing the principle of coupling of the male and female members of the position-restricting mechanism between the lens frame and the slipover frame of the virtual reality device shown in FIG. 1.

FIGS. 3 and 41 show the second embodiment of the virtual reality device 11 of the present application. The slipover frame 50 may be provided with slipover plates 56. The slipover plates 56 may be disposed at the top or bottom inside the front and side slipovers 51, 52 such that the slipover frame 50 can be slipped over eyeglasses, and a user wearing eyeglasses can wear the virtual reality device 11.

FIGS. 3 and 41 show the virtual reality device 11 of the present embodiment. Headband apertures 521 and a headband 522 may be provided on the side slipovers 52 of the slipover frame 50. The headband 522 can be detachably connected to the headband apertures 521. When the headband apertures 521 on the two side slipovers 52 are coupled with two ends of the headband 522, the headband 522 can be disposed on the back of the user's head. The headband 522 can be provided with a loosening/tightening buckle 523 for adjusting the length of the headband 522. The headband 522 may be an elastic band. The headband 522 can be detachable so that a user can attach or detach the headband 522 according to his/her need.

FIG. 3 shows the virtual reality device 11 of the present embodiment. Wire clips 54 may be provided on the outer surface and/or the inner surface of the outer frame 20, folding tube 40, lens frame 30, slipover frame 50 or side wings 90 for fixing the position of an external wire. The external wire can be a wire of an earphone, a connecting wire 12 or a power source wire connecting with the electronic device 13.

Figure 19:
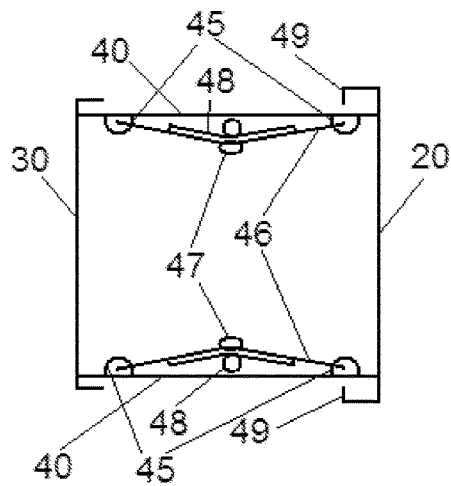
FIG. 19 is a cross sectional view of the hinges on the folding tube according to a third embodiment of the virtual reality device of the present application, wherein the hinges are connected to the extending arms, two extending arms being connected by the extending arm hinge and provided with springs, and a coupling mechanism is mounted and extending between the lens frame and the outer frame.

FIG. 19 shows a third embodiment of the virtual reality device 11 of the present application. The folding tube 40 of the virtual reality device 11 is provided with hinge seats 45 on one side thereof near the outer frame 20 and on one side thereof near the lens frame 30. The extending arms 46 can be connected with the hinge seats 45 so that the angle between the extending arms 46 and the outer frame 20 and the extending arms 46 and the lens frame 30 can be adjusted.

FIG. 19 shows the virtual reality device 11 of the present embodiment. Springs 48 may be provided between the extending arms 46 on one side of the outer frame 20 and on one side of the lens frame 30. Under the influence of the springs 48, the extending arms 46 on the two sides can be biased to a certain angle such that the outer frame 20 and the lens frame 30 are stretched out and kept at a distance.

Figure 21:
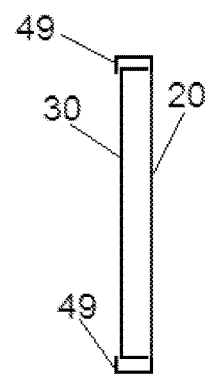
FIG. 21 is a cross sectional view of the hinge of the virtual reality device in FIGS. 19 and 20 mounted on the lens frame and the outer frame, and combined under the influence of the coupling mechanism.
Figure 22:
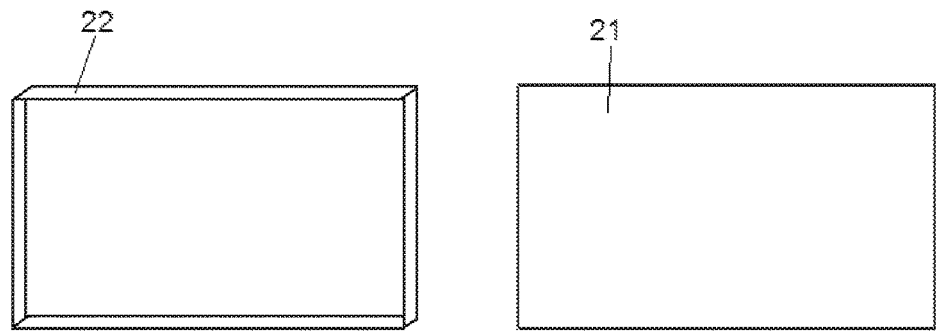
FIG. 22 is a perspective view from the rear, right and top sides of the outer frame of the virtual reality device shown in FIG. 1 with the outer panel and the outer case being separated.
Figure 23:
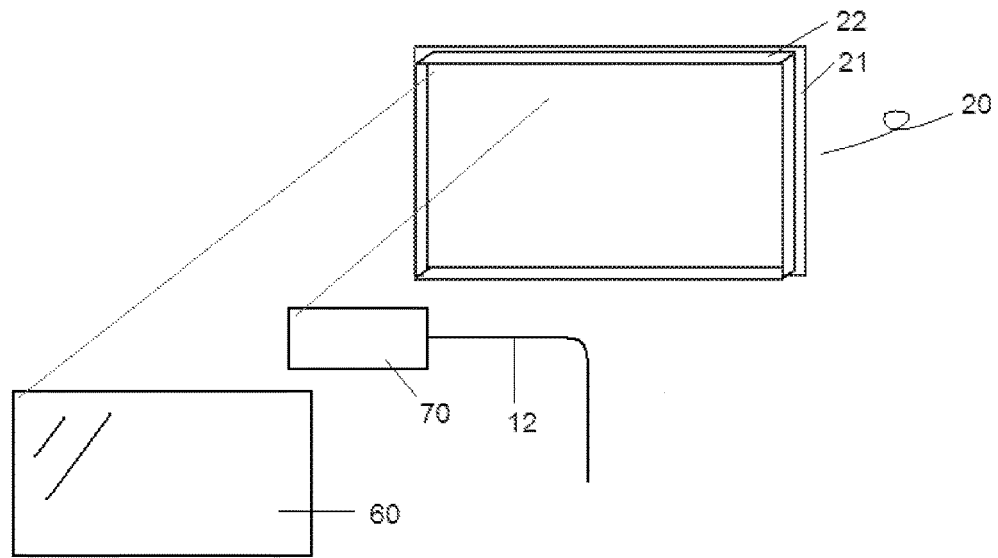
FIG. 23 is a perspective view from the rear, right and top sides of the outer frame of the virtual reality device shown in FIG. 1 with the outer panel and the outer case being combined and showing the installation position of the electronic board and the screen.
Figure 24:
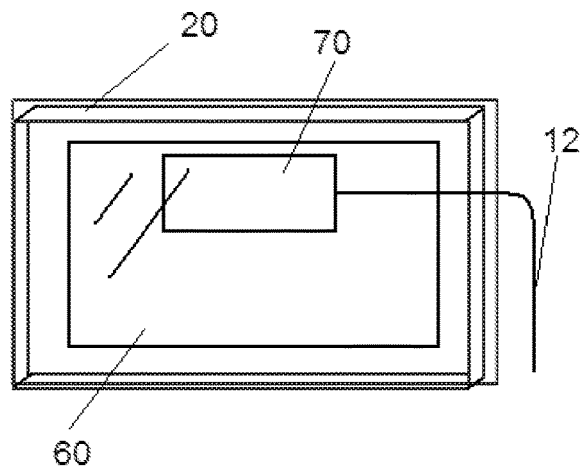
FIG. 24 is a perspective view from the rear, right and top sides of the outer frame of the virtual reality device shown in FIG. 1 mounted with the electronic board and the screen.
Figure 25:
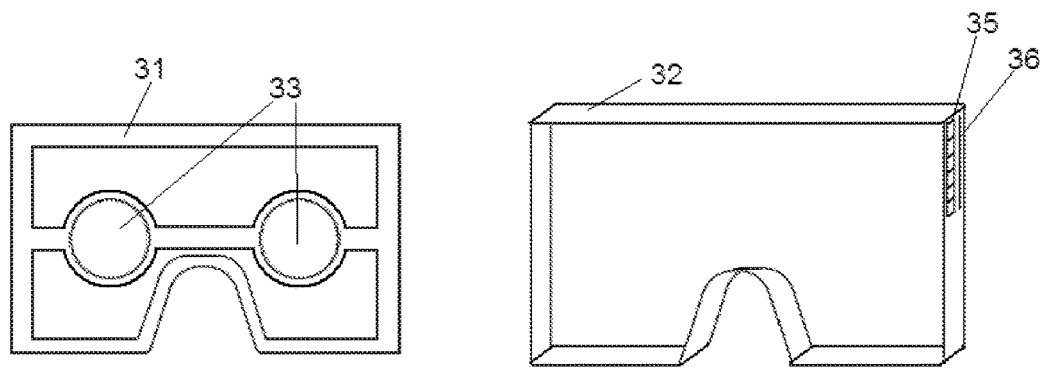
FIG. 25 is a perspective view from the rear, right and top sides of the lens frame of the virtual reality device shown in FIG. 1 with the lens panel and the lens case being separated.
Figure 26:
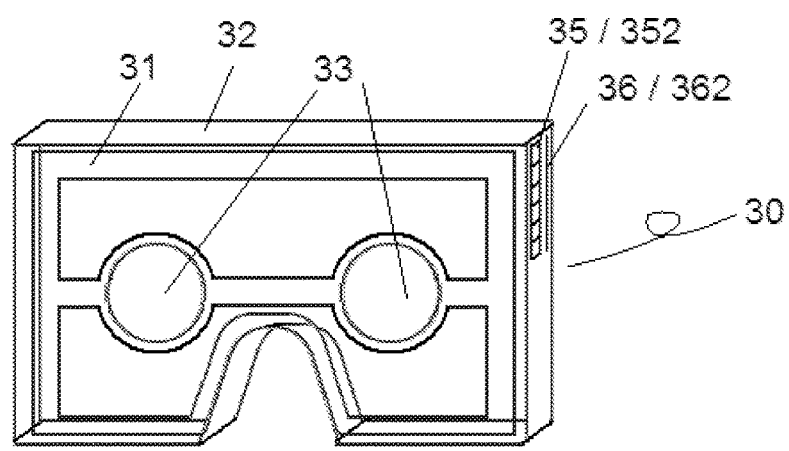
FIG. 26 is a perspective view from the rear, right and top sides of the lens frame of the virtual reality device shown in FIG. 1 with the lens panel and the lens case being combined.

FIGS. 19 and 21 show the virtual reality device 11 of the present embodiment. Coupling mechanism 49 may be provided on the outer frame 20 and/or the lens frame 30. Under the influence of the coupling mechanism 49, the outer frame 20 and the lens frame 30 can be coupled together. When the coupling mechanism 49 is released, the distance between the outer frame 20 and the lens frame 30 can be adjusted.

Figure 20:
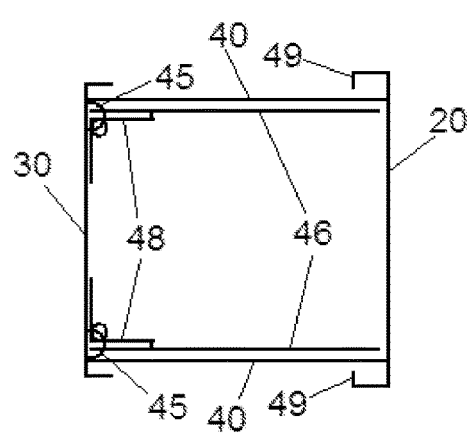
FIG. 20 is a cross sectional view of the hinges on the lens frame according to a fourth embodiment of the virtual reality device of the present application, wherein the hinges are connected to the extending arms provided with springs, and a coupling mechanism is mounted and extending between the lens frame and the outer frame.
Figure 18:
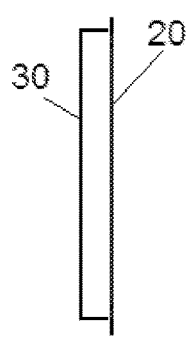
FIG. 18 is a cross sectional view of the hinge of the virtual reality device in FIG. 1 mounted on the lens frame and the outer frame, and combined under the influence of the extending arm position-restricting structure.

FIG. 20 shows a fourth embodiment of the virtual reality device 11 of the present application. Springs 48 may be provided between the outer frame 20 and the extending arms 46 of the virtual reality device 11. Under the influence of the springs 48, the outer frame 20 and the extending arms 46 can be biased to a certain angle such that the outer frame 20 and the lens frame 30 are expanded and kept at a distance. Of course, the extending arms 46 can be disposed on one side of the lens frame 30, and the springs 48 are mounted between the lens frame 30 and the extending arms 46.

Figure 90:
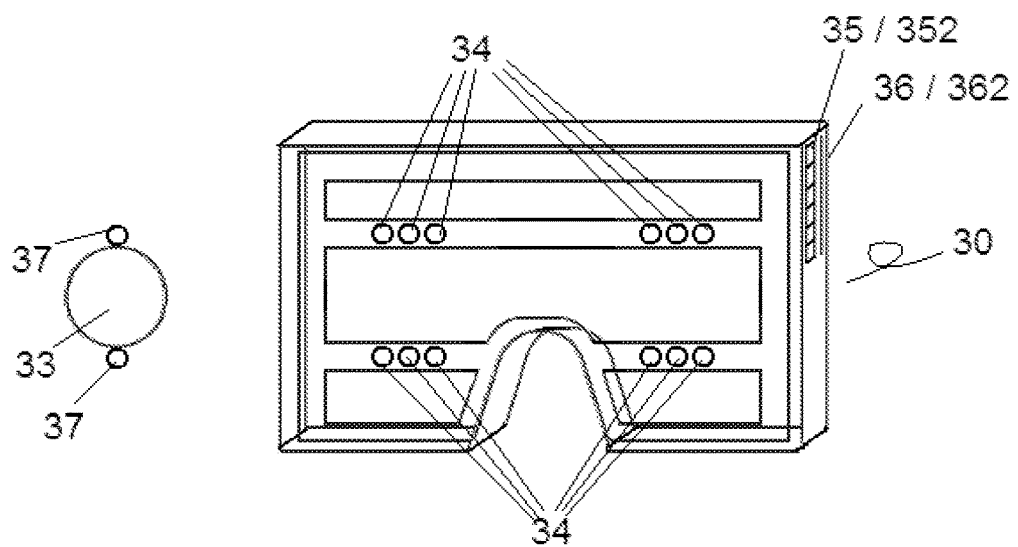
FIG. 90 is a transparent perspective view from the rear, right and top sides of a fifth embodiment of the virtual reality device with separated lens frame and lenses, and a lens position-restricting device is provided on the lens frame, and lens holes are provided on the lenses.
Figure 91:
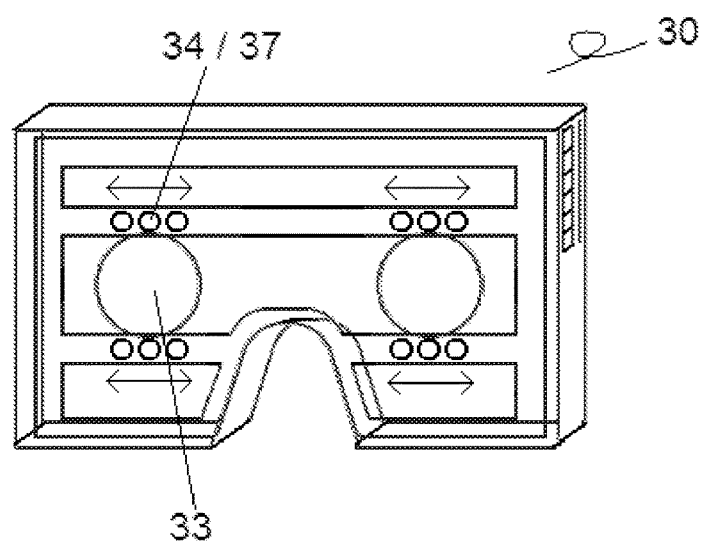
FIG. 91 is the virtual reality device of FIG. 90 with combined lens frame and lenses, showing the principle of adjusting the left or right position of the lenses relative to the lens frame through the coupling of lens holes with different lens position-restricting devices.

FIGS. 90-91 show a fifth embodiment of the virtual reality device 11 of the present application. In the present embodiment, one or more lens position-restricting devices 34 may be provided on the lens frame 30. One or more straight rows of different lens position-restricting devices 34 can be aligned horizontally from left to right. The lens position-restricting devices 34 can be a push button, rotatable knob, screw, snap buckle, clip, or other suitable structure. The lenses 33 may be provided with lens holes 37 coupled with the lens position-restricting devices 34. Through the coupling of the lens holes 37 with different lens position-restricting devices 34, the user can adjust the left or right position of the lenses 33 relative to the lens frame 30 so as to find out the pupillary distance and position suitable for the user.

Figure 93:
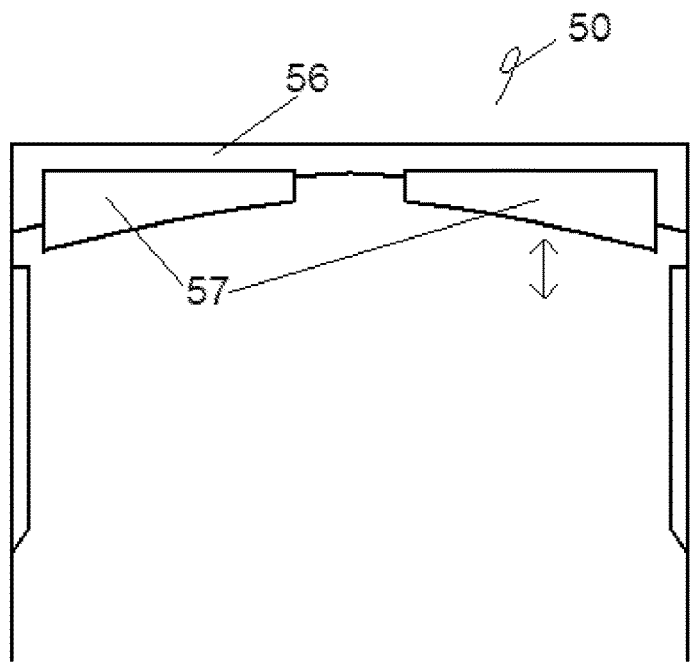
FIG. 93 is a top view of a sixth embodiment of the virtual reality device with secondary slipover plates provided on the slipover plates of the slipover frame, showing the principle of adjusting the forward and backward position of the slipover plates relative to the secondary slipover plates by means of the slipover plate position-restricting mechanism.
Figure 94:
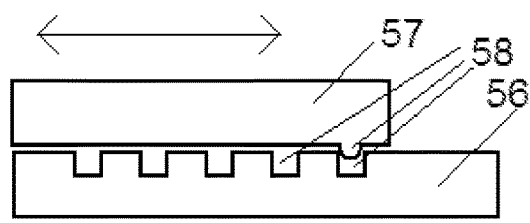
FIG. 94 is an enlarged sectional view of the virtual reality device of FIG. 93 showing that the secondary slipover plates are connected with the slipover plates, and their relative forward and backward positions are changed through the slipover plate position-restricting mechanism.
Figure 95:
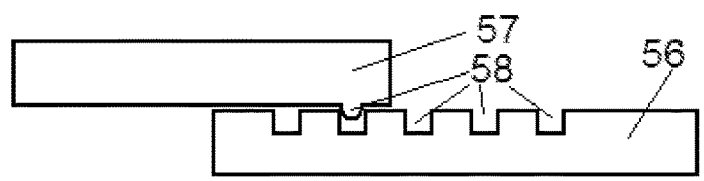
FIG. 95 is an illustrative diagram of FIG. 94 with the secondary slipover plate being connected with the slipover plate at a relatively backward position.

FIG. 93 shows a sixth embodiment of the virtual reality device 11 of the present application. In the present embodiment, the slipover plates 56 of the slipover frame 50 may be provided with one or more secondary slipover plates 57. One or more slipover plate position-restricting mechanisms 58 may be provided between the secondary slipover plates 57 and the slipover plates 56 so as to connect and/or change the forward or backward position of the secondary slipover plates 57 relative to the slipover plates 56, thereby changing the width of the slipover plates 56. The slipover plate position-restricting mechanisms 58 can be a push button, rotatable knob, screw, snap buckle, clip, hook tape, or other suitable conventional structure such that the user can adjust a suitable width of the slipover plate 56 for his/her need especially for user wearing eyeglasses.

Figure 96:
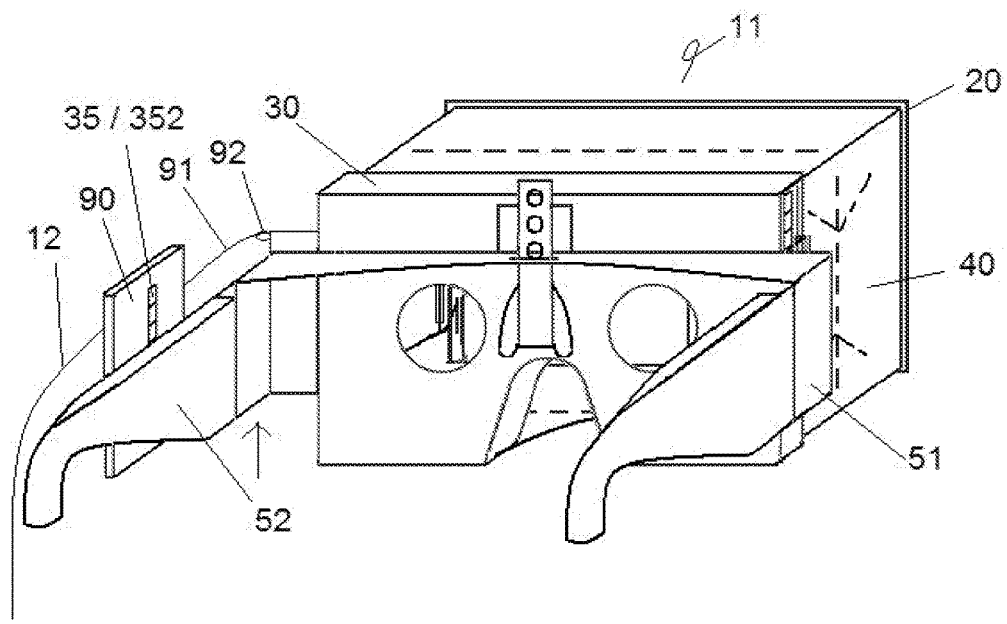
FIG. 96 is a perspective view from the rear, right and top sides of the virtual reality device according to a seventh embodiment of the present application, with side wing provided on the left side, front end of the side wing is connected with the lens frame by side wing hinge and flexible material, position-restricting mechanism is provided between side wing and side slipover, and the slipover frame is connected with the side wing and the lens frame at a relatively high position.
Figure 97:
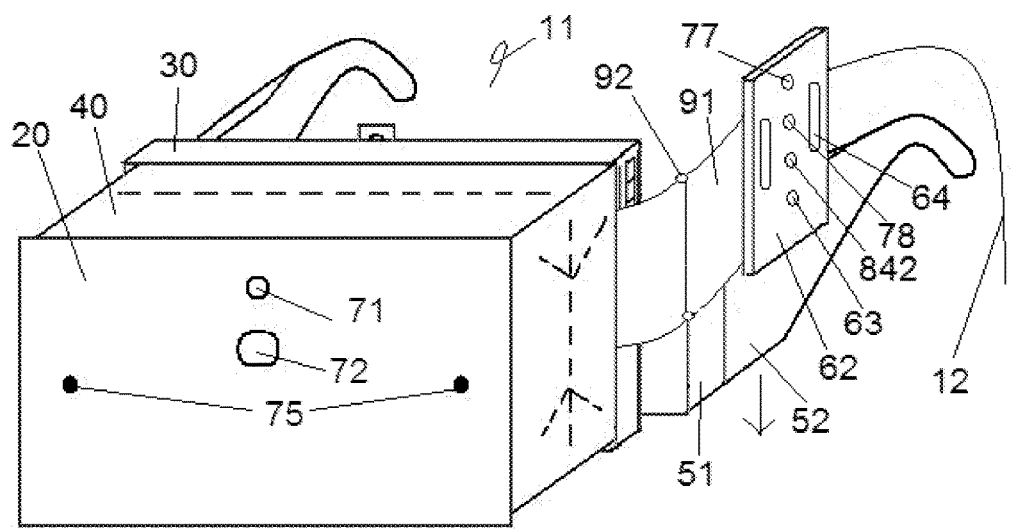
FIG. 97 is a perspective view from the front, left and top sides of the virtual reality device according to the seventh embodiment of the present application, with side wing provided on the left side, front end of the side wing is connected with the lens frame by side wing hinge and flexible material, position-restricting mechanism is provided between side wing and side slipover, and the slipover frame is connected with the side wing and the lens frame at a relatively low position.

FIGS. 96 and 97 show a seventh embodiment of the virtual reality device 11 of the present application. In the present embodiment, the left and/or right side of the virtual reality device 11 may be provided with a side wing 90. An end of the side wing 90 may be connected with the lens frame 30 and/or the folding tube 40 and/or the outer frame 20 by a side wing hinge 92 and/or a flexible material 91 such that the side wing 90 can be hingedly connected with the lens frame 30 and/or the folding tube 40 and/or the outer frame 20. The side wing 90 can be foldable towards the lens frame 30 for easy storage. Position-restricting mechanism 35 may be provided between a side of the side wing 90 facing the lens frame 30 when folding and the side slipover 52 for connecting the side wing 90 with the side slipover 52 and adjusting the up or down position of the side wing 90 relative to the side slipover. As shown in FIG. 96, the slipover frame 50 can be connected with the side wing 90 and the lens frame 30 at a relatively high position thereof. As shown in FIG. 97, the slipover frame 50 can be connected with the side wing 90 and the lens frame 30 at a relatively low position thereof. The side wing 90 and/or the side wing hinge 92 and/or the flexible material 91 may be provided with the electronic board 70 and/or the connecting wire 12 and/or a battery 73 in order to evenly distribute the front and rear weights of the virtual reality device 11. This can enhance the comfort of the wearer so that it is not necessary to hoop the device around the head of the user. The side wing 90 can be provided with various push buttons, including on/off switch 77 and/or positioning function switch 842 and/or screen brightness adjustment key 62 and/or side-by-side mode switching key 63 and/or display window size adjustment key 64 and/or wireless function switch 78, etc.

Figure 98:
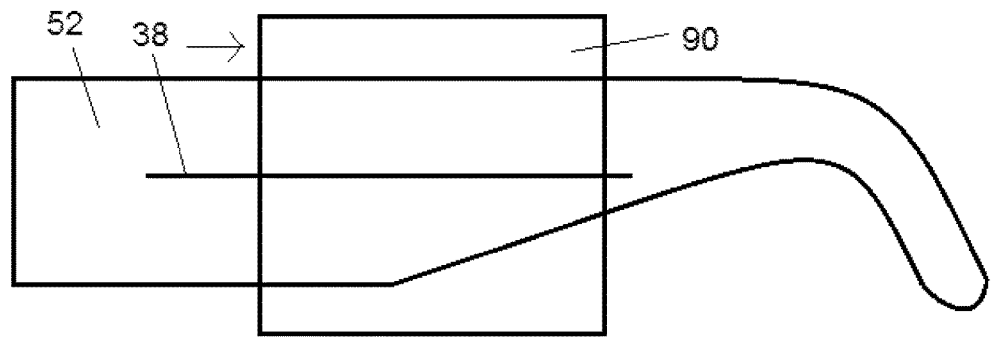
FIG. 98 is an illustrative diagram showing the principle of operation of the virtual reality device of FIG. 96 with a sliding device provided between the side wing and the side slipover and extended outwards, the side wing slides towards a relatively backward position of the side slipover by means of the sliding device.
Figure 99:
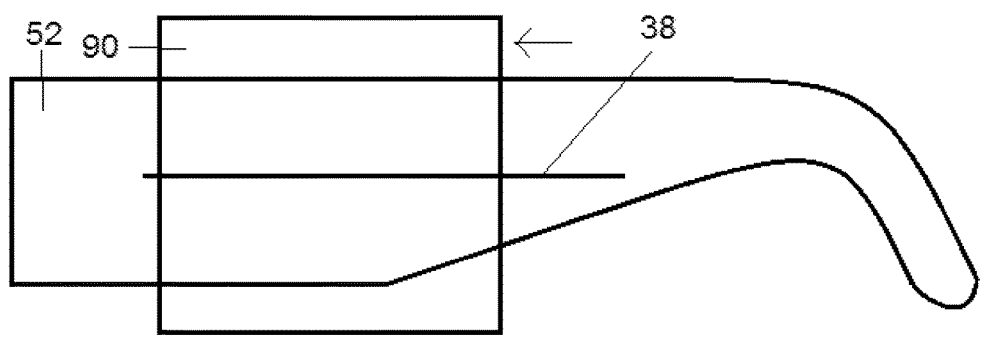
FIG. 99 is an illustrative diagram showing the principle of operation of the virtual reality device of FIG. 96 with a sliding device provided between the side wing and the side slipover and extended forwards, the side wing slides towards a relatively forward position of the side slipover by means of the sliding device.

FIGS. 98 and 99 show the virtual reality device 11 of the present embodiment. One or more sliding devices 38 may be provided between the side wing 90 and the side slipover 52. By means of the sliding devices 38, the side wing 90 can slide forwards or backwards on the side slipover 52 so as to adjust the forward and backward position of the side wing 90 relative to the side slipover 52. This is to adjust the inconsistent connection position of the side wing 90 on the side slipover 52 caused by the movement of the side wing 90 and the side slipover 52 towards the front slipover 51 such as, for example, when the side wing 90 and the side slipover 52 are folded up and expanded outwards when in use. As shown in FIG. 98, when the side wing 90 and the side slipover 52 are expanded outwards, the side wing 90 can slide to a relative backward position of the side slipover 52 by the sliding device 38. As shown in FIG. 99, when the side wing 90 and the side slipover 52 are folded up towards the front slipover 51, the side wing 90 can slide to a relative forward position of the side slipover 52 by the sliding device 38. The sliding device 38 can have a structure in the form of a telescope, track, or encirclement.

FIG. 97 shows a positioning function switch 842 provided on the virtual reality device 11 of the present embodiment. Through the positioning function switch 842, the positioning function and activity sensors, such as the accelerometer 761 and/or electronic compass 762 and/or gyroscope 763 and/or sensor head 75, of the virtual reality device 11 can be switch on and off directly. The virtual reality device 11 of the present embodiment may be provided with a screen brightness adjustment key 62. Through the screen brightness adjustment key 62, the brightness of the screen can be adjusted. The virtual reality device 11 of the present embodiment may be provided with a side-by-side mode switching key 63. Through the side-by-side mode switching key 63, the screen can be switched to left and right, side-by-side displays. The virtual reality device 11 of the present embodiment may be provided with a display window size adjustment key 64. Through the display window size adjustment key 64, the size of the display window on the screen can be adjusted. The virtual reality device 11 of the present embodiment may be provided with a wireless function switch 78. Through the wireless function switch 78, the wireless transceiver device 765 and/or the wireless transceiver function of the virtual reality device 11 can be switched on or off. The virtual reality device 11 of the present embodiment may be provided with an on/off switch 77.

Referring to FIG. 97, one or more electronic boards 70 may be provided on the virtual reality device 11 of the present embodiment. The electronic boards 70 may be coupled with screen 60 and/or camera 71 and/or thermal-sensing lens 72 and/or battery 73 and/or on/off switch 77 of sensor head 75 and/or positioning function switch 842 and/or screen brightness adjustment key 62 and/or side-by-side mode switching key 63 and/or display window size adjustment key 64 and/or wireless function switch 78 and/or audio output and/or connecting wire 12 and/or other electronic board 70. The electronic board 70 may be provided with integrated circuit chip 764 and/or accelerometer 761 and/or electronic compass 762 and/or gyroscope 763 and/or wireless transceiver device 765 and/or central processor 766, etc. The electronic board 70 may have audio output. The audio output can be an interface or earphone 74. The electronic board 70 may have a connecting wire 12 for connecting with the electronic device 13 for transmitting power and/or information such as video, gyroscope information, and camera information, etc. The electronic board 70 can be fixedly or detachably installed on the outer frame 20 and/or folding tube 40 and/or lens frame 30 and/or slipover frame 50 and/or side wings 90 and/or connecting wire 12. The battery 73 can be fixedly or detachably mounted on the outer frame 20 and/or folding tube 40 and/or lens frame 30 and/or slipover frame 50 and/or side wing 90 and or connecting wire 12. The battery 73 may supply power to the virtual reality device 11 and/or the electronic device 13. The battery 73 can be connected with the external power source 15, and the external power source 15 can supply electricity and power storage for the battery 73. The battery 73 may be provided with a power supply switch for selecting whether the battery 73 is to supply power to the electronic device 13 or not. The on/off switch 77 and/or positioning function switch 842 and/or screen brightness adjustment key 62 and/or side-by-side mode switching key 63 and/or display window size adjustment key 64 and/or wireless function switch 78 may be mounted on the outer frame 20 and/or folding tube 40 and/or lens frame 30 and/or slipover frame 50 and/or side wing 90 and/or connecting wire 12.

Specific embodiments have been described above with reference to the accompanying drawings. However, the present application is not limited to the above specific embodiments. The above specific embodiments are merely illustrative and should not be considered as limiting. It should be noted that, upon reading the above disclosure, a person skilled in the art can make various other changes or modifications without departing from the scope of the appended claims.

What is claimed is:

1. A virtual reality device, characterized by having an outer frame, an electronic board, a screen, a lens frame, lenses, and a slipover frame;
   the outer frame being connected with the lens frame by a folding tube and/or extending arms;
   the lens frame being connected with the slipover frame;
   the slipover frame comprising a front slipover and side slipovers;
   the front slipover and/or the side slipovers being in the form of slipover plates;
   the outer frame being provided with the screen;
   the screen being coupled with the electronic board; and
   the lenses being mounted on the lens frame and/or the folding tube,
   wherein the lens frame and the slipover frame are connected by one or more position-restricting mechanisms for selecting relative up or down connecting position between the lens frame and the slipover frame.

2. The virtual reality device as claimed in claim 1, characterized in that the extending arms are provided between the outer frame and the lens frame, wherein the extending arms are hingedly connected by a hinge, and the hinge is provided on the outer frame and/or the lens frame and/or the folding tube.

3. The virtual reality device as claimed in claim 1, characterized in that the lens frame and/or the folding tube comprises one or more lens-restricting devices for adjusting left or right position of the lenses relative to the lens frame and/or the folding tube.

4. The virtual reality device as claimed in claim 1, characterized in that total weight of the outer frame, the screen, the folding tube, the lens frame and the lenses is 55 grams or less.

5. The virtual reality device as claimed in claim 1, characterized in that the slipover plates of the slipover frame are provided with secondary slipover plates, and one or more slipover plate position-restricting mechanisms are provided between the slipover plates and the secondary slipover plates for connecting and/or changing relative front or rear connecting position between the slipover plates and the secondary slipover plates, thereby changing the slipover plates' width.

6. The virtual reality device as claimed in claim 1, characterized in that the front slipover of the slipover frame comprises a nose support, and the front slipover is provided with one or more nose support position-restricting devices for adjusting high or low position of the nose support relative to the front slipover.

7. The virtual reality device as claimed in claim 1, characterized in that lightweight structure of the virtual reality device and the slipover frame make it unnecessary to hoop the device around a user's head when in use, and unnecessary to have backward force and upward tension exerted on the user's head when wearing the device over eyeglasses.

8. The virtual reality device as claimed in claim 1, characterized in having one or more cameras and/or thermal-sensing lenses mounted on the outer frame, wherein the lenses are facing outwards from the outer frame.

9. The virtual reality device as claimed in claim 1, characterized in having a positioning switch for directly switching positioning function on or off.

10. The virtual reality device as claimed in claim 1, characterized in that the virtual reality device and an electronic device simultaneously connect with an electric current managing device through a connecting wire, wherein when an external power source is out of power or not connected with the electric current managing device, the electronic device will supply electricity to the virtual reality device through the connecting wire and/or the electric current managing device, and when the virtual reality device and the electronic device simultaneously connect with the electric current managing device through the connecting wire, and the external power source has power and at the same time connects with the electric current managing device, the electronic device will not supply electricity to the virtual reality device, and the external power source will simultaneously supply power to the virtual reality device and the electronic device through the connecting wire, whether the external power source connects with the electric current managing device or not, and wherein information between the virtual reality device and the electronic device is transmitted through the connecting wire and/or the electric current managing device.

11. The virtual reality device as claimed in claim 1, characterized in that under thermal sensing recognition mode and/or image recognition mode, and in front of a thermal-sensing lens and/or camera of the virtual reality device, imaging function detects condition of a user's hand through thermal sensing and/or image recognition, cuts out an image of the user's hand or outlines a contour of the user's hand, and places the image in a display content on the screen as if the user views his/her hand on the screen, so that recognition can be carried out through motion of the image of the user's hand at overlapping position with an original screen content, to thereby control the electronic device, and form interaction between the user's hand and the original screen content as well as a virtual reality interaction mode.

12. The virtual reality device as claimed in claim 1, characterized in that left and/or right side of the virtual reality device is provided with a side wing, wherein the side wing is connected with the lens frame and/or the folding tube and/or the outer frame by a side wing hinge and/or a flexible material such that the side wing is hingedly connected with the lens frame and/or the folding tube and/or the outer frame, and the side wing is connected with the side slipover, and wherein the side wing and/or the side wing hinge and/or the flexible material is provided thereon with the electronic board and/or a connecting wire and/or a battery to thereby evenly distribute front and rear weights of the virtual reality device.

13. The virtual reality device as claimed in claim 12, characterized in that one or more position-restricting mechanisms are provided between the lens frame and the front slipover and/or between the side wing and the side slipovers, so as to adjust up or down connecting position of the front slipover relative to the lens frame and/or adjust up or down connecting position of the side slipovers relative to the side wing, to thereby align the lenses provided on the lens frame with focuses of a user's eyes and/or eyeglasses.

14. The virtual reality device as claimed in claim 13, characterized in that one or more sliding devices are provided between the side wing and the side slipovers, and by means of the sliding devices, the side wing slides forwards or backwards on the side slipovers so as to adjust forward or backward position of the side wing relative to the side slipovers, and regulate inconsistent connection position of the side wing on the side slipovers due to movement between the side wing and the side slipovers.

15. The virtual reality device as claimed in claim 1, characterized in that the virtual reality device is provided with a side-by-side mode switching key for switching the screen to left and right, side-by-side display.

16. The virtual reality device as claimed in claim 1, characterized in that the virtual reality device is provided with a wireless function switch for switching a wireless transceiver device and/or function of the virtual reality device on or off.

17. The virtual reality device as claimed in claim 1, characterized in that an electric current managing device is provided on the virtual reality device or a connecting wire, wherein when the virtual reality device and an electronic device are connected through the electric current managing device and/or the connecting wire, and an external power source is out of power or is not connected with the electric current managing device, the battery and/or the electronic device will supply power to the virtual reality device through the electric current managing device and/or the connecting wire, and when the virtual reality device and the electronic device are connected through the electric current managing device, and the external power source has power and is connected with the electric current managing device, the electronic device will no longer supply power to the virtual reality device, and the external power source will supply power to the virtual reality device and/or the electronic device and/or the battery through the electric current managing device and/or the connecting wire; and wherein when the virtual reality device and the electronic device are connected through the electric current managing device and/or the connecting wire, information is transmitted between the virtual reality device and the electronic device through the electric current managing device and/or the connecting wire regardless whether the external power source is connected with or supplying power to the electric current management device or not.

* * * * *